(12) United States Patent  
Shimizu et al.

(10) Patent No.: US 7,976,392 B2  
(45) Date of Patent: Jul. 12, 2011

(54) EXTERNAL INTERFACES FOR A 3D GRAPHICS SYSTEM

(75) Inventors: Dan Shimizu, Palo Alto, CA (US); Genyo Takeda, Kyoto (JP); Ko Shiota, Kyoto (JP); Munehito Oira, Kyoto (JP); Kazuo Koshima, Kyoto (JP); Satoshi Nishiumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 836 days.

(21) Appl. No.: 11/598,231

(22) Filed: Nov. 13, 2006

(65) Prior Publication Data

US 2007/0197291 A1   Aug. 23, 2007

Related U.S. Application Data

(63) Continuation of application No. 10/600,585, filed on Jun. 23, 2003, now Pat. No. 7,134,960, which is a continuation of application No. 09/723,335, filed on Nov. 28, 2000, now Pat. No. 6,609,977.

(60) Provisional application No. 60/226,884, filed on Aug. 23, 2000.

(51) Int. Cl.  
*A63F 9/24* (2006.01)  
*A63F 13/02* (2006.01)

(52) U.S. Cl. ............... 463/44; 463/43; 463/45

(58) Field of Classification Search .............. 463/36–38, 463/47, 43–45  
See application file for complete search history.

(56) References Cited

U.S. PATENT DOCUMENTS

| | | |
|---|---|---|
| 3,369,177 A | 2/1968 | Graham et al. |
| 4,167,019 A | 9/1979 | Shepperd .................. 358/22 |
| 4,278,972 A | 7/1981 | Wozniak .................. 340/703 |
| 4,296,476 A | 10/1981 | Mayer et al. ............... 364/900 |
| 4,324,401 A | 4/1982 | Stubben et al. ............. 273/85 |
| 4,388,620 A | 6/1983 | Sherman |
| 4,407,298 A | 10/1983 | Lentz et al. ............... 128/713 |
| 4,425,559 A | 1/1984 | Sherman |
| 4,454,594 A | 6/1984 | Heffron et al. ............. 364/900 |
| 4,462,076 A | 7/1984 | Smith, III ................ 364/200 |
| 4,562,308 A | 12/1985 | Kopetzky et al. ............ 179/18 |
| 4,567,516 A | 1/1986 | Scherer et al. ............. 358/114 |

(Continued)

FOREIGN PATENT DOCUMENTS

CA     2070934     12/1993

(Continued)

OTHER PUBLICATIONS

McCubbin, Andrew J., "Sony Playstation Controller Information", Aug. 13, 1998 available at <http://www.gamesx.com/controldata/psxcont/psxcont.htm>.*

(Continued)

*Primary Examiner* — David L Lewis  
*Assistant Examiner* — Werner Garner  
(74) *Attorney, Agent, or Firm* — Nixon & Vanderhye P.C.

(57) ABSTRACT

An advantageous set of external interfaces for home video game platform provide modularity and expandability while maintaining and preserving the proprietary nature of the platform. A disk drive interface provides flexible communications with an internal disk drive. Various serial bus interfaces provide expandability and interconnectability with a variety of internal and external devices including, for example, flash memory, broadband adapters, modems, and various other devices. A 4-port game controller interface provides serial interconnectability with handheld game controllers and various other input/output device. Power supply, digital and analog audio/video connections, and parallel memory expansion connections are also provided.

1 Claim, 53 Drawing Sheets

U.S. PATENT DOCUMENTS

| | | | |
|---|---|---|---|
| 4,570,233 A | 2/1986 | Yan et al. | |
| 4,589,089 A | 5/1986 | Frederiksen | 364/900 |
| 4,592,012 A | 5/1986 | Braun | 364/900 |
| 4,658,247 A | 4/1987 | Gharachorloo | |
| 4,725,831 A | 2/1988 | Coleman | |
| 4,799,635 A | 1/1989 | Nakagawa | 364/900 |
| 4,829,295 A | 5/1989 | Hiroyuki | |
| 4,837,488 A | 6/1989 | Donahue | 324/66 |
| 4,850,591 A | 7/1989 | Takezawa et al. | 273/85 |
| 4,862,392 A | 8/1989 | Steiner | |
| 4,866,637 A | 9/1989 | Gonzalez-Lopez et al. | |
| 4,901,064 A | 2/1990 | Deering | |
| 4,914,729 A | 4/1990 | Omori et al. | |
| 4,945,500 A | 7/1990 | Deering | |
| 4,972,470 A | 11/1990 | Farago | 380/3 |
| 4,976,429 A | 12/1990 | Nagel | 273/1 |
| 5,004,232 A | 4/1991 | Wong et al. | 273/435 |
| 5,049,863 A | 9/1991 | Oka | 340/170 |
| 5,050,041 A | 9/1991 | Shafi | 361/391 |
| 5,091,832 A | 2/1992 | Tortola et al. | 362/109 |
| 5,136,664 A | 8/1992 | Bersack et al. | |
| 5,155,768 A | 10/1992 | Matsuhara | 380/23 |
| 5,170,468 A | 12/1992 | Shah et al. | |
| RE34,161 E | 1/1993 | Nakagawa et al. | 273/85 |
| 5,213,327 A | 5/1993 | Kitaue | 273/148 |
| 5,230,059 A | 7/1993 | Nielsen et al. | 395/800 |
| 5,239,540 A | 8/1993 | Rovira et al. | 370/77 |
| 5,245,320 A | 9/1993 | Bouton | 345/167 |
| 5,268,669 A | 12/1993 | Roskowski | 340/534 |
| 5,389,006 A | 2/1995 | Noschese | 439/354 |
| 5,392,385 A | 2/1995 | Evangelisti et al. | |
| 5,392,393 A | 2/1995 | Deering | |
| 5,421,028 A | 5/1995 | Swanson | |
| 5,421,590 A | 6/1995 | Robbins | 273/438 |
| 5,428,355 A | 6/1995 | Jondrow et al. | 341/20 |
| 5,457,775 A | 10/1995 | Johnson, Jr. et al. | |
| 5,459,487 A | 10/1995 | Bouton | 345/156 |
| 5,504,917 A | 4/1996 | Austin | |
| 5,509,811 A | 4/1996 | Homic | 439/55 |
| 5,513,302 A | 4/1996 | Tsai | 395/114 |
| 5,546,050 A | 8/1996 | Florian et al. | 330/282 |
| 5,593,350 A | 1/1997 | Bouton et al. | 463/36 |
| 5,594,854 A | 1/1997 | Baldwin et al. | |
| 5,599,231 A | 2/1997 | Hibino et al. | 463/29 |
| 5,599,232 A | 2/1997 | Darling | 463/44 |
| 5,607,157 A | 3/1997 | Nagashima | 273/148 |
| 5,608,424 A | 3/1997 | Takahashi et al. | |
| 5,615,344 A | 3/1997 | Corder | 395/309 |
| 5,628,686 A | 5/1997 | Svancarek et al. | 463/36 |
| 5,630,170 A | 5/1997 | Koizumi et al. | 395/834 |
| 5,630,174 A | 5/1997 | Stone, III et al. | 395/883 |
| 5,644,790 A | 7/1997 | Li et al. | 395/883 |
| 5,645,277 A | 7/1997 | Cheng | 273/148 |
| 5,655,966 A | 8/1997 | Werdin, Jr. et al. | 463/25 |
| 5,680,534 A | 10/1997 | Yamato et al. | 395/173 |
| 5,687,357 A | 11/1997 | Priem | |
| 5,696,912 A | 12/1997 | Bicevskis et al. | 395/308 |
| 5,701,444 A | 12/1997 | Baldwin | |
| 5,708,799 A | 1/1998 | Gafken et al. | 395/500 |
| 5,714,981 A * | 2/1998 | Scott-Jackson et al. | 345/161 |
| 5,717,428 A | 2/1998 | Barrus et al. | 345/168 |
| 5,721,947 A | 2/1998 | Priem et al. | 395/824 |
| 5,727,192 A | 3/1998 | Baldwin | |
| 5,748,756 A | 5/1998 | Leal et al. | 381/118 |
| 5,754,890 A | 5/1998 | Holmdahl et al. | 395/883 |
| 5,758,182 A | 5/1998 | Rosenthal et al. | |
| 5,764,243 A | 6/1998 | Baldwin | |
| 5,768,626 A | 6/1998 | Munson et al. | |
| 5,768,629 A | 6/1998 | Wise et al. | |
| 5,774,133 A | 6/1998 | Neave et al. | |
| 5,777,629 A | 7/1998 | Baldwin | |
| 5,784,064 A | 7/1998 | Penna et al. | 345/422 |
| 5,798,770 A | 8/1998 | Baldwin | |
| 5,801,706 A | 9/1998 | Fujita et al. | |
| 5,801,716 A | 9/1998 | Silverbrook | |
| 5,805,868 A | 9/1998 | Murphy | |
| 5,815,166 A | 9/1998 | Baldwin | |
| 5,816,921 A | 10/1998 | Hosokawa | 463/43 |
| 5,821,949 A | 10/1998 | Deering | |
| 5,832,244 A | 11/1998 | Jolley et al. | 395/309 |
| 5,867,166 A | 2/1999 | Myhrvold et al. | 345/419 |
| 5,870,027 A | 2/1999 | Ho | 340/693 |
| 5,872,999 A | 2/1999 | Koizumi et al. | 395/892 |
| 5,874,969 A | 2/1999 | Storm et al. | |
| 5,886,686 A | 3/1999 | Chen | 345/168 |
| 5,892,974 A | 4/1999 | Koizumi et al. | 395/836 |
| 5,917,496 A | 6/1999 | Fujita et al. | |
| 5,920,326 A | 7/1999 | Rentschler et al. | |
| 5,935,224 A | 8/1999 | Svancarek et al. | 710/63 |
| 5,940,086 A | 8/1999 | Rentschler et al. | |
| 5,949,424 A | 9/1999 | Cabral et al. | |
| 5,949,440 A | 9/1999 | Krech, Jr. et al. | |
| 5,969,726 A | 10/1999 | Rentschler et al. | |
| 5,991,546 A | 11/1999 | Chan et al. | 395/882 |
| 5,996,033 A | 11/1999 | Chiu-Hao | 710/68 |
| 5,999,196 A | 12/1999 | Storm et al. | |
| 6,002,409 A | 12/1999 | Harkin | |
| 6,006,295 A | 12/1999 | Jones et al. | 710/62 |
| 6,018,765 A | 1/2000 | Durana et al. | 709/217 |
| 6,023,738 A | 2/2000 | Priem et al. | |
| 6,025,853 A | 2/2000 | Baldwin | |
| 6,028,611 A | 2/2000 | Anderson et al. | |
| 6,033,309 A | 3/2000 | Couch et al. | 463/38 |
| 6,037,949 A | 3/2000 | DeRose et al. | |
| 6,057,852 A | 5/2000 | Krech, Jr. | |
| 6,067,411 A | 5/2000 | Poimboeuf et al. | 395/551 |
| 6,071,191 A | 6/2000 | Takeda et al. | 463/29 |
| 6,076,119 A | 6/2000 | Maemura et al. | 710/15 |
| 6,092,124 A | 7/2000 | Priem et al. | |
| 6,098,130 A | 8/2000 | Wang | 710/100 |
| 6,101,560 A | 8/2000 | Gulick | 710/62 |
| 6,131,134 A | 10/2000 | Huang et al. | 710/103 |
| 6,147,673 A | 11/2000 | Zarek | 345/156 |
| 6,154,186 A * | 11/2000 | Smith et al. | 345/1.2 |
| 6,166,748 A | 12/2000 | Van Hook et al. | 345/522 |
| 6,171,190 B1 | 1/2001 | Thanasack et al. | 463/51 |
| 6,173,367 B1 | 1/2001 | Aleksic et al. | |
| 6,181,352 B1 | 1/2001 | Kirk et al. | |
| 6,190,257 B1 | 2/2001 | Takeda et al. | 463/29 |
| 6,193,609 B1 | 2/2001 | D'Achard Van Enschut | 463/37 |
| 6,198,488 B1 | 3/2001 | Lindholm et al. | |
| 6,200,253 B1 | 3/2001 | Nishiumi et al. | 563/47 |
| 6,213,878 B1 | 4/2001 | Setsumasa et al. | 463/31 |
| 6,217,351 B1 | 4/2001 | Fung et al. | 439/131 |
| 6,226,012 B1 | 5/2001 | Priem et al. | |
| 6,230,232 B1 | 5/2001 | Nishiumi et al. | 711/4 |
| 6,238,291 B1 | 5/2001 | Fujimoto et al. | 463/44 |
| 6,247,075 B1 | 6/2001 | Wang et al. | 710/63 |
| 6,263,392 B1 | 7/2001 | McCauley | 710/129 |
| 6,264,558 B1 | 7/2001 | Nishiumi et al. | 463/36 |
| 6,279,906 B1 * | 8/2001 | Sanderson et al. | 273/148 B |
| 6,307,880 B1 | 10/2001 | Evans et al. | 375/222 |
| 6,334,160 B1 | 12/2001 | Emmert et al. | 710/11 |
| 6,338,105 B1 * | 1/2002 | Niizuma et al. | 710/72 |
| 6,609,977 B1 | 8/2003 | Shimizu et al. | 463/36 |
| 6,615,301 B1 | 9/2003 | Lee et al. | 710/106 |
| 7,134,960 B1 | 11/2006 | Shimizu et al. | |
| 2001/0006391 A1 | 7/2001 | Sawano et al. | 345/418 |
| 2001/0008847 A1 | 7/2001 | Miyamoto et al. | 463/33 |

FOREIGN PATENT DOCUMENTS

| | | |
|---|---|---|
| EP | 0780771 A2 | 6/1997 |
| EP | 1 074 945 | 2/2001 |
| EP | 1 075 146 | 2/2001 |
| EP | 1 081 649 | 3/2001 |
| JP | 11053580 | 2/1999 |
| JP | 11076614 | 3/1999 |
| JP | 11161819 | 6/1999 |
| JP | 11203500 | 7/1999 |
| JP | 11226257 | 8/1999 |
| JP | 11259671 | 9/1999 |
| JP | 11259678 | 9/1999 |
| JP | 2000-66985 | 3/2000 |
| JP | 2000-92390 | 3/2000 |
| JP | 2000-132704 | 5/2000 |
| JP | 2000-132706 | 5/2000 |
| JP | 2000-149053 | 5/2000 |

| | | |
|---|---|---|
| JP | 2000-156875 | 6/2000 |
| JP | 2000-182077 | 6/2000 |
| JP | 2000-207582 | 7/2000 |
| JP | 2000-215325 | 8/2000 |
| WO | 8809573 A1 | 6/1990 |
| WO | WO 94/10641 | 5/1994 |

OTHER PUBLICATIONS

Storr, Phil, "Phil Storrs PC Hardware book", Dec. 26, 1998, available at <http://www.philipstorr.id.au/pcbook/book2/games.htm>.*
68HC705V8 Specification Rev. 2.1 (General Release), MCU System Design Group, Oak Hill, Texas, Aug. 12, 1994, pp. iii-xi, xiii, and 89-96.
HCO8—68HC08AS32, Advance Information Rev. 3.0, Motorola, printed out Jul. 24, 2001, pp. 2-27, and 234-308.
Website http://www.repairfaq.orq/REPAIR/F_Pinouts.html entiltled "Pinouts for various connectors in Real Life (tm)", p. 1 of 3, dated May 20, 1997, author not established.
Christy J., Website http://www.repairfaq.org/REPAIR/F_SNES.html entitled "Super Nintendo Entertainment System: pinouts & protocol, Mar. 26, 1996, 5 pages by the way of link 2.2) SNES" in the website above.
U.S. Appl. No. 10/132,702.
U.S. Appl. No. 10/225,472.
U.S. Appl. No. 10/225,487.
U.S. Appl. No. 10/225,488.
Photograph of Sony PlayStation II System.
Photograph of Sega Dreamcast System.
Photograph of Nintendo 64 System.
Whitepaper: 3D Graphics Demystified, Nov. 11, 1999, www.nvidia.com.
Whitepaper: "Z Buffering, Interpolation and More W-Buffering", Doug Rogers, Jan. 31, 2000, www.nvidia.com.
Whitepaper: Using GL_NV_vertex_array and GL_NV_fence, posted Aug. 1, 2000, www.nvidia.com.
Whitepaper: Anisotropic Texture Filtering in OpenGL, posted Jul. 17, 2000, www.nvidia.com.
Whitepaper: Mapping Texels to Pixels in D3D, posted Apr. 5, 2000, www.nvidia.com.
Whitepaper: Guard Band Clipping, posted Jan. 31, 2000, www.nvidia.com.
Whitepaper: Cube Environment Mapping, posted Jan. 14, 2000, www.nvidia.com.
Whitepaper: Color Key in D3D, posted Jan. 11, 2000, www.nvidia.com.
Whitepaper: Vertex Blending Under DX7 for the GeForce 256, Jan. 5, 2000, www.nvidia.com.
Whitepaper: Optimizing Direct3D for the GeForce 256, Jan. 3, 2000, www.nvidia.com.
Whitepaper: Dot Product Texture Blending, Dec. 3, 1999, www.nvidia.com.
Whitepaper: Technical Brief: AGP 4X with Fast Writes, Nov. 10, 1999, www.nvidia.com.
Technical Brief: Transform and Lighting, Nov. 10, 1999, www.nvidia.com.
Technical Brief: What's New With Microsoft DirectX7, posted Nov. 10, 1999, www.nvidia.com.
Mitchell et al., "Multitexturing in DirectX6", Game Developer, Sep. 1998, www.gdmag.com.
VisionTek, "GeForce2 GS Graphics Processing Unit", © 2000 www.visiontek.com.
Jim Bushnell et al. "Advanced Multitexture Effects With Direct3D and OpenGL", Pyramid Peak Design & ATI Research, Inc., GameDevelopers Conference, © 1999.
Sony PlayStation II Instruction Manual, Sony Computer Entertainment Inc., © 2000.
Stand and Be Judged, Next Generation, May 2000.
PlayStation II: Hardware Heaven or Hell?, Next Generation, Jan. 2000.
Chris Charla, "Play Station II: The Latest News", Next Generation, Sep. 1999.
"First PlayStation II Gameplay Screens Revealed!", Next Generation, Sep. 1999.
Game Enthusiast Online Highlights, Mar. 18, 1999.
Game Enthusiast Online Highlights, Mar. 19, 1999.
Game Enthusiast Online Highlights, Mar. 17, 1999.
Game Enthusiast Online Highlights, Oct. 20, 1999.
Joel Easley, "PlayStation II Revealed", Game Week, Sep. 29, 1999.
Inside Sony's Next Generation Playstation, © 1999.
Press Releases, Mar. 18, 1999.
Chris Johnston, "PlayStation Part Deux", Press Start, © 1999.
Nikkei Shimbun, "Sony Making SME, Chemical and SPT into Wholly-Owned Subsidiaries", Mar. 9, 1999.
AM News: Japanese Developers Not All Sold on PS2, Next Generation, Mar. 16, 1999.
Sony to Turn PlayStation Maker Into Wholly Owned Unit-Nikkei, Dow Jones News Service, Mar. 8, 1999.
Yumiko Ono, Sony Antes Up Its Chips in Bet on New Game System, Dow Jones News Service, Mar. 4, 1999.
MacWeek.Com Gets Inside Story on Connectix VGS for Windows; Controversial Emulator of Sony PlayStation Games Cureently Available for Macs Only, Business Wire, Mar. 12, 1999.
"DexDrive Bridges Gap", The Tampa Tribune, Mar. 12, 1999.
A Microprocessor With a 128b CPU, 10 Floating-Point MAC's, 4 Floating-Point Dividers, and an MPEG2 Decoder, 1999 IEEE International Solid-State Circuits Conference, Feb. 16, 1999.
Dreamcast Instruction Manual, Sega Enterprises, Ltd., © 1998.
"Sega to Launch Video Camera for Dreamcast", Reuters Business News, Feb. 16, 2000.
David Pescovitz, "Dream on", Wired, Aug. 1999.
Randy Nelson, "Dreamcast 101: Everything You Ever Wanted to Know About Sega's Powerful New Console", Official Sega Dreamcast Magazine, Jun. 1999.
2D/3D Graphics Card User Manual, Guillemot © 1999.
Nintendo 64 Instruction Booklet, Nintendo of America, 1998.
Steven Levy, "Here Comes PlayStation II", Newsweek, Mar. 6, 2000.
David Sheff, "Sony Smackage: Test Driving the PlayStation II", Wired, Nov. 1999.
Introducing The Next Generation PlayStation, Sony Computer Entertainment Inc., © 1999.
Leadtek GTS, Aug. 3, 2000, www.hexus.net.
Voodoo 5 5500 Review, Jul. 26, 2000, www.hexus.net.
ATI Radeon 64 Meg DDR OEM, Aug. 19, 2000, www.hexus.net.
Microsoft Xbox—The Future of Gaming, Microsoft Xbox Performance Sheet, www.xbox.com.
Robert L. Cook, "Shade Trees", Computer Graphics, vol. 18, No. 3, Jul. 1984.
Wang et al., "Second-Depth Shadow Mapping", Department of Computer Science, Univ. N.C, Chapel Hill, N.C. pp. 1-7.
Peercy et al., "Efficient Bump Mapping Hardware", Computer Graphics Proceedings, Annual Conference Series, 1997.
Gustavo Oliveira, "Refractive Texture Mappig, Part One", www.gamasutra.com, Nov. 10, 2000.
John Schlag, Fast Embossing Effects on Raster Image Data, Graphics Gems IV, Edited by Paul S. Heckbert, Computer Science Department, Carnegie Mellon University, Academic Press, Inc., 1994,pp. 433-437.
James F. Blinn, "Simulationof Wrinkled Surfaces," Caltech/JPL, pp. 286-292, SIGGRAPH 78 (1978).
Tomas Möller and Eric Haines "Real-Time Rendering", AK Peters, Ltd., © 1999, pp. 127-142.
Technical Presentation: Vertex Buffers, posted Jun. 12, 2000, www.nvidia.com.
Technical Presentation: Hardware Transform and Lighting, www.nvidia.com, posted Jun. 12, 2000.
Technical Presentation: Hardware Bump-mapping Choices and Concepts, Jun. 7, 2000, www.nvidia.com.
140\Technical Presentation: How to Bump Map a Skinned Polygonal Model, Jun. 7, 2000, www.nvidia.com.
Technical Presentation: Computations for Hardware Lighting and Shading, Mar. 17, 2000, www.nvidia.com.
Technical Presentation: Practical Bump-mapping for Today's GPUs, Mar. 17, 2000 www.nvidia.com.
Technical Presentation: Shadows, Transparency, & Fog, Mar. 17, 2000 www.nvidia.com.

Technical Presentation: GeForce 256 Resister Combiners, Mar. 17, 2000, www.nvidia.com.
Technical Presentation: TexGen & The Texture Matrix, Mar. 15, 2000 www.nvidia.com.
Technical Presentation: Toon Shading, Mar. 15, 2000, www.nvidia.com.
Technical Presentation: D3D 7 Vertex Lighting, Mar. 15, 2000, www.nvidia.com.
Technical Presentation: Per-Pixel Lighting (by S. Dietrich) Mar. 14, 2000 www.nvidia.com.
Technical Presentation: GeForce 256 and RIVA TNT Combiners, Dec. 8, 1999, www.nvidia.com.
Technical Presentation: Vertex Cache Optimization, Nov. 12, 1999, www.nvidia.com.
Technical Presentation: Vertex Blending, Nov. 12, 1999, www.nvidia.com.
Technical Presentation: Hardware Transform and Lighting, Nov. 12, 1999, www.nvidia.com.
Technical Presentation: GeForce 256 Overview, Nov. 12, 1999, www.nvidia.com.
Technical Presentation: DirectX 7 and Texture Management, Nov. 12, 1999 www.nvidia.com.
Technical Presentation: Dot Product Lighting, Nov. 12, 1999, www.nvidia.com.
Technical Presentation: Texture Coordinate Generation, Nov. 3, 1999, www.nvidia.com.
Technical Presentation: Phong Shading and Lightmaps, Nov. 3, 1999, www.nvidia.com.
Technical Presentation: The ARB_multitexture Extension, Nov. 3, 1999 www.nvidia.com.
Technical Presentation: Multitexture Combiners, Nov. 3, 1999, www.nvidia.com.
Technical Presentation: Emboss Bump Mapping, Nov. 3, 1999, www.nvidia.com.
Technical Presentation: Hardware Accelerated Anisotropic Lighting, Nov. 3, 1999 www.nvidia.com.
Technical Presentation: Guard Band Clipping, Nov. 3, 1999, www.nvidia.com.
The RenderMan Interface, Stephan R. Keith, Version 3.1, Pixar Animation Studios, Sep. 1989.
The RenderMan Interface, Version 3.2, Pixar Animation Studios, Jul. 2000, www.pixar.com.
NVIDIA Product Overview, "GeForce2Ultra", NVIDIA Corporation, Aug. 21, 2000, www.nvidia.com.
Duke, "Dreamcast Technical Specs", Sega Dreamcast Review, Sega, Feb. 1999, www.game-revolution.com.
Marlin Rowley, "GeForce 1 & 2 GPU Speed Tests", May 11, 2000, www.g256.com.
"Dreamcast: The Full Story", Next Generation, Sep. 1998.
"Dreamcast: The Full Story", Next Generation, Sep. 1998.
"Pinouts for Various Connectors in Real Life (tm )", [online], retrieved from the Internet, http://repairfaq.ece.drexel.edu/REPAIR/F_Pinouts1.html, updated May 20, 1997 (per document).
"Pinouts for Various Connectors in Real Life (tm )", [online], retrieved from the Internet, http://repairfaq.ece.drexel.edu/REPAIR/F_Pinouts2.html, updated May 20, 1997 (per document).
"Pinouts for Various Connectors in Real Life (tm )", [online], retrieved from the Internet, http://repairfaq.ece.drexel.edu/REPAIR/F_Pinouts3.html, updated May 20, 1997 (per document).
Tilton, Jay; "Nintendo NES and SNES controllers", Deathskull Laboratories!, Jun. 28, 1998 (per document), [online], retrieved from the Internet, http://users.erols.com/tilton/games/tech/nescont.html.

* cited by examiner

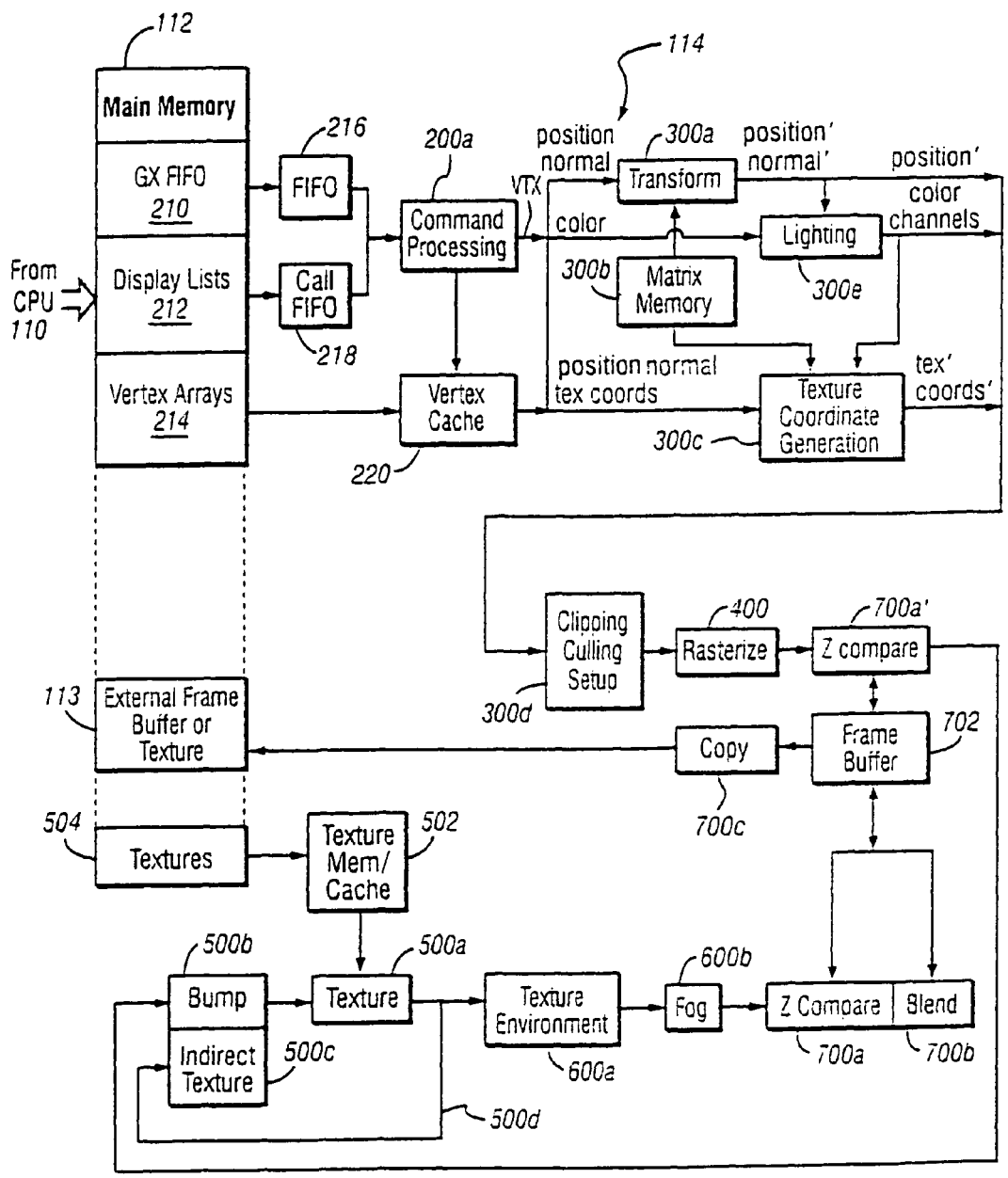
Fig. 5   EXAMPLE GRAPHICS PROCESSOR FLOW

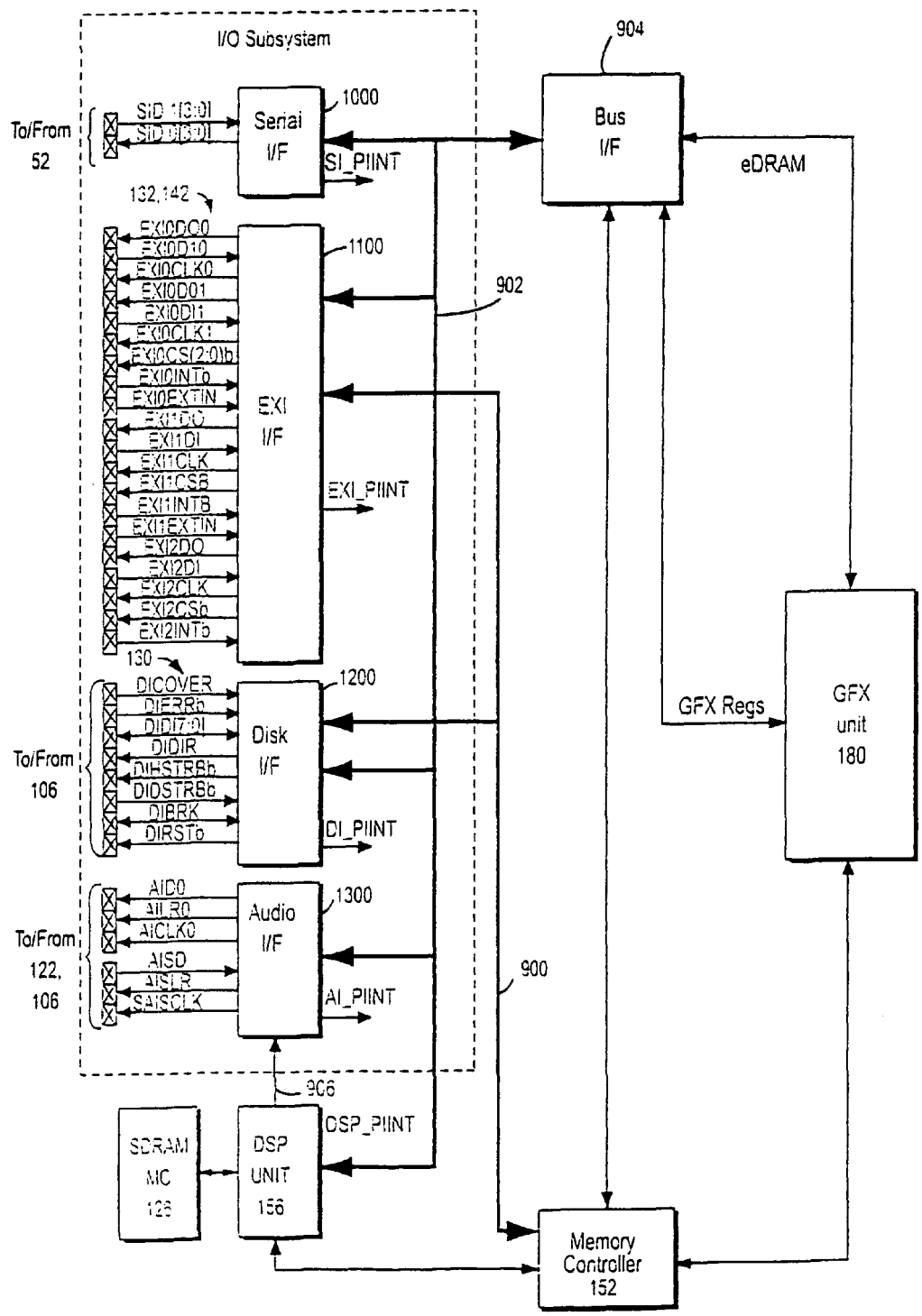
Fig. 6 EXAMPLE INPUT/OUTPUT SUBSYSTEM

EXAMPLE DISK INTERFACE

EXAMPLE DISK INTERFACE

| Register | | | Offset(hex) |
|---|---|---|---|
| 31 | 16 | 15                                 0 | |
| DI Status Register (DISR) | | | 0x00 |
| DI Cover Register (DICCVR) | | | 0x04 |
| DI Command Buffer 0 (DICMDBUF0) | | | 0x08 |
| DI Command Buffer 1 (DICMDBUF1) | | | 0x0C |
| DI Command Buffer 2 (DICMDBUF2) | | | 0x10 |
| DI Memory Address Register (DIMAR) | | | 0x14 |
| DI DMA Length Register (DILENGTH) | | | 0x18 |
| DI Control Register (DICR) | | | 0x1C |
| DI Immediate Data Buffer (DIMMBUF) | | | 0x20 |
| DI Configuration Register (DICFG) | | | 0x24 |

Fig. 7C

EXAMPLE DISK INTERFACE REGISTERS

EXAMPLE SERIAL INTERFACE

EXAMPLE SERIAL INTERFACE

| Register | | | Offset(hex) |
|---|---|---|---|
| 31 | 16\|15 | 0 | |
| SI Channel 0 Output Buffer (SIC0OUTBUF) | | | 0xC0 |
| SI Channel 0 Output Buffer H(SIC0INBUFH) | | | 0xC4 |
| SI Channel 0 Output Buffer L(SIC0INBUFL) | | | 0xC8 |
| SI Channel 1 Output Buffer (SIC1OUTBUF) | | | 0xCC |
| SI Channel 1 Input Buffer H(SIC1INBUFH) | | | 0x10 |
| SI Channel 1 Input Buffer L(SIC1INBUFL) | | | 0x14 |
| SI Channel 2 Output Buffer (SIC2OUTBUF) | | | 0x18 |
| SI Channel 2 Input Buffer H(SIC2INBUFH) | | | 0x1C |
| SI Channel 2 Input Buffer L(SIC2INBUFL) | | | 0x20 |
| SI Channel 3 Output Buffer (SIC3OUTBUF) | | | 0x24 |
| SI Channel 3 Input Buffer H(SIC3INBUFH) | | | 0x28 |
| SI Channel 3 Input Buffer L(SIC3INBUFL) | | | 0x2C |
| SI Poll Control Register (SIPOLL) | | | 0x30 |
| SI Communication Control Status Register (SICOMCSR) | | | 0x34 |
| SI Status Register (SISR) | | | 0x38 |
| SI EXI Lock Register (SIEXILK) | | | 0x3C |
| SI Communication RAM (128 Bytes) | | | 0x80-0xFF |

Fig. 8C

EXAMPLE SERIAL INTERFACE REGISTERS

EXAMPLE SERIAL INTERFACE

EXAMPLE EXTERNAL INTERFACE

EXAMPLE EXTERNAL CHANNEL 0 INTERFACE

EXAMPLE EXTERNAL
CHANNEL 1 INTERFACE

EXAMPLE EXTERNAL
CHANNEL 2 INTERFACE

| Register | | | Offset(hex) |
|---|---|---|---|
| 31 | 16 15 | 0 | |
| EXI0 Channel Parameter Register (EXI0CPR) | | | 0x00 |
| EXI0 Memory Address Register (EXI0MAR) | | | 0x04 |
| EXI0 DMA Length (EXI0LENGTH) | | | 0x08 |
| EXI0 Control Register (EXI0CR) | | | 0x0C |
| EXI0 Data Register (EXI0DATA) | | | 0x10 |
| EXI1 Channel Parameter Register (EXI1CPR) | | | 0x14 |
| EXI1 Memory Address Register (EXI1MAR) | | | 0x18 |
| EXI1 DMA Length (EXI1LENGTH) | | | 0x1C |
| EXI1 Control Register (EXI1CR) | | | 0x20 |
| EXI1 Data Register (EXI1DATA) | | | 0x24 |
| EXI2 Channel Parameter Register (EXI2CPR) | | | 0x28 |
| EXI2 Memory Address Register (EXI2MAR) | | | 0x2C |
| EXI2 DMA Length (EXI2LENGTH) | | | 0x30 |
| EXI2 Control Register (EXI2CR) | | | 0x34 |
| EXI2 Data Register (EXI2DATA) | | | 0x38 |
| ROM Area (1MB) | | | 0xFFF00000 |

Fig. 9E
EXAMPLE EXTERNAL INTERFACE REGISTERS

EXAMPLE AUDIO INTERFACES

EXAMPLE AUDIO DAC INTERFACES

| Register | | | | Offset(hex) |
|---|---|---|---|---|
| 31 | 16 | 15 | 0 | |
| AI Control Register (AICR) | | | | 0x00 |
| AI Volume Register (AIVR) | | | | 0x04 |
| AI Sample Count Register (AISCNT) | | | | 0x08 |
| AI Interrupt Timing Register (AIIT) | | | | 0x0C |

Fig. 10C

EXAMPLE AUDIO INTERFACES REGISTERS

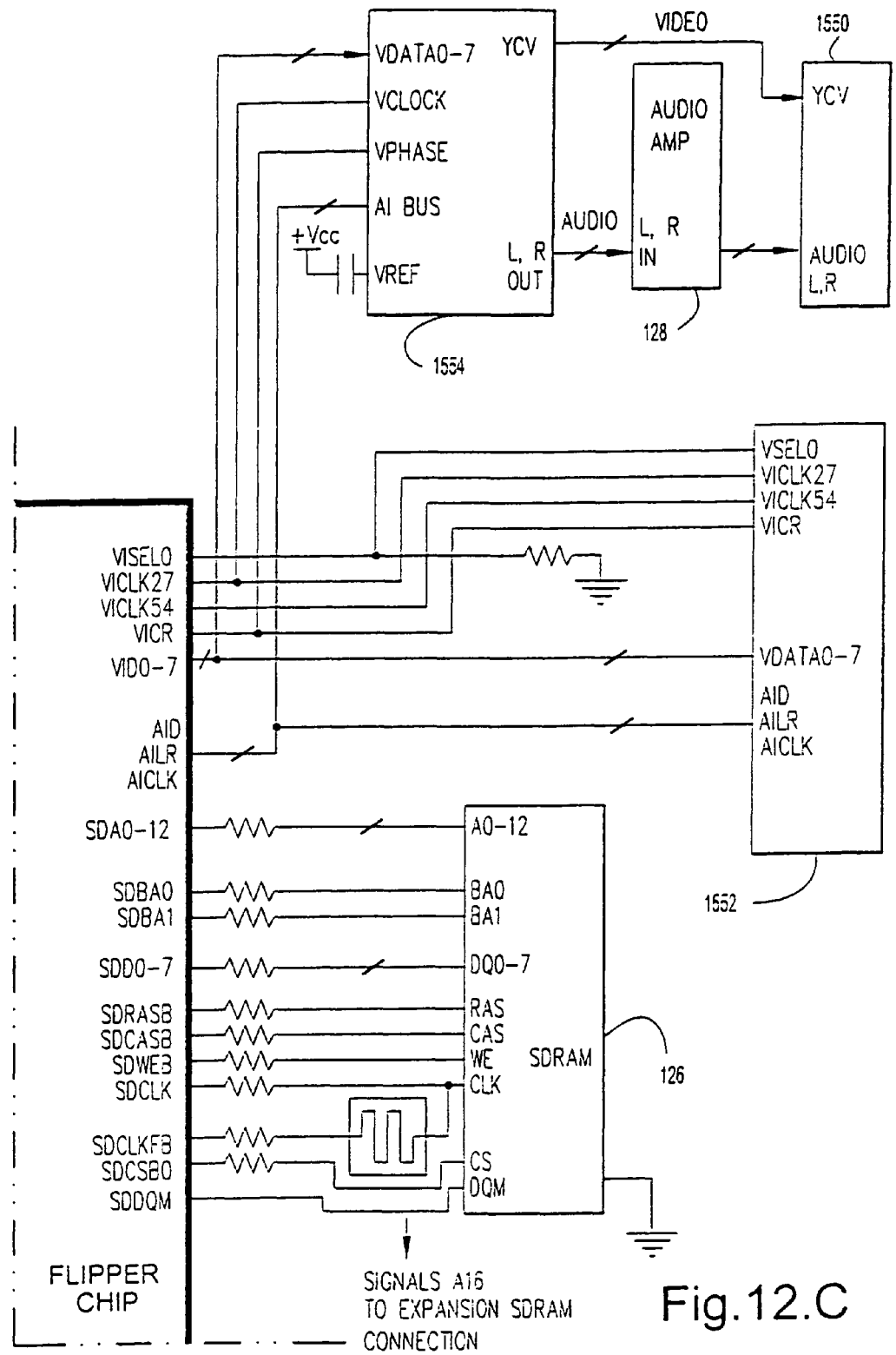
Fig.12.C

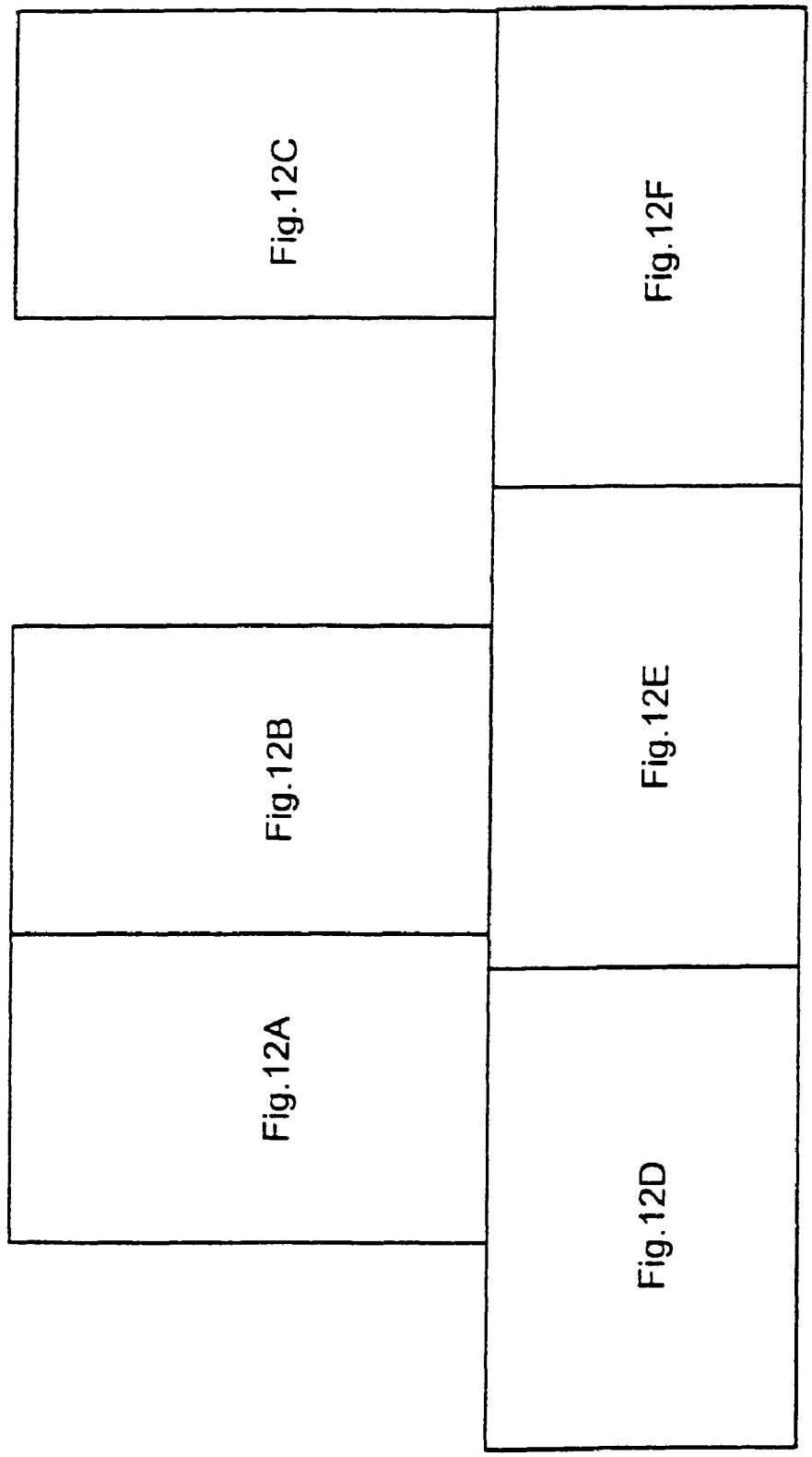

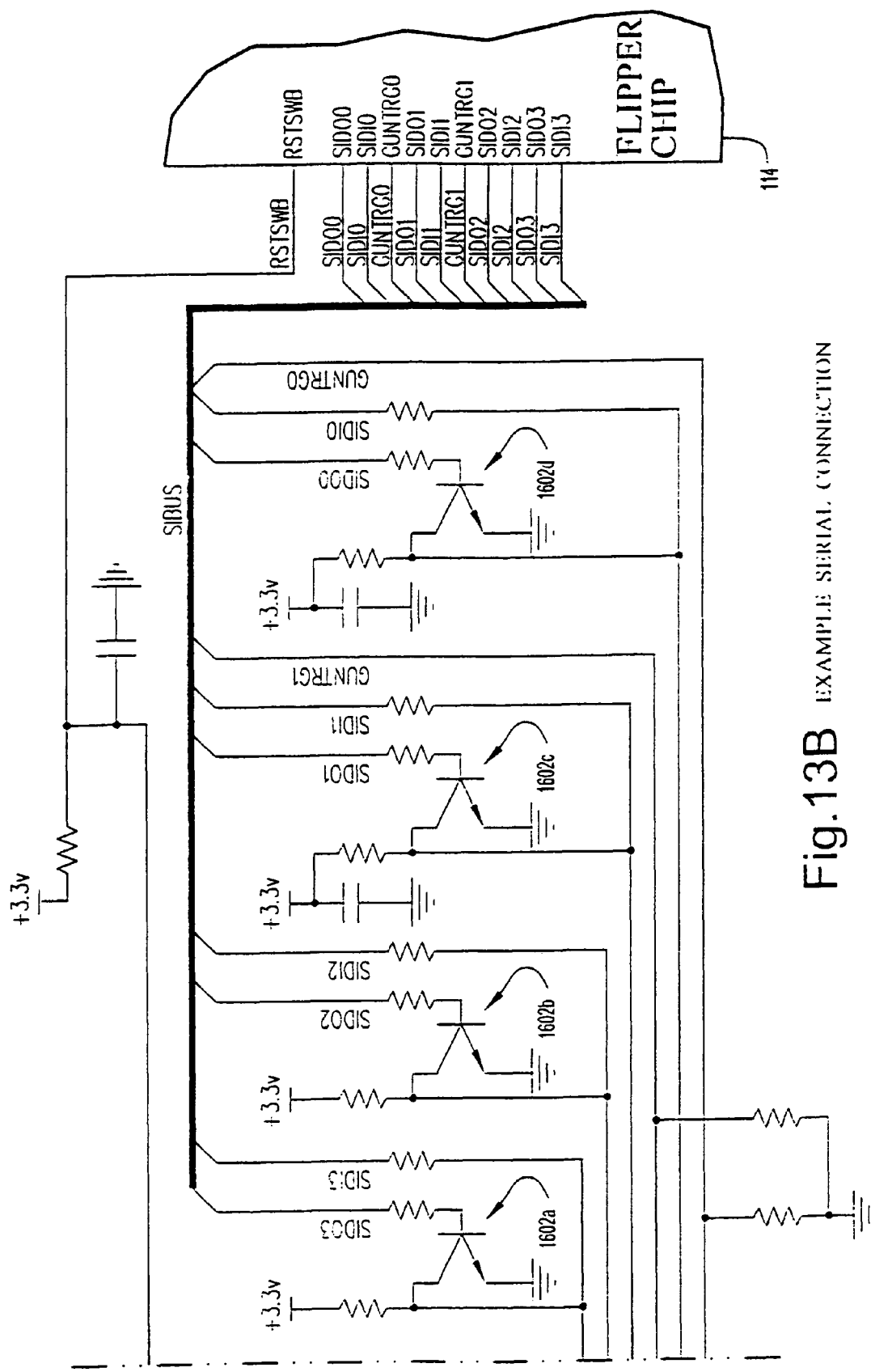
Fig. 13B EXAMPLE SERIAL CONNECTION

EXAMPLE CONTROLLER PORT CONNECTION

EXAMPLE EXTERNAL INTERFACE 0 CONNECTION

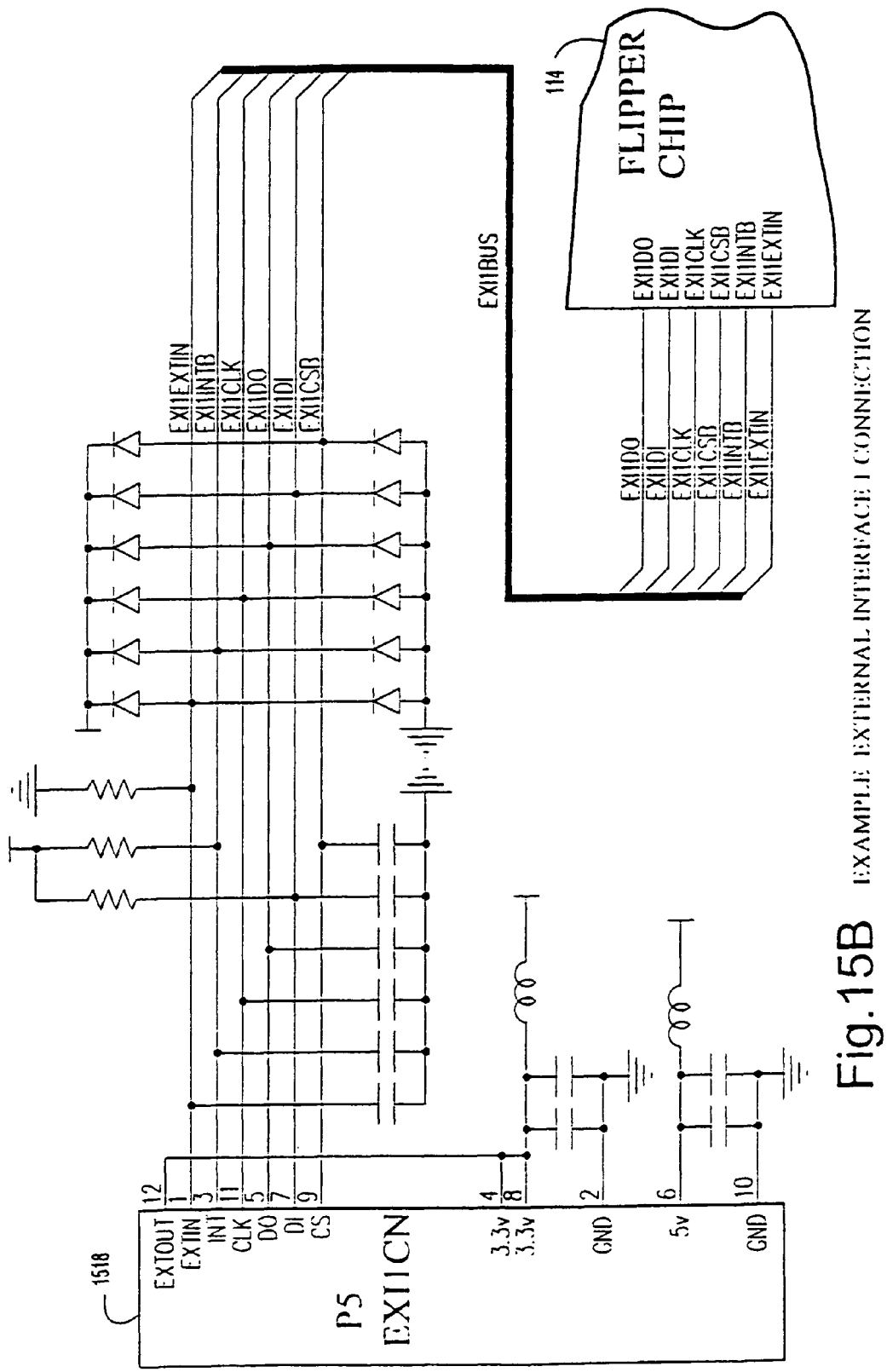
Fig.15B EXAMPLE EXTERNAL INTERFACE 1 CONNECTION

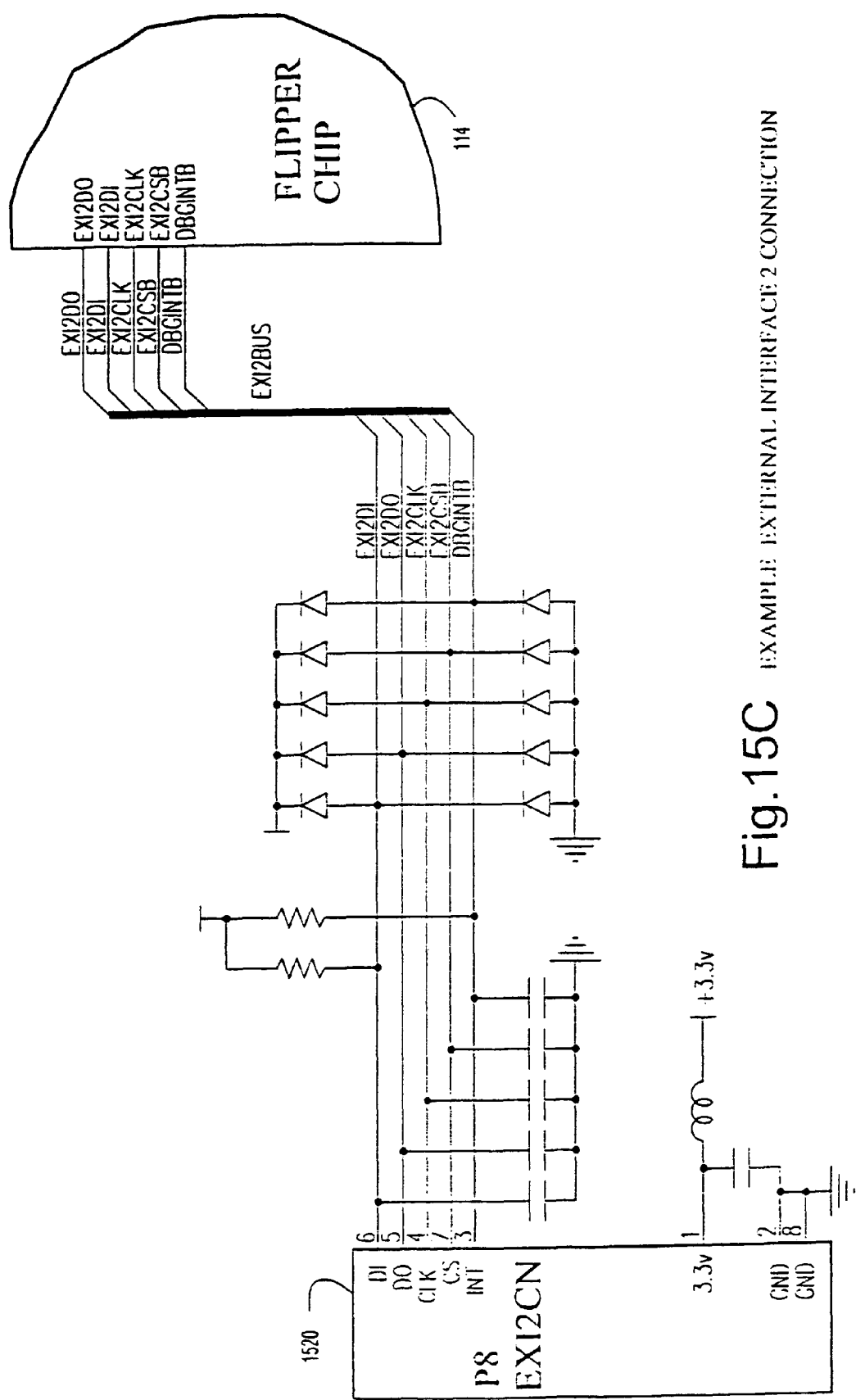
Fig. 15C  EXAMPLE EXTERNAL INTERFACE 2 CONNECTION

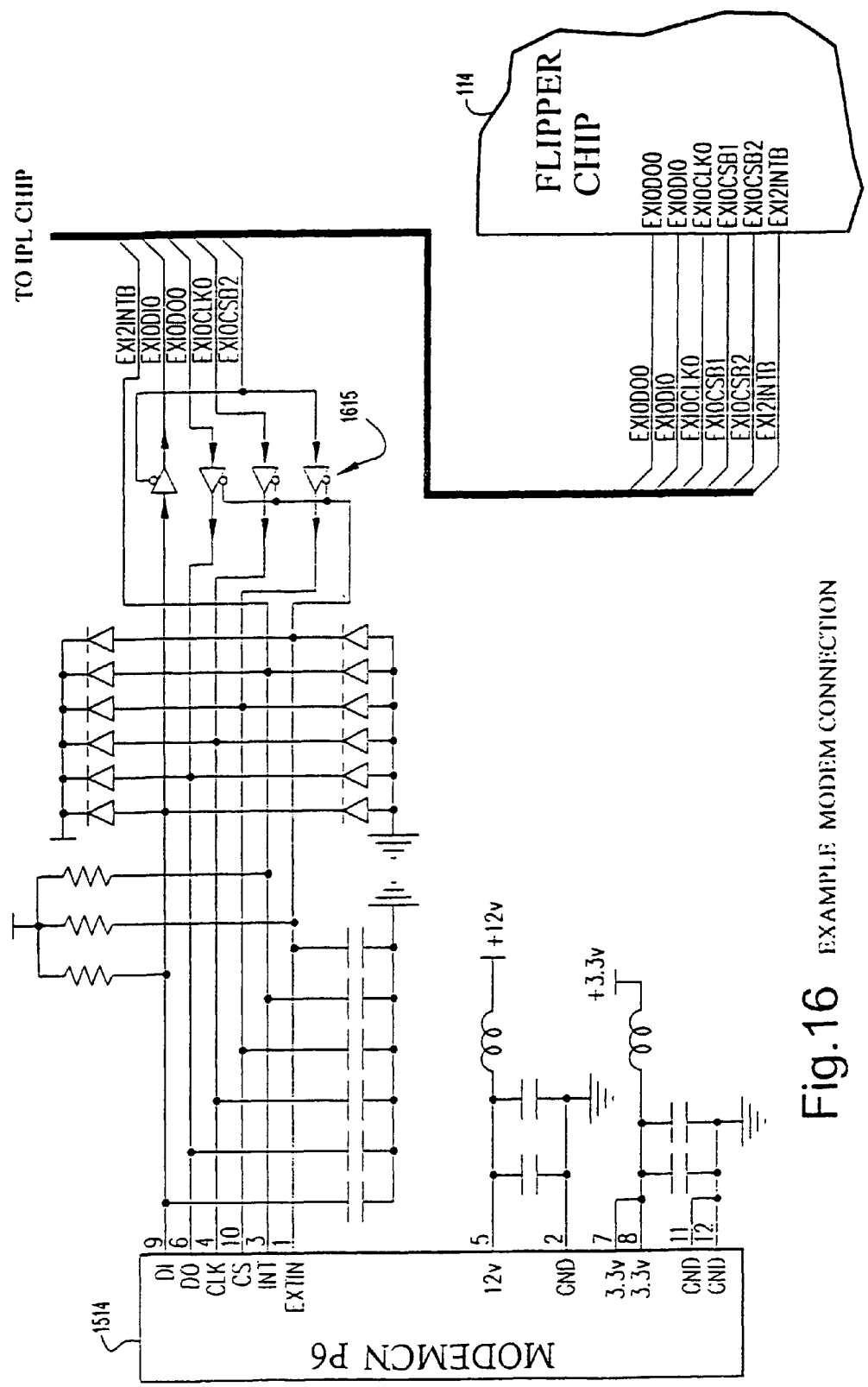
Fig. 16 EXAMPLE MODEM CONNECTION

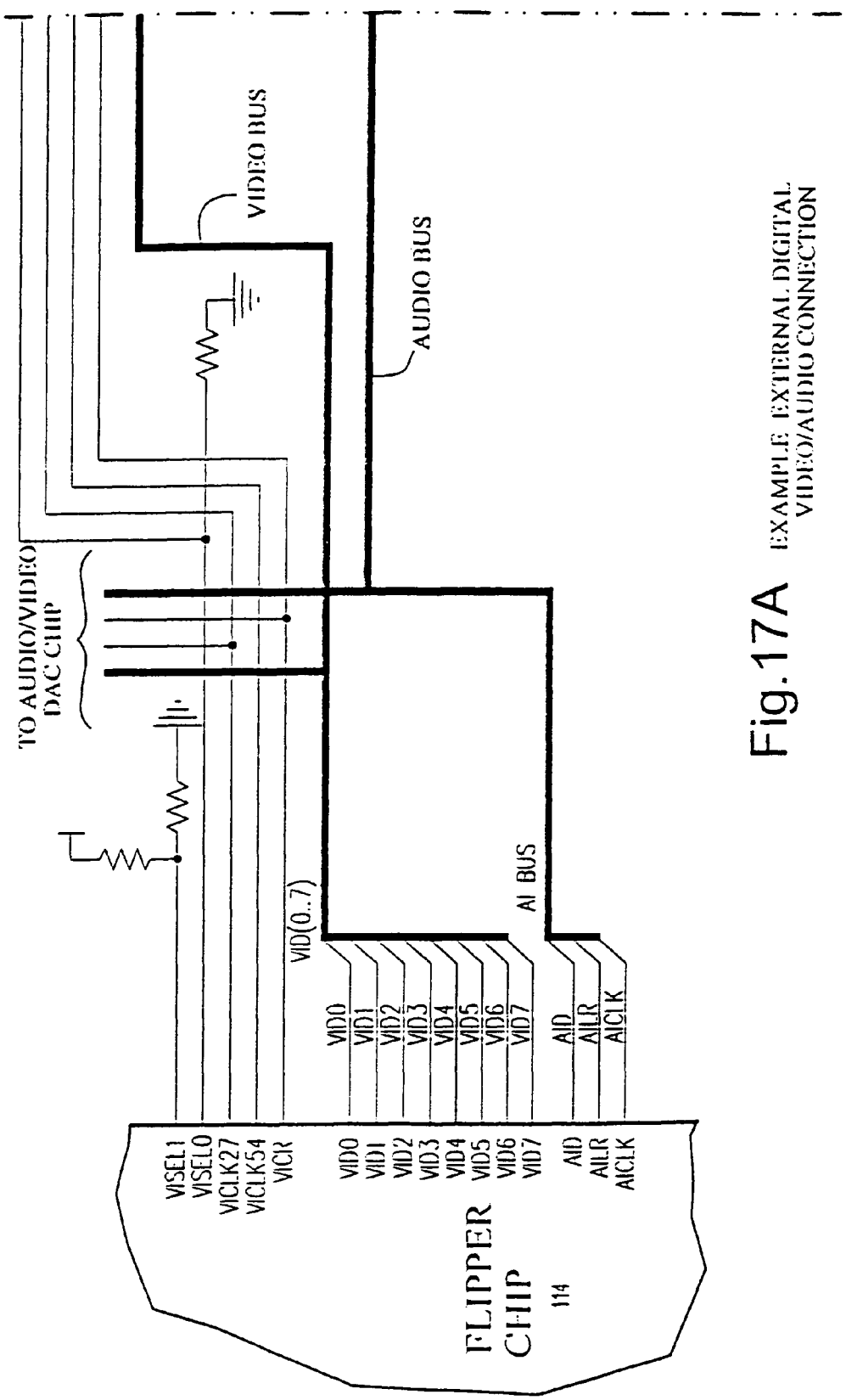
Fig. 17A  EXAMPLE EXTERNAL DIGITAL VIDEO/AUDIO CONNECTION

EXAMPLE EXTERNAL DIGITAL VIDEO/AUDIO CONNECTION

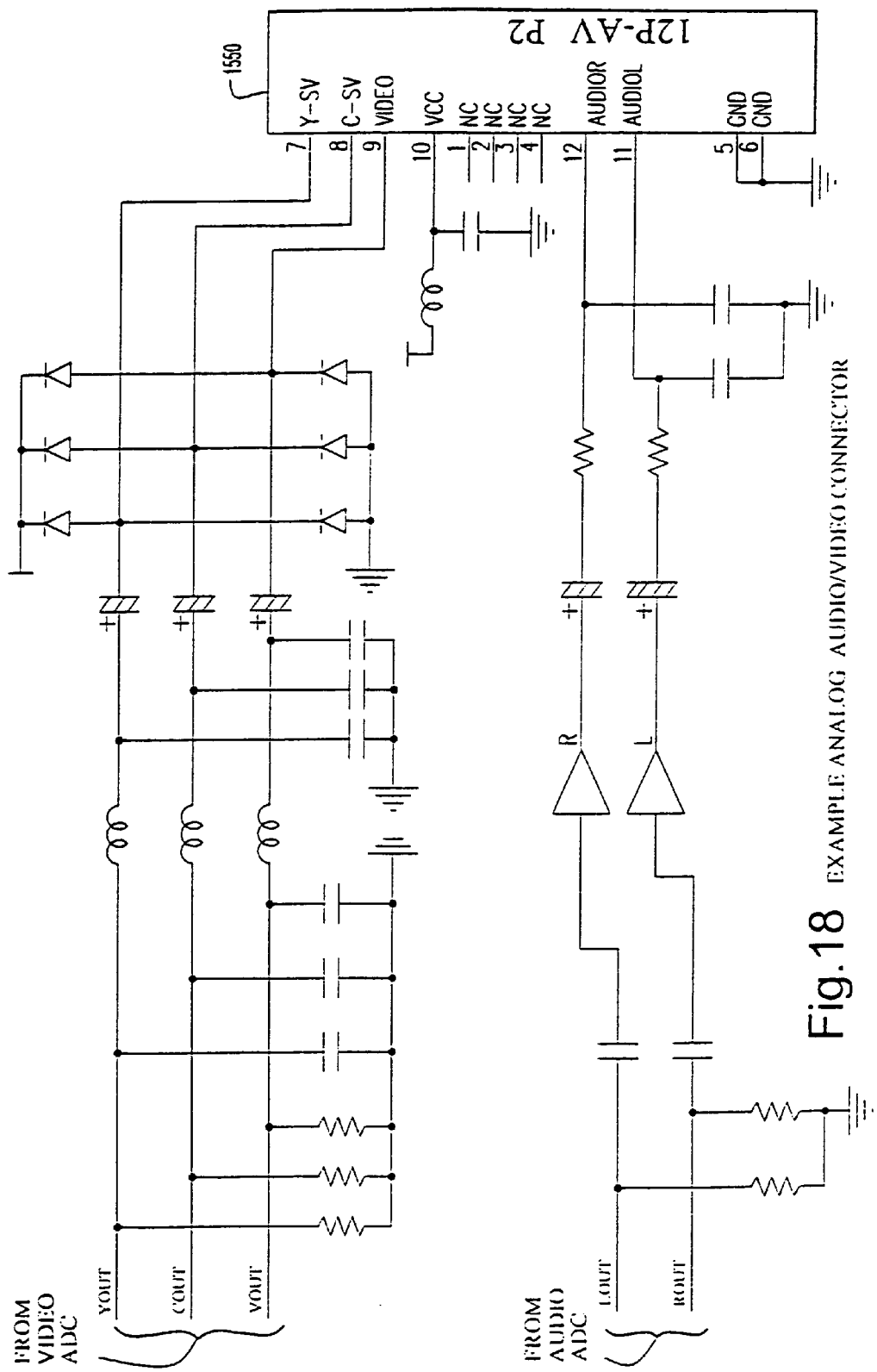
Fig. 18 EXAMPLE ANALOG AUDIO/VIDEO CONNECTOR

EXAMPLE SDRAM EXPANSION CONNECTION

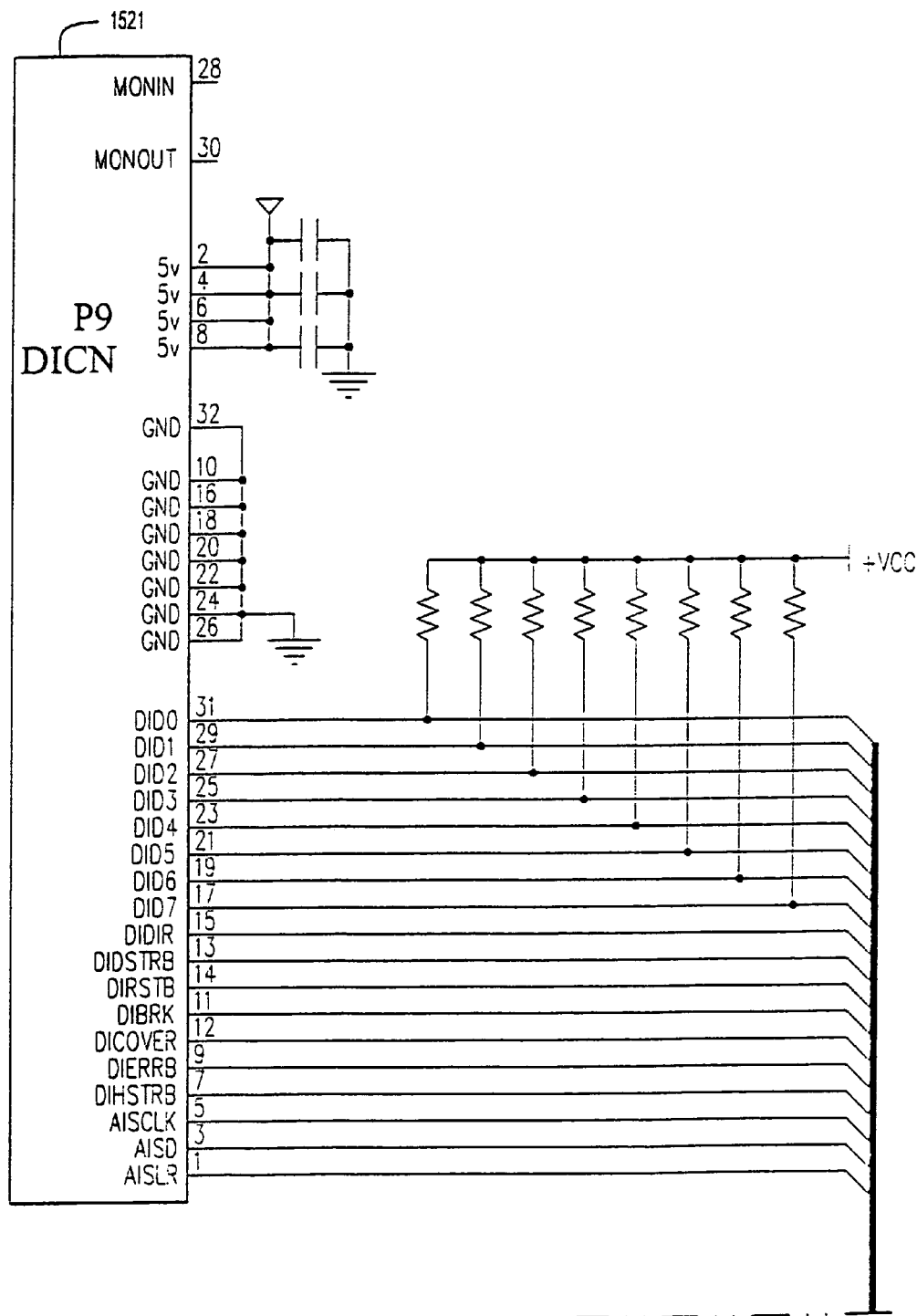
Fig.20A  EXAMPLE DISK DRIVE CONNECTION

EXAMPLE DISK DRIVE CONNECTION

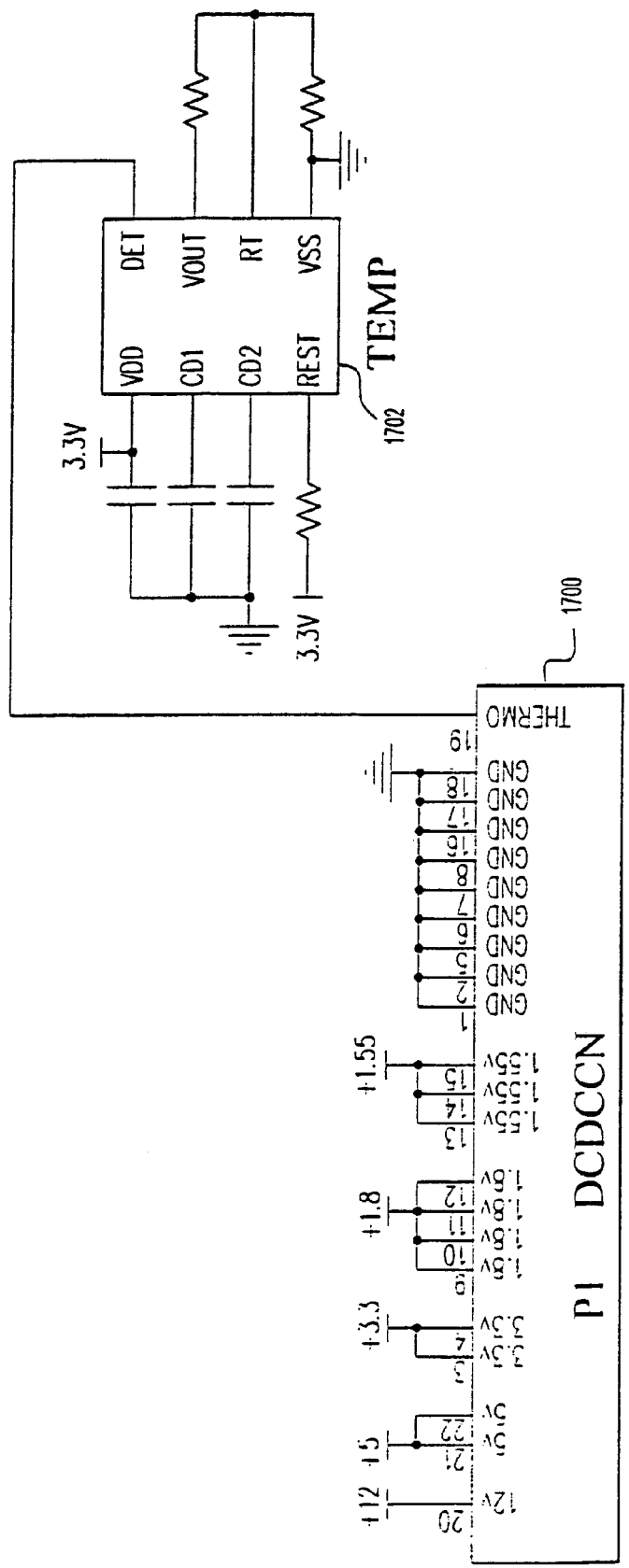
Fig.21 EXAMPLE POWER SUPPLY CONNECTION

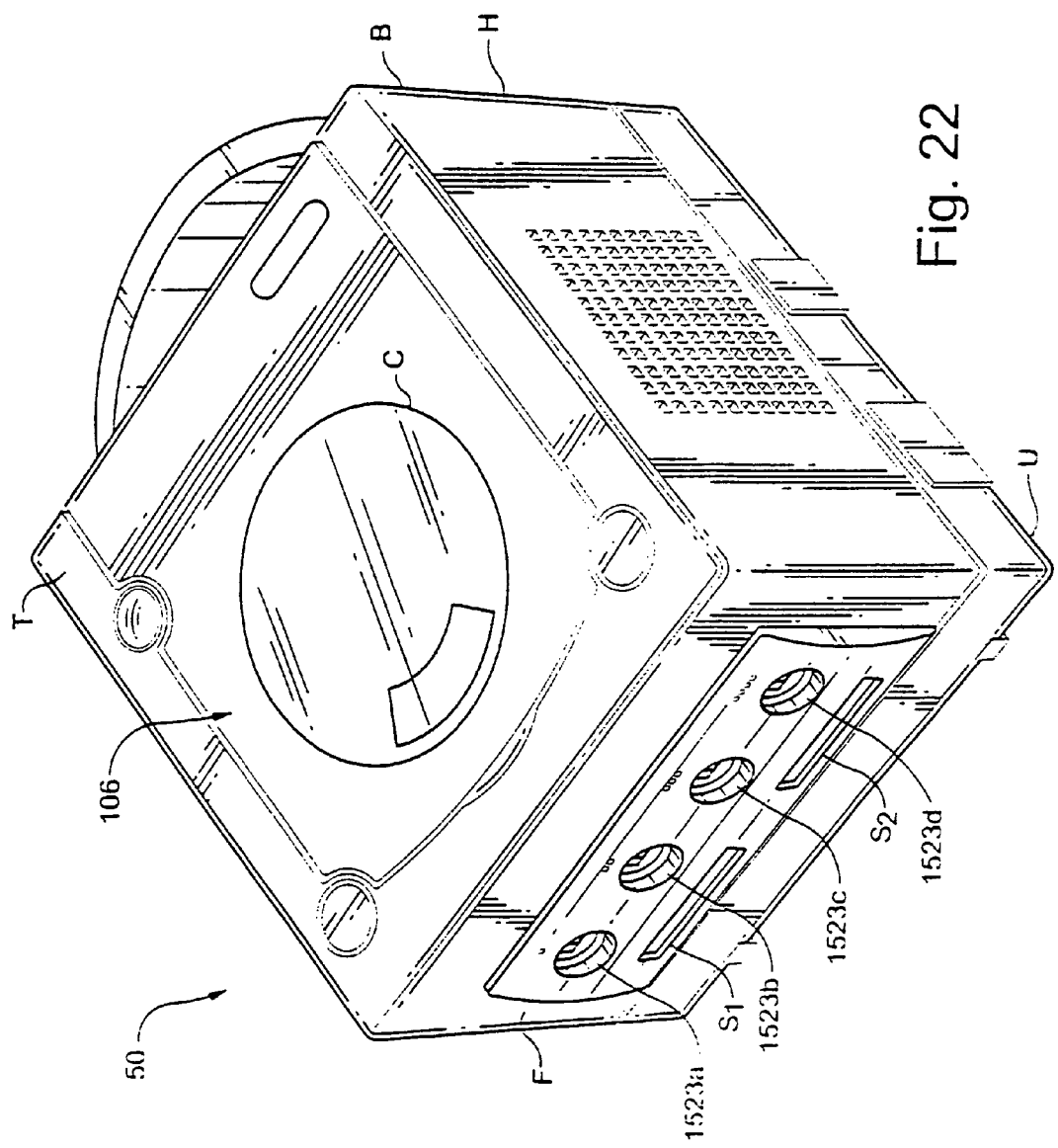

EXTERNAL INTERFACES FOR A 3D GRAPHICS SYSTEM

RELATED APPLICATIONS

This application is a continuation of U.S. patent application Ser. No. 10,600,585, filed Jun. 23, 2003, now U.S. Pat. No. 7,134,960, which is a continuation of application Ser. No. 09/723,335, filed Nov. 28, 2000, now U.S. Pat. No. 6,609,977, which claims the benefit of provisional Application No. 60/226,884, filed Aug. 23, 2000.

This application is related to the following applications identified below, each of which is hereby incorporated herein by reference:

U.S. application Ser. No. 09/722,664 filed Nov. 28, 2000 of Shimuzu et al., entitled "Controller Interface For A Graphics System", now U.S. Pat. No. 6,811,489;

U.S. application Ser. No. 09/723,336 filed Nov. 28, 2000 of Parikh et al. entitled "Application Program Interface for a Graphics System", now U.S. Pat. No. 6,452,600; and Design application Ser. No. 29/128,262 filed Jul. 31, 2000 of Ashida entitled "Video Game Machine", now D453,800.

FIELD OF THE INVENTION

The present invention relates to computer graphics, and more particularly to interactive graphics systems such as home video game platforms. Still more particularly, this invention relates to external system interfaces used to connect a graphics system to audio, video, mass media storage device, other storage device, communications, printing and other electronic devices.

BACKGROUND AND SUMMARY OF THE INVENTION

Many of us have seen films containing remarkably realistic dinosaurs, aliens, animated toys and other fanciful creatures. Such animations are made possible by computer graphics. Using such techniques, a computer graphics artist can specify how each object should look and how it should change in appearance over time, and a computer then models the objects and displays them on a display such as your television or a computer screen. The computer takes care of performing the many tasks required to make sure that each part of the displayed image is colored and shaped just right based on the position and orientation of each object in a scene, the direction in which light seems to strike each object, the surface texture of each object, and other factors.

Because computer graphics generation is complex, computer-generated three-dimensional graphics just a few years ago were mostly limited to expensive specialized flight simulators, high-end graphics workstations and supercomputers. The public saw some of the images generated by these computer systems in movies and expensive television advertisements, but most of us couldn't actually interact with the computers doing the graphics generation. All this has changed with the availability of relatively inexpensive 3D graphics platforms such as, for example, the Nintendo 64® and various 3D graphics cards now available for personal computers. It is now possible to interact with exciting 3D animations and simulations on relatively inexpensive computer graphics systems in your home or office.

A problem graphics system designers confronted in the past was how to efficiently couple system components together. A modern 3D graphics system is relatively complex, and requires a number of different connections between different aspects of the system. For example, it is often necessary to interface with a mass storage device such as an optical disk. In addition, in an interactive real time system such as a gaming platform, some means must be provided to interface with user-manipulable controls such as hand-held controllers or the like. Sound is typically required, so that interfaces with various sound-producing and sound-supporting components are required. It is also necessary to provide some interfacing means for interfacing the system with a display device of an appropriate configuration. Additionally, it is often desirable to interface the system with a number of other components such as, for example, read only memory, flash memory, various memory cards, modems or other network connections, and debugging facilities for game or other application development. Various solutions to this problem were offered.

One approach would be to use standardized interfaces. Computer equipment manufacturers have developed a number of standardized interfaces in the past to connect with mass storage devices, modems, and other peripheral devices. Using standardized interfaces tends to simplify design efforts and achieve component compatibility and interoperability. The typical personal computer has a number of standardized interfaces so it can be modular and compatible with hardware and peripherals designed by a number of different manufacturers. Designing a new personal computer does not require redesign of all of these interfaces.

While the standardized interface approach has certain advantages in the arena of general purpose computing, it may not be suitable for home video game platforms. Because a home video game system must be manufactured at low cost and yet achieve maximum performance, it is desirable to optimize each and every aspect of the system—including the system interfaces. The interfaces can be looked at as the highways over which information flows throughout the system. This information traffic should flow as rapidly and efficiently as possible. Using standard interfaces may be easier from a design standpoint, but a standardized interface may not provide the high performance that a customized interface might offer. "One size fits all" makes things easier, but doesn't always result in the best possible fit.

Another issue relates to hardware interoperability. Standardized interfaces provide the advantage that no one owns them, and everyone can design components that are compatible with them. For example, when you buy a personal computer having a standardized serial interface, parallel interface and expansion device interface, you know that you can go out and purchase any of a variety of different devices all of which will be compatible with those standardized interfaces. You can plug in any of a dozen different types of printers to either the serial or the parallel interface of your personal computer, and they will all work. Similarly, any of dozens of different modems or other network cards can be plugged into the PCMCIA card slot of a personal computer or laptop, and all of these different cards will work.

Open standards have the advantage that they achieve hardware interoperability between systems and a wide range of different accessories. This approach is helpful when the system manufacturer is selling a general purpose device that can be used for virtually any application, but makes less sense in the home video game arena where a given video game manufacturer is responsible for making or licensing all of the various special-purpose accessories for its brand of home video game platform.

For example, video game manufacturers in the past have expended substantial time, effort and resources to develop definitive new home video game platforms. They want to sell as many of these as possible, and therefore price them very competitively. Like the razor manufacturer who recoups his investment by selling razor blades as opposed to the razor itself, video game platform manufacturers rely on controlling access to the installed user base of home video game systems to achieve profits through licensing. If the home video game platform used open standards, then competing manufacturing could bypass the company that invested all the time, effort and resources to develop the platform to begin with, and could instead market directly to consumers. Accordingly, under this business model, it is important for the platform manufacturer to be able to control access to the platform.

One technique used successfully in the past to control access to home video game platforms was to incorporate security systems that control access to the platform. A security system can enable the platform to accept or reject things plugged into it. As one example, it is possible to include an integrated circuit chip authentication type device in home video game cartridges. Before the home video game platform interoperates with the cartridge or other accessory, it may first authenticate the cartridge or other accessory by use of the security chip. While this approach can be highly successful, it requires each accessory to include authentication type information and/or devices. This increases cost. In addition, no security system is impenetrable. Given enough time, effort and resources, any security system can be "cracked" to unlock access to the platform. Thus, further improvements are desirable.

The present invention provides an approach to solving these problems. It provides a variety of proprietary system interfaces that have been optimized to maximize system performance. Because these optimized system interfaces are non-standard and unusual, they provide uniqueness that can be used as a basis for excluding unlicensed and unauthorized people from manufacturing components that are compatible with the interfaces. This allows a home video game platform developer to protect its substantial investment in the development of the platform.

One aspect of the present invention provides a proprietary disk interface for mass storage devices such as optical disks. The disk interface can be used to interface with an optical disk drive using direct memory access with interrupt. The disk interface acts as a transport for command packets sent between a disk drive and a graphics and audio coprocessor. The interface need not interpret the packets. The disk interface provides a number of signal lines including a parallel data bus and various additional signaling lines to provide high speed data transfer and efficiently coordinate operations between the disk drive and the rest of the system.

Another aspect provided by this invention is a serial interface for interfacing an audio and graphics coprocessor with a variety of different types of accessory devices including but not limited to hand-held game controllers. The serial interface provides a single bit serial interface using a state-based interface protocol. The interface supports four separate serial interfaces to four hand-held controllers or associated devices. Each interface can be accessed in parallel. In a controller mode, the last state of the controller is stored in a double-buffered register to support simple main processor reads for determining state. The example embodiment automatically polls controller state using hardware circuitry with configurable polling periods. A bulk mode supports changeable data size. A pair of light gun signals can be used to control separate horizontal/vertical counters to support flash and shutter light guns. An LCD shutter can be supported through automatic polling and a serial control command. The system interface includes automatic control of presence detect to save effort on the part of the main processor.

In accordance with another aspect of this invention, an external accessory device interface(s) is provided for interfacing with a variety of different types of external devices such as, for example, read only memory, flash memory, memory cards, modems, debugging systems or a variety of other devices. The external interface provided in accordance with this invention can be used, for example, to interface with a single chip boot ROM and associated real time clock, as well as to on-board flash memory, an external modem, an external memory card, debugger hardware, or other external devices including but not limited to a voice recognition device. A preferred external interface provides four separate external interface channels. A channel 0 supports both expansion and on-board devices. The entire ROM is memory mapped onto the external interface, and ROM reads can be controlled entirely by hardware for boot support. Separate external interface chip selects can be used to control many different devices (e.g., ROM/RTC, flash memory, expansion modem, expansion backup memory card, debug, etc.). Maskable external interrupts can also be provided—one for each external expansion port. Maskable interrupts may provide transfer complete signaling for each channel. A pair of maskable interrupts can be provided for hot-plug status to detect insertion and removal of external devices. Direct memory access can be used to support general transfers on each channel.

In accordance with yet another aspect provided by this invention, an audio interface provides support for audio functions within a graphics system. The audio/video interface can provide support for an external digital-to-analog converter providing, for example, composite video and 16-bit stereo sound running at a desired sampling rate (e.g., fixed 48 kHz). The interface may also provide an interface for a digital audio and video output and/or input. The collection of audio interfaces may also include a mass storage device streaming audio input interface via, for example, a 16-bit serial bit interface running at a predetermined sampling rate (e.g., 32 kHz or 48 kHz). The sample rate conversion of mass storage device streaming audio can be provided "on the fly." The collection of audio interfaces may also include an audio mixer interface for mixing two audio streams into a final output stream. The audio mixer interface can provide audio volume control, for example, for mixing the mass storage device streaming audio output with audio generated using an internal digital signal processor.

In accordance with yet another aspect of this invention, a video interface provides efficient interfacing between a graphics processor and an external video encoder. The video interface does much of the work required so as to reduce the amount of work the external encoder needs to perform. The video interface also provides a number of interesting additional features such as panning, windowing, light gun support, and color format conversion.

BRIEF DESCRIPTION OF THE DRAWINGS

These and other features and advantages provided by the invention will be better and more completely understood by referring to the following detailed description of presently preferred embodiments in conjunction with the drawings, of which:

FIG. 5 is an example logical flow diagram of the FIG. 4 graphics and audio processor;

FIG. 6 is a block diagram of an example input/output subsystem;

FIG. 7C shows an example disk interface register interface;

FIG. 8C shows example serial interface registers;

FIG. 9E shows example external interface registers;

FIG. 10C shows example audio interface registers;

FIGS. 12A-12G show a detailed example connection diagram;

FIGS. 13A and 13B show an example serial connection;

FIGS. 15A-15C show example external interface connections;

FIG. 16 shows an example modem connection;

FIGS. 17A and 17B show example external digital video/audio connections;

FIG. 18 shows an example analog audio/video connection;

FIGS. 20A and 20B show an example disk drive connection;

FIG. 21 shows an example power supply connection;

FIGS. 22-27, 28A and 28B show external views of an example video game system showing example external connector configurations.

DETAILED DESCRIPTION OF EXAMPLE EMBODIMENTS OF THE INVENTION

Figure 1:
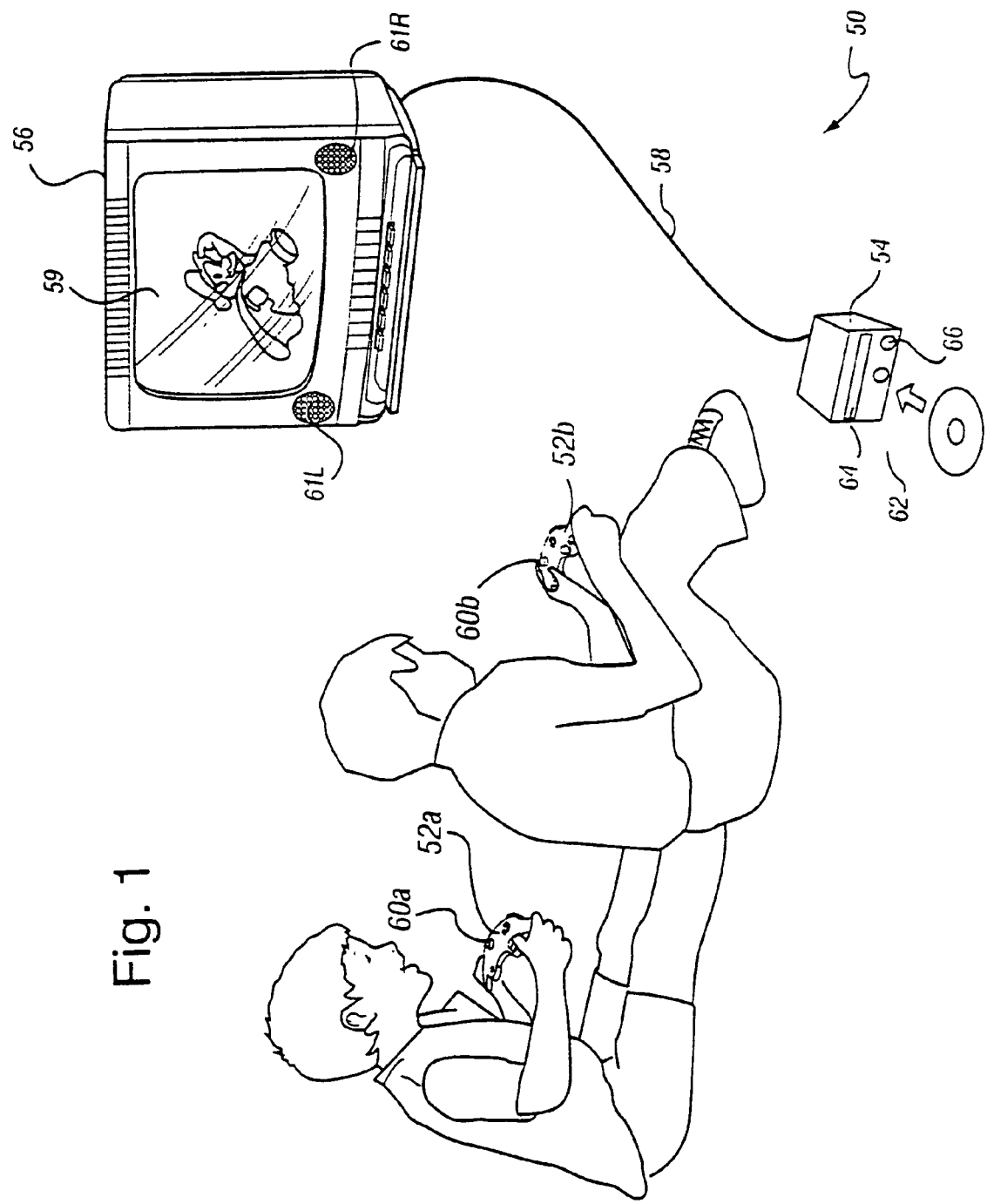
FIG. 1 is an overall view of an example interactive computer graphics system.

FIG. 1 shows an example interactive 3D computer graphics system 50. System 50 can be used to play interactive 3D video games with interesting stereo sound. It can also be used for a variety of other applications.

In this example, system 50 is capable of processing, interactively in real time, a digital representation or model of a three-dimensional world. System 50 can display some or all of the world from any arbitrary viewpoint. For example, system 50 can interactively change the viewpoint in response to real time inputs from handheld controllers 52a, 52b or other input devices. This allows the game player to see the world through the eyes of someone within or outside of the world. System 50 can be used for applications that do not require real time 3D interactive display (e.g., 2D display generation and/or non-interactive display), but the capability of displaying quality 3D images very quickly can be used to create very realistic and exciting game play or other graphical interactions.

To play a video game or other application using system 50, the user first connects a main unit 54 to his or her color television set 56 or other display device by connecting a cable 58 between the two. Main unit 54 produces both video signals and audio signals for controlling color television set 56. The video signals are what control the images displayed on the television screen 59, and the audio signals are played back as sound through television stereo loudspeakers 61L, 61R.

The user also needs to connect main unit 54 to a power source. This power source may be a conventional AC adapter (not shown) that plugs into a standard home electrical wall socket and converts the house current into a lower DC voltage signal suitable for powering the main unit 54. Batteries could be used in other implementations.

The user may use hand controllers 52a, 52b to control main unit 54. Controls 60 can be used, for example, to specify the direction (up or down, left or right, closer or further away) that a character displayed on television 56 should move within a 3D world. Controls 60 also provide input for other applications (e.g., menu selection, pointer/cursor control, etc.). Controllers 52 can take a variety of forms. In this example, controllers 52 shown each include controls 60 such as joysticks, push buttons and/or directional switches. Controllers 52 may be connected to main unit 54 by cables or wirelessly via electromagnetic (e.g., radio or infrared) waves.

To play an application such as a game, the user selects an appropriate storage medium 62 storing the video game or other application he or she wants to play, and inserts that storage medium into a slot 64 in main unit 54. Storage medium 62 may, for example, be a specially encoded and/or encrypted optical and/or magnetic disk. The user may operate a power switch 66 to turn on main unit 54 and cause the main unit to begin running the video game or other application based on the software stored in the storage medium 62. The user may operate controllers 52 to provide inputs to main unit 54. For example, operating a control 60 may cause the game or other application to start. Moving other controls 60 can cause animated characters to move in different directions or change the user's point of view in a 3D world. Depending upon the particular software stored within the storage medium 62, the various controls 60 on the controller 52 can perform different functions at different times.

Example Electronics of Overall System

Figure 2:
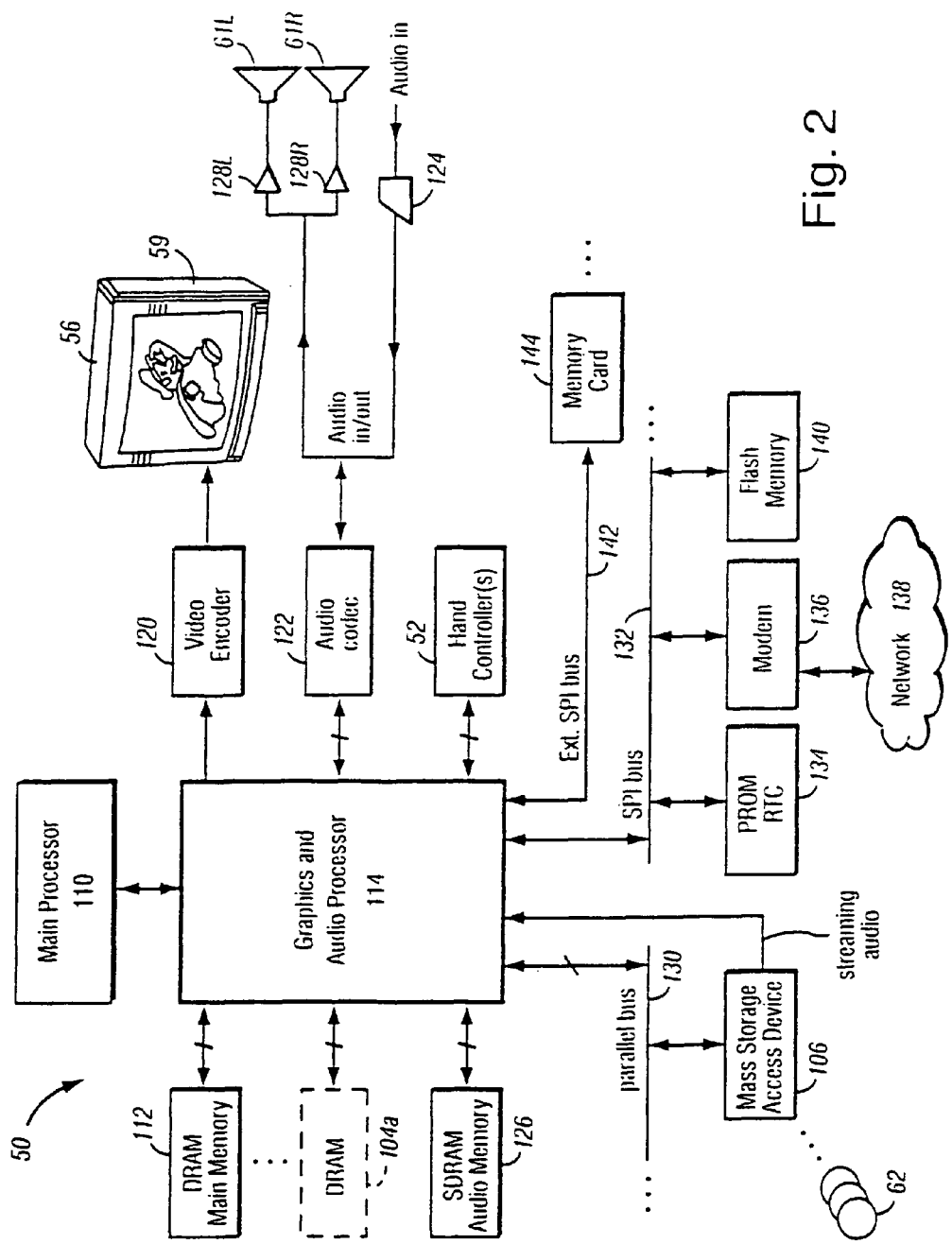
FIG. 2 is a block diagram of the FIG. 1 example computer graphics system.

FIG. 2 shows a block diagram of example components of system 50. The primary components include:
 a main processor (CPU) 110,
 a main memory 112, and
 a graphics and audio processor 114.

In this example, main processor 110 (e.g., an enhanced IBM Power PC 750) receives inputs from handheld controllers 52 (and/or other input devices) via graphics and audio processor 114. Main processor 110 interactively responds to user inputs, and executes a video game or other program supplied, for example, by external storage media 62 via a mass storage access device 106 such as an optical disk drive. As one example, in the context of video game play, main processor 110 can perform collision detection and animation processing in addition to a variety of interactive and control functions.

In this example, main processor 110 generates 3D graphics and audio commands and sends them to graphics and audio processor 114. The graphics and audio processor 114 processes these commands to generate interesting visual images on display 59 and interesting stereo sound on stereo loudspeakers 61R, 61L or other suitable sound-generating devices.

Example system 50 includes a video encoder 120 that receives image signals from graphics and audio processor 114 and converts the image signals into analog and/or digital video signals suitable for display on a standard display device such as a computer monitor or home color television set 56. System 100 also includes an audio codec (compressor/decompressor) 122 that compresses and decompresses digitized audio signals and may also convert between digital and analog audio signaling formats as needed. Audio codec 122 can receive audio inputs via a buffer 124 and provide them to graphics and audio processor 114 for processing (e.g., mixing with other audio signals the processor generates and/or receives via a streaming audio output of mass storage access device 106). Graphics and audio processor 114 in this example can store audio related information in an audio memory 126 that is available for audio tasks. Graphics and audio processor 114 provides the resulting audio output signals to audio codec 122 for decompression and conversion to analog signals (e.g., via buffer amplifiers 128L, 128R) so they can be reproduced by loudspeakers 61L, 61R.

Graphics and audio processor 114 has the ability to communicate with various additional devices that may be present within system 100. For example, a parallel digital bus 130 may be used to communicate with mass storage access device 106 and/or other components. A serial peripheral bus 132 may communicate with a variety of peripheral or other devices including, for example:

- a programmable read-only memory (PROM) and/or real time clock (RTC) 134,
- a modem 136 or other networking interface (which may in turn connect system 100 to a telecommunications network 138 such as the Internet or other digital network from/to which program instructions and/or data can be downloaded or uploaded), and
- flash memory 140.

A further external serial bus 142 may be used to communicate with additional expansion memory 144 (e.g., a memory card) or other devices. Connectors may be used to connect various devices to busses 130, 132, 142.

Example Graphics and Audio Processor

Figure 3:
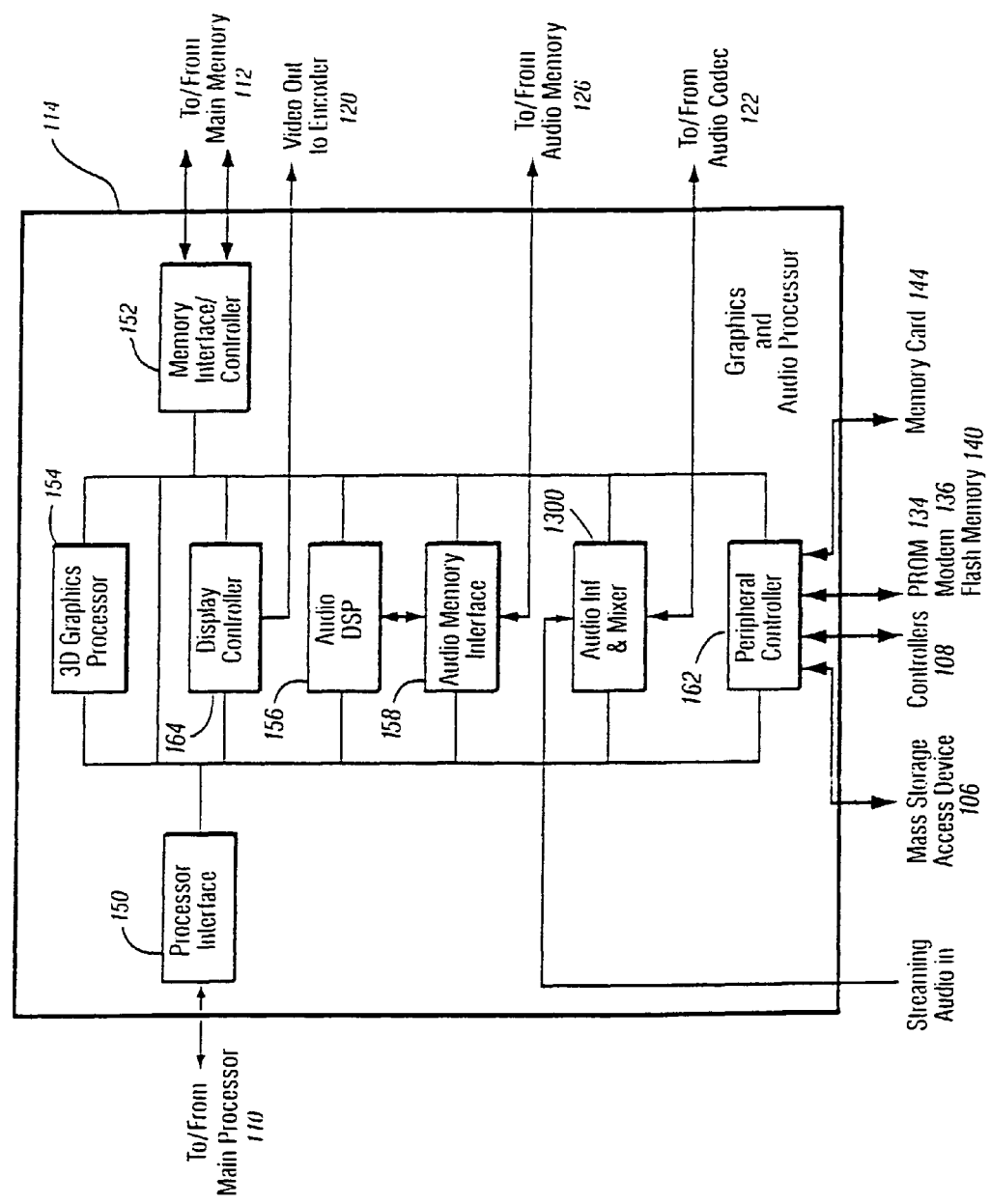
FIG. 3 is a block diagram of the example graphics and audio processor shown in FIG. 2.

FIG. 3 is a block diagram of an example graphics and audio processor 114. Graphics and audio processor 114 in one example may be a single-chip ASIC (application specific integrated circuit). In this example, graphics and audio processor 114 includes:

- a processor interface 150,
- a memory interface/controller 152,
- a 3D graphics processor 154.
- an audio digital signal processor (DSP) 156,
- an audio memory interface 158,
- an audio interface and mixer 1300,
- a peripheral controller 162, and
- a display controller 164.

3D graphics processor 154 performs graphics processing tasks. Audio digital signal processor 156 performs audio processing tasks. Display controller 164 accesses image information from main memory 112 and provides it to video encoder 120 for display on display device 56. Audio interface and mixer 1300 interfaces with audio codec 122, and can also mix audio from different sources (e.g., streaming audio from mass storage access device 106, the output of audio DSP 156, and external audio input received via audio codec 122). Processor interface 150 provides a data and control interface between main processor 110 and graphics and audio processor 114.

Memory interface 152 provides a data and control interface between graphics and audio processor 114 and memory 112. In this example, main processor 110 accesses main memory 112 via processor interface 150 and memory interface 152 that are part of graphics and audio processor 114. Peripheral controller 162 provides a data and control interface between graphics and audio processor 114 and the various peripherals mentioned above. Audio memory interface 158 provides an interface with audio memory 126.

Example Graphics Pipeline

Figure 4:
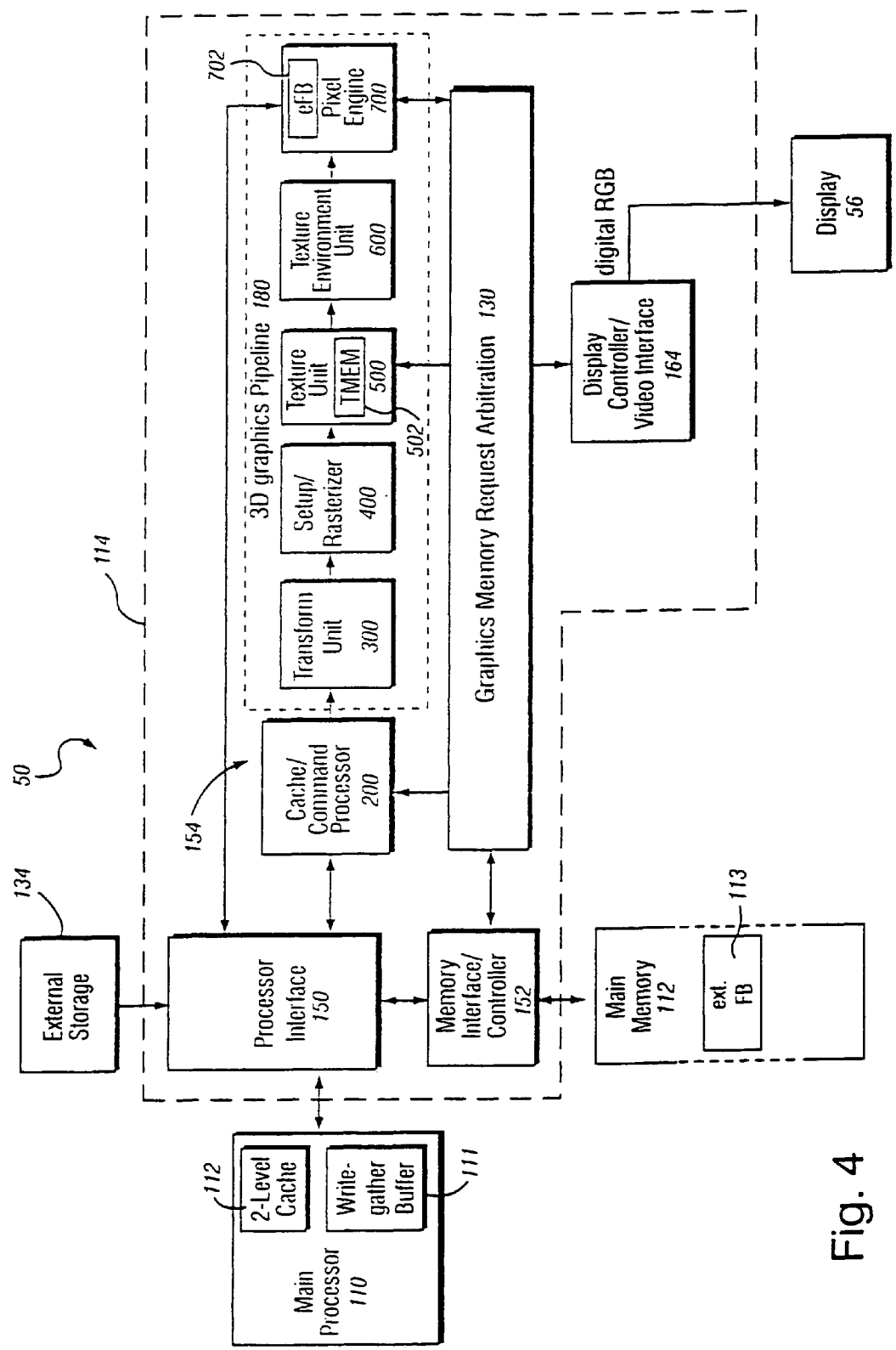
FIG. 4 is a block diagram of the example 3D graphics processor shown in FIG. 3.

FIG. 4 shows a more detailed view of an example 3D graphics processor 154. 3D graphics processor 154 includes, among other things, a command processor 200 and a 3D graphics pipeline 180. Main processor 110 communicates streams of data (e.g., graphics command streams and display lists) to command processor 200. Main processor 110 has a two-level cache 115 to minimize memory latency, and also has a write-gathering buffer 111 for uncached data streams targeted for the graphics and audio processor 114. The write-gathering buffer 111 collects partial cache lines into full cache lines and sends the data out to the graphics and audio processor 114 one cache line at a time for maximum bus usage.

Command processor 200 receives display commands from main processor 110 and parses them—obtaining any additional data necessary to process them from shared memory 112. The command processor 200 provides a stream of vertex commands to graphics pipeline 180 for 2D and/or 3D processing and rendering. Graphics pipeline 180 generates images based on these commands. The resulting image information may be transferred to main memory 112 for access by display controller/video interface unit 164—which displays the frame buffer output of pipeline 180 on display 56.

FIG. 5 is a logical flow diagram of graphics processor 154. Main processor 110 may store graphics command streams 210, display lists 212 and vertex arrays 214 in main memory 112, and pass pointers to command processor 200 via bus interface 150. The main processor 110 stores graphics commands in one or more graphics first-in-first-out (FIFO) buffers 210 it allocates in main memory 110. The command processor 200 fetches:

- command streams from main memory 112 via an on-chip FIFO memory buffer 216 that receives and buffers the graphics commands for synchronization/flow control and load balancing,
- display lists 212 from main memory 112 via an on-chip call FIFO memory buffer 218, and
- vertex attributes from the command stream and/or from vertex arrays 214 in main memory 112 via a vertex cache 220.

Command processor 200 performs command processing operations 200*a* that convert attribute types to floating point format, and pass the resulting complete vertex polygon data to graphics pipeline 180 for rendering/rasterization. A programmable memory arbitration circuitry 130 (see FIG. 4) arbitrates access to shared main memory 112 between graphics pipeline 180, command processor 200 and display controller/video interface unit 164.

FIG. 4 shows that graphics pipeline 180 may include:

- a transform unit 300,
- a setup/rasterizer 400,
- a texture unit 500,
- a texture environment unit 600, and
- a pixel engine 700.

Transform unit 300 performs a variety of 2D and 3D transform and other operations 300a (see FIG. 5). Transform unit 300 may include one or more matrix memories 300b for storing matrices used in transformation processing 300a. Transform unit 300 transforms incoming geometry per vertex from object space to screen space; and transforms incoming texture coordinates and computes projective texture coordinates (300c). Transform unit 300 may also perform polygon clipping/culling 300d. Lighting processing 300e also performed by transform unit 300b provides per vertex lighting computations for up to eight independent lights in one example embodiment. Transform unit 300 can also perform texture coordinate generation (300c) for embossed type bump mapping effects, as well as polygon clipping/culling operations (300d).

Setup/rasterizer 400 includes a setup unit which receives vertex data from transform unit 300 and sends triangle setup information to one or more rasterizer units (400b) performing edge rasterization, texture coordinate rasterization and color rasterization.

Texture unit 500 (which may include an on-chip texture memory (TMEM) 502) performs various tasks related to texturing including for example:
  retrieving textures 504 from main memory 112,
  texture processing (500a) including, for example, multi-texture handling, post-cache texture decompression, texture filtering, embossing, shadows and lighting through the use of projective textures, and BLIT with alpha transparency and depth,
  bump map processing for computing texture coordinate displacements for bump mapping, pseudo texture and texture tiling effects (500b), and
  indirect texture processing (500c).

Texture unit 500 outputs filtered texture values to the texture environment unit 600 for texture environment processing (600a). Texture environment unit 600 blends polygon and texture color/alpha/depth, and can also perform texture fog processing (600b) to achieve inverse range based fog effects. Texture environment unit 600 can provide multiple stages to perform a variety of other interesting environment-related functions based for example on color/alpha modulation, embossing, detail texturing, texture swapping, clamping, and depth blending.

Pixel engine 700 performs depth (z) compare (700a) and pixel-blending (700b). In this example, pixel engine 700 stores data into an embedded (on-chip) frame buffer memory 702. Graphics pipeline 180 may include one or more embedded DRAM memories 702 to store frame buffer and/or texture information locally. Z compares 700a' can also be performed at an earlier stage in the graphics pipeline 180 depending on the rendering mode currently in effect (e.g., z compares can be performed earlier if alpha blending is not required). The pixel engine 700 includes a copy operation 700c that periodically writes on-chip frame buffer 702 to memory portion 113 of main memory 112 for access by display/video interface unit 164. This copy operation. 700c can also be used to copy embedded frame buffer 702 contents to textures in the main memory 112 for dynamic texture synthesis effects. Anti-aliasing and other filtering can be performed during the copy-out operation. The frame buffer output of graphics pipeline 180 (which is ultimately stored in main memory 112) is read each frame by display/video interface unit 164. Display controller/video interface 164 provides digital RGB pixel values for display on display 56.

Example Input/Output Subsystem

FIG. 6 shows an example input/output subsystem. In this example, the input/output subsystem includes a serial interface 1000, an external interface 1100, a disk interface 1200 and an audio interface 1300. Serial interface 1000 is used to communicate with controllers 52 or other devices that can be coupled to one of four serial ports of system 50. External interface 1100 is used to communicate with a variety of devices such as PROM RTC 134, modem 136, flash memory 140, memory card 144, etc. via various SPI buses 132, 142. Disk interface 1200 is used to communicate with mass storage access device 106 via a parallel bus 130. Audio interface 1300 is used to stream the audio output data from an audio buffer in main memory 112 to audio codec 122.

In the example embodiment, the external interface 1100 and disk interface 1200 have direct access to memory controller 152 via a bus 900. Details of the operation of memory controller 152 may be found in application Ser. No. 09/726,220, filed Nov. 28, 2000 entitled "Graphics Processing System with Enhanced Memory Controller" and application Ser. No. 09/722,665, filed Nov. 28, 2000 entitled "Method and Apparatus for Accessing Shared Resources." The contents of each of these applications are incorporated herein by reference. In addition, each one of interfaces 1000, 1100, 1200 and 1300 as well as audio digital signal processor 156 share a common bus 902 used to communicate between these components and a bus interface 904. The bus interface 904, in turn, can be used to arbitrate access to graphics unit 180 including embedded DRAM 702. In the example embodiment, there is also a connection 906 between DSP 156 and audio interface 1300.

Briefly, disk interface 1200 provides an interface to mass storage access device 106 providing a direct memory access capability with interrupt. Serial interface 1000 provides a serial interface to hand controllers 52 or other serial devices using automatic controller polling and bulk data mode including a light gun interface. The external interface 1100 provides multiple serial peripheral interface (SPI) buses as well as a memory mapped area for boot PROM 134. Audio interface 1300 provides an output to audio codec 122 as well as an input for streaming audio from mass storage access device 106. These various interfaces 1000, 1100, 1200, 1300 provide a shared memory port for direct memory access, with round robin arbitration for access to main memory.

Example Disk Interface

Figure 7A:
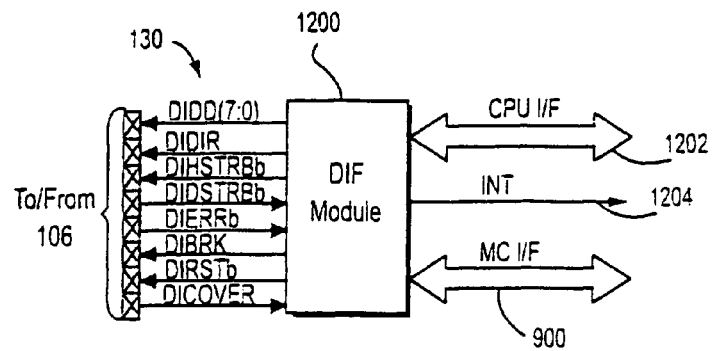
FIGS. 7A and 7B show an example disk interface.

FIG. 7A shows the external interface of disk interface 1200. In the example embodiment, bus 130 to/from disk interface 1200 is connected directed to mass storage access device 106 (which in the example embodiment may comprise an optical disk drive). In the example embodiment, bus 130 is a parallel bus having a single device on it, with disk interface 1200 being the only master and the mass storage access device 106 being the only target device. Disk interface 1200 communicates with main processor 110 via a SPU interface 1202 and an interrupt line 1204, and communicates with memory controller 152 via memory controller interface 900.

Figure 7B:
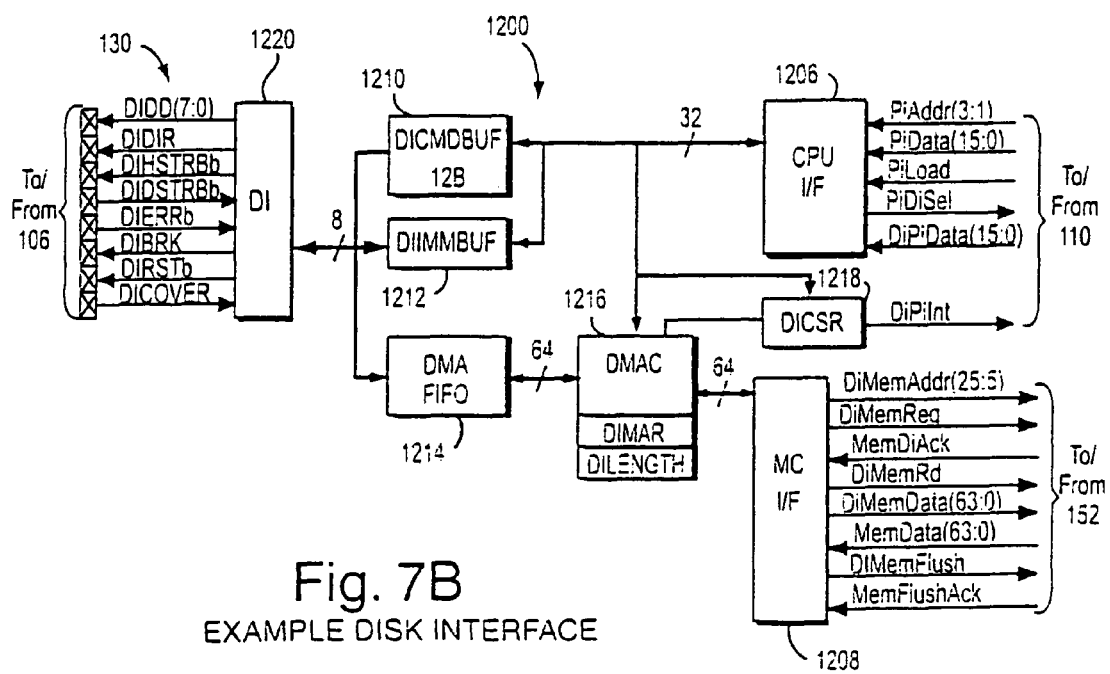

FIG. 7B shows a more detailed block diagram of an example disk interface 1200. In this example, disk interface 1200 includes a CPU interface block 1206, a memory controller interface block 1208, and various buffers including a buffer 1210, a buffer 1212, a DMA FIFO 1214, a direct memory access controller 1216, and an interrupt register 1218. In addition, disk interface 1200 includes a disk interface buffer 1220 for communicating with mass storage access device 106 via bus 130.

In the example embodiment, disk interface 1200 works primarily on a command packet and direct memory access basis. The disk interface 1200 operates as a transport for command packets sent to mass storage access device 106, and does not actually interpret the packets themselves. Operating on a packet basis allows the development of packet commands and the mechanism for mass storage access device 106 to be completed separately from the development of the actual physical interface provided by disk interface 1200.

Disk interface 1200 distinguishes between packets that comprise direct memory access commands and packets that comprise immediate commands. Direct memory access commands in the example embodiment begin with a command packet and then cause data to be sent to/from main memory 112 using direct memory access under control of direct memory access controller 1216. Immediate commands in the example embodiment begin with a command packet and result in data being transferred to/from the disk interface immediate data buffer 1212. Disk interface 1200 in the example embodiment includes the following features:

- support for direct memory access mode commands,
- support for immediate mode access register command,
- direct memory access to/from main memory 112 on 32 byte boundaries/32 byte length,
- break signal to interrupt current command,
- maskable interrupt on transaction complete,
- maskable interrupt on error received from mass storage access device 106,
- 25 megabyte per second parallel interface to mask storage access device 106,
- both read and write commands (including BMA supported),
- bulk data transfer for debug.

As shown in FIGS. 7A and 7B, parallel bus 130 from disk interface 1200 to mass storage access device 106 includes the following signals:

- a bi-directional, 8-bit wide parallel path DIDD,
- a signal DIDIR from disk interface 1200 to mass storage access device 106,
- a DIHSTRBb signal from disk interface 1200 to mass storage access device 106,
- a DIDSTRBb signal from mass storage access device 106 to disk interface 1200,
- a DIERR signal from mass storage access device 106 to disk interface 1200,
- a DIBRK bi-directional signal between disk interface 1200 and mass storage access device 106,
- a DIRSTb signal from disk interface 1200 to mass storage access device 106,
- a DICOVER signal from mass storage access device 106 to disk interface 1200.

The following describes the various signals:

| Name | Dir | Type | Description |
|---|---|---|---|
| DIDD[7:0] | I/O | LVCMOS | DI Data: DI Data bus. Depending upon the DIDR (Direction) signal, the data bus is driven by main processor 110 or mass storage access device. When main processor 110 is writing data the signals are outputs and the data should be latched by the mass storage access device 106 on the rising edge of the DIHSTRBn signal. When main processor 110 is reading data from the mass storage access device 106, the DIDD[7:0] signals are inputs and the data should be latched on the rising edge of the DIDSTRBn signal.<br>During reset, this bus can be used for latching in the configuration. It is implemented as 8 bit transparent latches controlled by sync reset and they sample the reset state of the DIDD bus and hold the state on the rising edge of the sync resetb. Currently, bit 0 is used for ROM scramble disable, bits 1-7 are reserved. |
| DIDIR | O | LVCMOS | DI Direction: This signal controls the current direction of the DIDD[7:0] data bus.<br>DIDR   Direction<br>0   DI → mass storage access device 106 (DIDD[7:0] are outputs).<br>1   mass access storage device 106 → DI (DIDD[7:0] are inputs). |
| DIHSTRBb | O | LVCMOS | DI Host Strobe: DIHSTRBb is an output and has two different modes of operation, depending on whether the main processor DI is writing data or reading data. When the DI is writing data, the DIHSTRBn signal is used to qualify the data output on the DIDD[7:0] bus, DIDD[7:0] is valid on the rising edge of DIHSTRBn. When the DI is reading data, the DIHSTRBn is used as a ready signal, the assertion of DIHSTRBn indicates that the DI is ready to complete the next data read from the mass storage access device 106. |
| DIDSTRBb | I | LCVMOS | DI Device Strobe: DIDSTRBb is an input and has two different modes of operation, depending on whether the main processor DI is writing data or reading data. When the DI is reading data, the DIDSTRBn signal is used to qualify the data input on the DIDD[7:0] bus, DIDD[7:0] is valid on the rising edge of DIDSTRBn. When the DI is writing data, the DIDSTRBn is used as a ready signal, the assertion of DIDSTRBn indicates that the mass storage access device 106 is ready to complete the next data write. |

-continued

| Name | Dir | Type | Description |
|---|---|---|---|
| DIERRb | I | LVCMOS | DI Error: DIERRb is an input. The assertion of DIERRb by the mass access storage device 106 indicates that an error has occurred on the mass storage access device. The DI interface will immediately halt the current command. Depending upon the setting of the DIS[DEINT] bit, an interrupt will also be generated on the assertion of DIERRb. After the DIERRb is asserted, the mass access storage device will deassert DIERRb after the next command is received from the host. Typically, the next command is request sense to check the error status. DIERRb is an edge-triggered signal. The assertion of DIERRb by the mass storage access device 106 should only occur at the end of the command transfer or at the end of the data transfer, in the case of DMA data, it can occur in between any 32Bytes transfer. After DIERRb is asserted, DICR[TSTART] will be cleared and DISR[TCINT] will not be generated for the current transaction. |
| DIBRK | I/O | LVCMOS OD | DI Break: DIBRK is an input/output signal and is an open drain output, externally a pull-up resistor is required. Normally this signal is driven low by the DI, in preparation for a Break cycle. This signal is driven both by the DI and the mass storage access device 106. When the DI sends a break, it releases control of the DIBRK signal and the signal rises to active level due to an external pull-up. The mass access storage device 106 is now the master of the signal. To acknowledge the break signal, the mass access storage device 106 pulses the signal low. The DI recognizes the rising edge of DIBRK as a break acknowledge. After break acknowledge, the DI drives DIBRK low again, in preparation for the next break cycle. The DI controller will delay sending the break signal until the whole command packet has been transferred. |
| DICOVER | I | LVCMOS | DI Cover: DICOVER is an input signal. This signal is connected to the Disk cover switch. This signal high indicates the cover is open, this signal low indicates the cover is closed. |
| DIRSTb | O | LVCMOS | DI Reset: DIRSTb is an output signal. When DIRSTb is asserted the mass storage access device 106 will be reset. This signal is not controlled by the DI. This signal is controlled by the main processor General Reset Register in the PI. |

FIG. 7C shows example registers within disk interface 1200 that are accessible by main processor 110. The FIG. 7C registers are each 32-bits wide and fall on 32-bit address boundaries. Main processor 110 can access these registers through 32-bit or 16-bit reads and writes. In the example embodiment, the base address of these disk interface registers is 0x0C006000.

The following sets forth definitions of example disk interface registers shown in FIG. 7C:

DISR: DI Status Register
Mnemonic: DISR
Offset: 0x00
Size 32 bits
DISR

| Bits | Mnemonic | Type | Reset | Description |
|---|---|---|---|---|
| 31:7 | | R | 0x0 | Reserved |
| 6 | BRKINT | RWC | 0x0 | Break Complete Interrupt Status and clear. On read this bit indicates the current status of the break complete interrupt. This interrupt is asserted when a Break cycle has completed (break acknowledge received from mass storage access device 106). When a '1' is written to this register, the interrupt is cleared. Write: 0 = No effect 1 = Clear Break Complete Interrupt Read: 0 = Break Complete Interrupt has not been requested 1 = Break Complete Interrupt has been requested |

-continued

DISR: DI Status Register
Mnemonic: DISR
Offset: 0x00
Size 32 bits
DISR

| Bits | Mnemonic | Type | Reset | Description |
|---|---|---|---|---|
| 5 | BRKINTMSK | RW | 0x0 | Break Complete Interrupt Mask: Interrupt masking prevents the interrupt from being sent to the main processor, but does not affect the assertion of DISR[BRKINT]<br>0 = Interrupt masked<br>1 = Interrupt enabled |
| 4 | TCINT | RWC | 0x0 | Transfer Complete Interrupt Status and clear. On read this bit indicates the current status of the transfer complete interrupt. The Transfer Complete interrupt is asserted under the following conditions: a DMA mode transfer has completed (DMA finished) or an Immediate mode transfer has completed (transfer to/from DIIMMBUF has completed). When a '1' is written to this register, the interrupt is cleared. The assertion of TCIT is delayed until the DIDSTRBb (low) in order to guarantee the error interrupt occurs before transfer complete interrupt. If DIERRb is asserted during the current transaction, the transaction will be halted and TCINT will not be asserted.<br>Write:<br>0 = No effect<br>1 = Clear Transfer Complete Interrupt<br>Read:<br>0 = Transfer Complete Interrupt has not been request<br>1 = Transfer Complete Interrupt has been request |
| 3 | TCINTMSK | RW | 0x0 | Transfer Complete Interrupt Mask: Interrupt masking prevents the interrupt from being sent to the main processor, but does not affect the assertion of DISR[TCINT]<br>0 = Interrupt masked<br>1 = Interrupt enabled |
| 2 | DEINT | RWC | 0x0 | Mass Storage Access Device Error Interrupt Status: On read this bit indicates the current status of the mass storage access device error interrupt. To clear this interrupt, two actions must occur. When a '1' is written to this register, the internal interrupt is cleared. To reset the DIERRb signal, a command must be issued to the external DI device. If error occurs during the command packet, the drive has to delay the error assertion until the completion of the 12 bytes command transfer. In immediate mode, if error occurs during the data packet, the error assertion has to be delayed until the completion of the 4 bytes data transfer. In DMA mode, it has to be delayed until the completion of any 32 bytes data transfer.<br>Write:<br>0 = No effect<br>1 = Clear Mass Storage Access Device Error Interrupt<br>Read:<br>0 = Mass Storage Access Device Error Interrupt has not been requested<br>1 = Mass Storage Access Device Error Interrupt has been requested |
| 1 | DEINTMSK | RW | 0x0 | Mass Storage Access Device Error Interrupt Mask: Interrupt masking prevents the interrupt from being sent to the main processor, but does not affect the assertion of DISR[DEINT]<br>0 = Interrupt masked<br>1 = Interrupt enabled |
| 0 | BRK | RWC | 0x0 | DI Break: When a '1' is written to this bit, the DI controller interrupts the current command and sends a break signal to the mass storage access device. The break signal interrupts the current command on the mass storage access device. After the break sequence is complete (see TCINT), a new command may be sent to the mass storage access device. This bit is cleared after the break command is complete. Note that DI controller will delay the break signal assertion if it is in the middle of the command transfer. Hence break can only occur during the data transfer or when it is idle. |

DISR: DI Status Register
Mnemonic: DISR
Offset: 0x00
Size 32 bits
DISR

| Bits | Mnemonic | Type | Reset | Description |
|------|----------|------|-------|-------------|
| | | | | Write:<br>0 = No effect<br>1 = Request Break<br>Read:<br>0 = Break not requested or break complete<br>1 = Break requested and pending |

DICVR: DI Cover Register
Mnemonic: DICVR
Offset: 0x04
Size 32 bits
DICVR

| Bits | Mnemonic | Type | Reset | Description |
|------|----------|------|-------|-------------|
| 31:3 | | R | 0x0 | Reserved |
| 2 | CVRINT | R | 0x0 | Mass Storage Device Cover Interrupt Status: On read this bit indicates the current status of the Mass Storage Device Cover interrupt. When a '1' is written to this register, the internal interrupt is cleared. The Mass Storage Device Cover Interrupt is asserted when the status of the DICOVER signal changes (e.g., when the cover is opened or closed).<br>Write:<br>0 = No effect<br>1 = Clear Cover Interrupt<br>Read:<br>0 = Cover Interrupt has not been requested<br>1 = Cover Event Interrupt has been requested |
| 1 | CVRINTMSK | RW | 0x0 | Cover Interrupt Mask: Interrupt masking prevents the interrupt from being sent to the main processor, but does not affect the assertion of DISR[DEINT]<br>0 = Interrupt masked<br>1 = Interrupt enabled |
| 0 | CVR | R | * | Cover Status: This bit reflects the current state of the DICOVER signal.<br>0 = Cover is closed<br>1 = Cover is open |

* The reset state of DICVR[CVR] reflects the state of the DICOVER signal.

DICMDBUF0: DI Command Buffer 0
Mnemonic: DICMDBUF0
Offset: 0x08
Size 32 bits
DICMDBUF0

| Bits | Mnemonic | Type | Reset | Description |
|------|----------|------|-------|-------------|
| 31:24 | CMDBYTE0 | RW | 0x0 | Command Byte 0: This is byte 0 of the command packet that will be sent to the mass storage access device when the command is initiated. (The DI command is initiated when DICSR[CMDSTART] is written with '1'.) |
| 23:16 | CMDBYTE1 | RW | 0x0 | Command Byte 1: See DPCMDBUF0[CMDBYTE0] description. |
| 15:8 | CMDBYTE2 | RW | 0x0 | Command Byte 2: See DPCMDBUF0[CMDBYTE0] description. |
| 7:0 | CMDBYTE3 | RW | 0x0 | Command Byte 3: See DPCMDBUF0[CMDBYTE0] description. |

DICMDBUF1: DI Command Buffer 1
Mnemonic: DICMDBUF1
Offset: 0x0C
Size 32 bits
DICMDBUF1

| Bits  | Mnemonic  | Type | Reset | Description                                            |
|-------|-----------|------|-------|--------------------------------------------------------|
| 31:24 | CMDBYTE4  | RW   | 0x0   | Command Byte 4: See DPCMDBUF0[CMDBYTE0] description.   |
| 23:16 | CMDBYTE5  | RW   | 0x0   | Command Byte 5: See DPCMDBUF0[CMDBYTE0] description.   |
| 15:8  | CMDBYTE6  | RW   | 0X0   | Command Byte 6: See DPCMDBUF0[CMDBYTE0] description.   |
| 7:0   | CMDBYTE7  | RW   | 0x0   | Command Byte 7: See DPCMDBUF0[CMDBYTE0] description.   |

DICMDBUF2: DI Command Buffer 2
Mnemonic: DICMDBUF2
Offset: 0x10
Size 32 bits
DICMDBUF1

| Bits  | Mnemonic  | Type | Reset | Description                                             |
|-------|-----------|------|-------|---------------------------------------------------------|
| 31:24 | CMDBYTE8  | RW   | 0x0   | Command Byte 8: See DPCMDBUF0[CMDBYTE0] description.    |
| 23:16 | CMDBYTE9  | RW   | 0x0   | Command Byte 9: See DPCMDBUF0[CMDBYTE0] description.    |
| 15:8  | CMDBYTE10 | RW   | 0X0   | Command Byte 10: See DPCMDBUF0[CMDBYTE0] description.   |
| 7:0   | CMDBYTE11 | RW   | 0x0   | Command Byte 11: See DPCMDBUF0[CMDBYTE0] description.   |

DI DMA Memory Address Register
Mnemonic: DIMAR
Offset: 0x14
Size 32 bits
DIMAR

| Bits  | Mnemonic | Type | Reset | Description                                                                                                                                                                                                            |
|-------|----------|------|-------|------------------------------------------------------------------------------------------------------------------------------------------------------------------------------------------------------------------------|
| 31:26 |          | R    | 0x0   | Reserved.                                                                                                                                                                                                              |
| 25:5  | DIMAR    | RW   | 0x0   | DI DMA Memory Address Register: This register indicates the starting main memory address used for the current DMA command. The memory address is the destination address when DICSR[RW] is set to 'read' and is the source address when set to 'write'. |
| 4:0   |          | R    | 0x0   | These low address bits read back zero since all DMA transfers are 32 byte aligned. Always write '0x0'.                                                                                                                 |

DILENGTH: DI DMA Transfer Length Register
Mnemonic: DILENGTH
Offset: 0x18
Size 32 bits
DILENGTH

| Bits  | Mnemonic | Type | Reset | Description                                                                                                                                                                                                                                                                     |
|-------|----------|------|-------|---------------------------------------------------------------------------------------------------------------------------------------------------------------------------------------------------------------------------------------------------------------------------------|
| 31:26 |          | R    | 0x0   | Reserved.                                                                                                                                                                                                                                                                       |
| 25:5  | DILENGTH | RW   | 0x0   | DI DMA Length Register: This register indicates the length of the data transfer in bytes for the current DMA command. If a DMA command is interrupted by a break cycle, this register indicates the amount of data that was left to transfer before the DMA command was interrupted. If the length equals zero, it is a special case with command transfer only. |

DILENGTH: DI DMA Transfer Length Register
Mnemonic: DILENGTH
Offset: 0x18
Size 32 bits
DILENGTH

| Bits | Mnemonic | Type | Reset | Description |
|---|---|---|---|---|
| 4:0 | | R | 0x0 | These low length bits read back zero since all DMA transfers are multiples of 32 bytes long. Always write '0x0'. |

DICR: DI Control Register
Mnemonic: DICR
Offset: 0x1C
Size 32 bits
DICR

| Bits | Mnemonic | Type | Reset | Description |
|---|---|---|---|---|
| 31:3 | | R | 0x0 | Reserved |
| 2 | RW | RW | 0x0 | Transfer Read/Write: controls the transfer direction, read or write to DI. Read indicates data flows from the mass storage access device to the main processor. Write indicates data flows from main processor to the mass storage access device.<br>0 = Read Command<br>1 = Write Command |
| 1 | DMA | RW | 0x0 | DMA Mode: controls whether the packet data is transferred by using DMA mode to/from main memory or if packet data is transferred directly to/from the Immediate Data Buffer. The only mass storage device packet command which can use immediate mode is the 'Register Access' command. When in immediate mode, the DIMAR and DILENGTH registers are ignored.<br>0 = Immediate Mode<br>1 = DMA Mode |
| 0 | TSTART | RW | 0x0 | Transfer Start: When a '1' is written to this register, the current command is executed (e.g., DMA command or immediate command). When read this bit represents the current command status. This bit is also cleared after the break completion and after DIERRb is asserted.<br>Write:<br>0 = No Effect<br>1 = Start Command<br>Read:<br>0 = Transfer Complete<br>1 = Transfer Pending |

DIIMMBUF DI Immediate Data Buffer
Mnemonic: DIIMMBUF
Offset: 0x20
Size 32 bits
DIIMMBUF

| Bits | Mnemonic | Type | Reset | Description |
|---|---|---|---|---|
| 31:24 | REGVAL0 | RW | 0x0 | Register Value 0: This is the data read/written when an immediate mode command packet is sent. REGVAL0 is the data of the register address + 0. When the command is a read command the mass storage access device transfers the data from the mass storage device register to the DIIMMBUF. When the command is a write command, the data is transferred from the DIIMMBUF to the mass storage device register. |
| 23:16 | REGVAL1 | RW | 0x0 | Register Value 1: register address + 1. See DIIMMBUF[REGVAL0] description. |
| 15:8 | REGVAL2 | RW | 0x0 | Register Value 2: register address + 2. See DIIMMBUF[REGVAL0] description. |

-continued

DIIMMBUF DI Immediate Data Buffer
Mnemonic: DIIMMBUF
Offset: 0x20
Size 32 bits
DIIMMBUF

| Bits | Mnemonic | Type | Reset | Description |
|---|---|---|---|---|
| 7:0 | REGVAL3 | RW | 0x0 | Register Value 3: register address + 3. See DIIMMBUF[REGVAL0] description. |

DICFG: DI Configuration Register
Mnemonic: DICFG
Offset: 0x24
Size 32 bits
DICFG

| Bits | Mnemonic | Type | Reset | Description |
|---|---|---|---|---|
| 31:8 | | R | 0x0 | Reserved |
| 7:0 | CONFIG | R | DIDD | During reset, this register latches in DIDD bus. This is a read only register containing the configuration value. Currently, only bit 0 is used. Refer to DIDD bus. |

Example Serial Interface

Figure 8A:
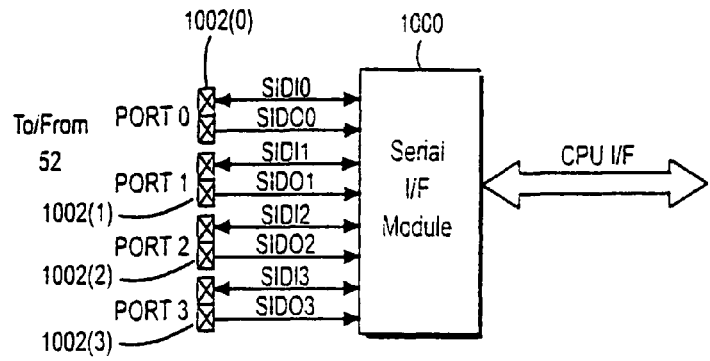
FIGS. 8A and 8B show an example serial interface.
Figure 8B:
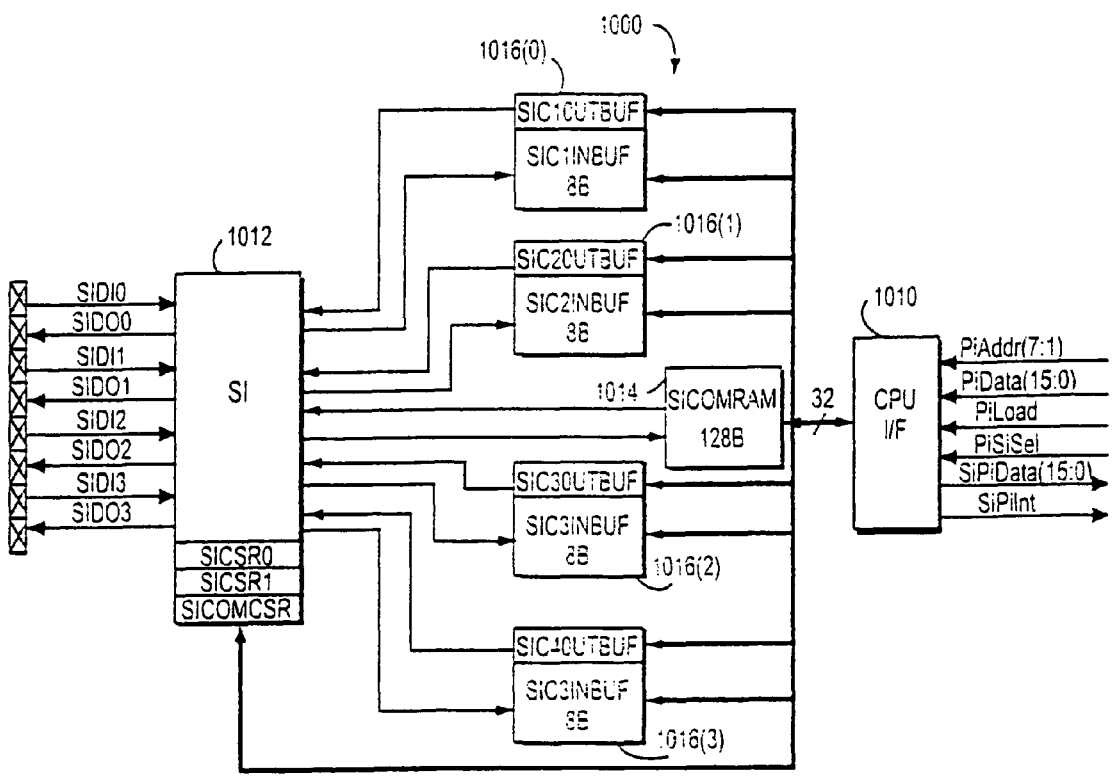

FIGS. 8A and 8B show an example serial interface 1000. In this particular example, serial interface 1000 is a single bit serial interface that runs at 250 kHz. This single bit serial interface is similar to the "joybus" control interface used in the prior art Nintendo 64® product manufactured by Nintendo, but there are some differences. Example serial interface 1000 provides the following features in the example embodiment:
  four separate 250 kHz serial interfaces for four controllers 52,
  each interface can be accessed in parallel,
  in controller mode, the last state of the controller 52 is in a double-buffered processor input/output register so that main processor 110 can simply read the register to determine the controller state,
  the controller state is automatically polled by hardware with configurable polling periods,
  bulk mode (changeable data size),
  two light gun signals are used to control two separate horizontal/vertical counters to support both flash and shutter light guns,
  an LCD shutter is supported through automatic polling and serial control commands, and
  the serial interface 1000 can automatically detect the presence of hand controllers 52.

FIG. 8A shows the external interface of serial interface 1000. In this example, there are four separate controller ports 1002 on system 50. Each port 1002 has a pair of input and output pins (shown by the "x" mark blocks in FIG. 8A). The input pin connects directly to an external game controller 52 in the example embodiment. The output pin in the example embodiment connects to an external open-drain driver (not shown) which in turn connects directly to the external game controller 52. In the example embodiment, two of the ports 1002 have horizontal/vertical latch signals that can be used to latch horizontal/vertical counters within the video interface 164. These signals combined with the functionality of serial interface 1000 provide support for flash and shutter type light guns. The vertical latch and control registers used for this functionality are located in the video interface 164 in the example embodiment. FIG. 8A shows each of the four serial ports 1002 including an SIDI (bi-directional) line and an SIDO (uni-directional) controller output-to-serial interface 1000 line. The following shows example descriptions of these two signals:

| Name | Dir | Type | Description |
|---|---|---|---|
| SIDI[3:0] | I | LVCMOS | Serial Interface Data Input: SIDI[3:0] are input signals, each bit is a separate half-duplex, 250 kbit/s input serial channel. The serial protocol is an asynchronous interface and is self timed, using a pulse width modulated signaling scheme. |
| SID0[3:0] | O | LVCMOS | Serial Interface Data Output: SIDO[3:0] are output signals, each bit is a separate half-duplex, 250 kbit/s output serial channel. The serial protocol is an asynchronous interface and is self timed, using a pulse width modulated signaling scheme. |

FIG. 8B is a more detailed block diagram of serial interface 1000. As shown in this Figure, serial interface 1000 includes a main processor interface 1010, a serial interface communication circuitry and registers 1012, a small (128 byte) communication RAM 1014, and an input/output buffer arrangement 1016 for each of the four serial ports 1002.

FIG. 8C shows an example set of registers (register map) used to control serial interface 1000 in the example embodiment. The base address for these serial interface registers in the example embodiment is 0x0C006400. The following describes each of these various example registers in the example embodiment:

SIC0OUTBUF SI Channel 0 Output Buffer
Mnemonic: SIC0OUTBUF
Offset: 0x00
Size 32 bits
SIC0OUTBUF

| Bits | Mnemonic | Type | Reset | Description |
|---|---|---|---|---|
| 31:24 | | R | 0x0 | Reserved |
| 23:16 | CMD | RW | 0x0 | Command: This byte is the opcode for the command sent to the controller during each command/response |

-continued

SIC0OUTBUF SI Channel 0 Output Buffer
Mnemonic: SIC0OUTBUF
Offset: 0x00
Size 32 bits
SIC0OUTBUF

| Bits | Mnemonic | Type | Reset | Description |
|---|---|---|---|---|
| 15:8 | OUTPUT0 | RW | 0x0 | packet. This is the first data byte sent from the SI I/F to the game controller in the command/response packet. Output Byte 0: This is the first data byte of the command packet. It is the second data byte sent from the SI I/F to the game controller in the command/response packet. |
| 7:0 | OUTPUT1 | RW | 0x0 | Output Byte 1: This is the second data byte of the command packet. It is the third data byte sent from the SI I/F to the game controller in the command/response packet. |

This register is double buffered, so main processor writes to the SIC0OUTBUF will not interfere with the serial interface output transfer. Internally, a second buffer is used to hold the output data to be transferred across the serial interface. To check if SIC0OUTBUF has been transferred to the second buffer, main processor 110 polls the SISR[WRST0] register. When SIC0OUTBUF is transferred, SISR[WRST0] is cleared.

SIC0INBUF SI Channel 0 Input Buffer High
Mnemonic: SIC0INBUFH
Offset: 0x04
Size 32 bits
SIC0INBUFH

| Bits | Mnemonic | Type | Reset | Description |
|---|---|---|---|---|
| 31 | ERRSTAT | R | 0x0 | Error Status: This bit represents the current error status for the last SI polling transfer on channel 0. This register is updated after each polling transfer on this channel.<br>0 = No error on last transfer<br>1 = Error on last transfer |
| 30 | ERRLATCH | R | 0x0 | Error Latch: This bit is an error status summary of the SISR error bits for this channel. If an error has occurred on a past SI transfer on channel 0 (polling or Com transfer), this bit will be set. To determine the exact error, read the SISR register. This bit is actually an 'or' of the latched error status bits for channel 0 in the SISR. The bit is cleared by clearing the appropriate error status bits latched in the SISR. The no response error indicates that a controller is not present on this channel.<br>0 = No errors latched<br>1 = Error latched. Check SISR. |
| 29:24 | INPUT0 | R | 0x0 | Input Byte 0: This is the first data byte of the response packet sent from the game controller to the SI I/F for channel 0. The top two bits of the byte returning from the controller are assumed to be '0', so they are not included. |
| 23:16 | INPUT1 | R | 0x0 | Input Byte 1: This is the second data byte of the response packet sent from the game controller to the SI I/F for channel 0. |
| 15:8 | INPUT2 | R | 0x0 | Input Byte 2: This is the third data byte of the response packet sent from the game controllers to the SI I/F for channel 0. |
| 7:0 | INPUT3 | R | 0x0 | Input Byte 3: This is the fourth data byte of the response packet sent from the game controller to the SI I/F for channel 0. |

SIC0INBUFH and SIC0INBUFL are double buffered to prevent inconsistent data reads due to main processor 110 conflicting with incoming serial interface data. To insure data read from SIC0INBUFH and SIC0INFUBL are consistent, a locking mechanism prevents the double buffer from copying new data to these registers. Once SIC0INBUFH is read, both SIC0INBUFH and SIC0INBUFL are 'locked' until SIC0INBUFL is read. While the buffers are 'locked', new data is not copied into the buffers. When SIC0INBUFL is read, the buffers become unlocked again.

SIC0INBUF SI Channel 0 Input Buffer Low
Mnemonic: SIC0INBUFL
Offset: 0x08
Size 32 bits
SIC0INBUFL

| Bits | Mnemonic | Type | Reset | Description |
|---|---|---|---|---|
| 31:24 | INPUT4 | R | 0x0 | Input Byte 4: See Description of SIC1INBUFH[INPUT1]. |
| 23:16 | INPUT5 | R | 0x0 | Input Byte 5: See Description of SIC1INBUFH[INPUT1]. |
| 15:8 | INPUT6 | R | 0x0 | Input Byte 6: See Description of SIC1INBUFH[INPUT1]. |
| 7:0 | INPUT7 | R | 0x0 | Input Byte 7: See Description of SIC1INBUFH[INPUT1]. |

SIC1OUTBUF SI Channel 1 Output Buffer
Mnemonic: SIC1OUTBUF
Offset: 0x0C
Size 32 bits
SIC1OUTBUF

| Bits | Mnemonic | Type | Reset | Description |
|---|---|---|---|---|
| 31:24 |  | R | 0x0 | Reserved |
| 23:16 | CMD | RW | 0x0 | Command: For SI channel 1. See SIC0OUTBUFF[CMD] description. |
| 15:8 | OUTPUT0 | RW | 0x0 | Output Byte 0: For SI channel 1. See SIC0OUTBUFF[OUTPUT0] description. |
| 7:0 | OUTPUT1 | RW | 0x0 | Output Byte 1: For SI channel 1. See SIC0OUTBUFF[OUTPUT1] description. |

SIC1INBUF SI Channel 1 Input Buffer High
Mnemonic: SIC1INBUFH
Offset: 0x10
Size 32 bits
SIC1INBUFH

| Bits | Mnemonic | Type | Reset | Description |
|---|---|---|---|---|
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29:24 | INPUT0 | R | 0x0 | Input Byte 0: See Description of SIC0INBUFH[INPUT0]. |
| 23:16 | INPUT1 | R | 0x0 | Input Byte 1: See Description of SIC0INBUFH[INPUT1]. |
| 15:8 | INPUT2 | R | 0x0 | Input Byte 2: See Description of SIC0INBUFH[INPUT1]. |
| 7:0 | INPUT3 | R | 0x0 | Input Byte 3: See Description of SIC0INBUFH[INPUT1]. |

SIC1INBUF SI Channel 1 Input Buffer Low
Mnemonic: SIC1INBUFL
Offset: 0x14
Size 32 bits
SIC1INBUFL

| Bits | Mnemonic | Type | Reset | Description |
|---|---|---|---|---|
| 31:24 | INPUT4 | R | 0x0 | Input Byte 4: See Description of SIC0INBUFH[INPUT1]. |
| 23:16 | INPUT5 | R | 0x0 | Input Byte 5: See Description of SIC0INBUFH[INPUT1]. |
| 15:8 | INPUT6 | R | 0x0 | Input Byte 6: See Description of SIC0INBUFH[INPUT1]. |
| 7:0 | INPUT7 | R | 0x0 | Input Byte 7: See Description of SIC0INBUFH[INPUT1]. |

SIC2OUTBUF SI Channel 2 Output Buffer
Mnemonic: SIC2OBUF
Offset: 0x18
Size 32 bits
SIC2OUTBUF

| Bits | Mnemonic | Type | Reset | Description |
|---|---|---|---|---|
| 31:24 |  | R | 0x0 | Reserved |
| 23:16 | CMD | RW | 0x0 | Command: For SI Channel 2. See SIC0OUTBUFF[CMD] description |
| 15:8 | OUTPUT0 | RW | 0x0 | Output Byte 0: For SI channel 2. See SIC0OUTBUFF[OUTPUT0] description. |
| 7:0 | OUTPUT1 | RW | 0x0 | Output Byte 1: For SI channel 2. See SIC0OUTBUFF[OUTPUT1] description. |

SIC2INBUF SI Channel 2 Input Buffer High
Mnemonic: SIC2INBUFH
Offset: 0x1C
Size 32 bits
SIC2INBUFH

| Bits | Mnemonic | Type | Reset | Description |
|---|---|---|---|---|
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29:24 | INPUT0 | R | 0x0 | Input Byte 0: See Description of SIC0INBUFH[INPUT1].. |
| 23:16 | INPUT1 | R | 0x0 | Input Byte 1: See Description of SIC0INBUFH[INPUT0]. |
| 15:8 | INPUT2 | R | 0x0 | Input Byte 2: See Description of SIC0INBUFH[INPUT1]. |
| 7:0 | INPUT3 | R | 0x0 | Input Byte 3: See Description of SIC0INBUFH[INPUT1]. |

SIC2INBUF SI Channel 2 Input Buffer Low
Mnemonic: SIC2INBUFL
Offset: 0x20
Size 32 bits
SIC2INBUFL

| Bits | Mnemonic | Type | Reset | Description |
|---|---|---|---|---|
| 31:24 | INPUT4 | R | 0x0 | Input Byte 4: See Description of SIC0INBUFH[INPUT0]. |
| 23:16 | INPUT5 | R | 0x0 | Input Byte 5: See Description of SIC0INBUFH[INPUT0]. |
| 15:8 | INPUT6 | R | 0x0 | Input Byte 6: See Description of SIC0INBUFH[INPUT0]. |
| 7:0 | INPUT7 | R | 0x0 | Input Byte 7: See Description of SIC0INBUFH[INPUT0]. |

SIC3OUTBUF SI Channel 3 Output Buffer
Mnemonic: SIC3OBUF
Offset: 0x24
Size 32 bits
SIC3OUTBUF

| Bits | Mnemonic | Type | Reset | Description |
|---|---|---|---|---|
| 31:24 |  | R | 0x0 | Reserved |
| 23:16 | CMD | RW | 0x0 | Command: For SI channel 3. See SIC0OUTBUFF[CMD] description |
| 15:8 | OUTPUT0 | RW | 0x0 | Output Byte 0: For SI channel 3. See SIC0OUTBUFF[OUTPUT0] description |
| 7:0 | OUTPUT1 | RW | 0x0 | Output Byte 1: For SI channel 3. See SIC0OUTBUFF[OUTPUT1] description |

SIC3INBUF SI Channel 3 Input Buffer High
Mnemonic: SIC3INBUFH
Offset: 0x28
Size 32 bits
SIC3INBUFH

| Bits | Mnemonic | Type | Reset | Description |
|---|---|---|---|---|
| 31 | ERRSTAT | R | 0x0 | Error Status: See Description of SIC0INBUFH[ERRSTAT]. |
| 30 | ERRLATCH | R | 0x0 | Error Latch: See Description of SIC0INBUFH[ERRLATCH]. |
| 29:24 | INPUT0 | R | 0x0 | Input Byte 0: See Description of SIC0INBUFH[INPUT0]. |

SIC3INBUF SI Channel 3 Input Buffer High
Mnemonic: SIC3INBUFH
Offset: 0x28
Size 32 bits
SIC3INBUFH

| Bits | Mnemonic | Type | Reset | Description |
|---|---|---|---|---|
| 23:16 | INPUT1 | R | 0x0 | Input Byte 1: See Description of SIC0INBUFH[INPUT1]. |
| 15:8 | INPUT2 | R | 0x0 | Input Byte 2: See Description of SIC0INBUFH[INPUT1]. |
| 7:0 | INPUT3 | R | 0x0 | Input Byte 3: See Description of SIC0INBUFH[INPUT1]. |

SIC3INBUF SI Channel 3 Input Buffer Low
Mnemonic: SIC3INBUFL
Offset: 0x2C
Size 32 bits
SIC4INBUFL

| Bits | Mnemonic | Type | Reset | Description |
|---|---|---|---|---|
| 31:24 | INPUT4 | R | 0x0 | Input Byte 4: See Description of SIC0INBUFH[INPUT1]. |
| 23:16 | INPUT5 | R | 0x0 | Input Byte 5: See Description of SIC0INBUFH[INPUT1]. |
| 15:8 | INPUT6 | R | 0x0 | Input Byte 6: See Description of SIC0INBUFH[INPUT1]. |
| 7:0 | INPUT7 | R | 0x0 | Input Byte 7: See Description of SIC0INBUFH[INPUT1]. |

SIPOLL SI Poll Register
Mnemonic: SIPOLL
Offset: 0x30
Size 32 bits
SIPOLL

| Bits | Mnemonic | Type | Reset | Description |
|---|---|---|---|---|
| 31:26 |  | R | 0x0 | Reserved |
| 25:16 | X | RW | 0x07 | X lines register: determines the number of horizontal video lines between polling (the polling interval). The polling begins at vsync. 0x07 is the minimum setting (determined by the time required to complete a single polling of the controller). The maximum setting depends on the current video mode (number of lines per vsync) and the SIPOLL[Y] register. This register takes affect after vsync. |
| 15:8 | Y | RW | 0x0 | Y times register: This register determines the number of times the SI controllers are polled in a single frame. This register takes affect after vsync. |
| 7 | EN0 | RW | 0x0 | Enable channel 0: Enable polling of channel 0. When the channel is enabled, polling begins at the next vblank. When the channel is disabled, polling is stopped immediately after the current transaction. The status of this bit does not affect communication RAM transfers on this channel. 1 = Polling of channel 0 is enabled 0 = Polling of channel 0 is disabled |
| 6 | EN1 | RW | 0x0 | Enable channel 1: See description for SIPOLL[EN0]. |
| 5 | EN2 | RW | 0x0 | Enable channel 2: See Description for SIPOLL[EN0]. |
| 4 | EN3 | RW | 0x0 | Enable channel 3: See Description for SIPOLL[EN0]. |

-continued

SIPOLL SI Poll Register
Mnemonic: SIPOLL
Offset: 0x30
Size 32 bits
SIPOLL

| Bits | Mnemonic | Type | Reset | Description |
|---|---|---|---|---|
| 3 | VBCPY0 | RW | 0x0 | Vblank copy output channel 0: Normally main processor writes to the SIC0OUTBUF register are copied immediately to the channel 0 output buffer if a transfer is not currently in progress. When this bit is asserted, main processor writes to channel 0's SIC0OUTBUF will only be copied to the outbuffer on vblank. This is used to control the timing of commands to 3D LCD shutter glasses connected to the VI.<br>1 = Copy SIC0OUTBUF to output buffer only on vblank.<br>0 = Copy SIC0OUTBUF to output buffer after writing. |
| 2 | VBCPY1 | RW | 0x0 | Vblank copy output channel 1: See Description for SIPOLL[VBCPY0]. |
| 1 | VBCPY2 | RW | 0x0 | Vblank copy output channel 2: See Description for SIPOLL[VBCPY0]. |
| 0 | VBCPY3 | RW | 0x0 | Vblank copy output channel 3: See Description for SIPOLL[VBCPY0]. |

SICOMCSR SI Communication Control Status Register
Mnemonic: SICOMCSR
Offset: 0x34
Size 32 bits
SICOMCSR

| Bits | Mnemonic | Type | Reset | Description |
|---|---|---|---|---|
| 31 | TCINT | RWC | 0x0 | Transfer Complete Interrupt Status and clear. On read this bit indicates the current status of the communication transfer complete interrupt. When a '1' is written to this register, the interrupt is cleared.<br>Write:<br>0 = No effect<br>1 = Transfer Complete Interrupt<br>Read:<br>0 = Transfer Complete Interrupt not requested<br>1 = Transfer Complete Interrupt has been requested |
| 30 | TCINTMSK | RW | 0x0 | Transfer Complete Interrupt Mask: Interrupt masking prevents the interrupt from being sent to the main processor, but does not affect the assertion of SICOMCSR[TCINT]<br>0 = Interrupt masked<br>1 = Interrupt enabled |
| 29 | COMERR | R | 0x0 | Communication Error: This indicates whether the last SI communication transfer had an error. See SiSr for the cause of the error.<br>0 = No error<br>1 = Error on transfer |
| 28 | RDSTINT | R | 0x0 | Read Status Interrupt Status and clear. On read this bit indicates the current status of the Read Status interrupt. The interrupt is set whenever SISR[RDSTn] bits are set. The interrupt is cleared when all of the RdSt bits in the SISR are cleared by reading from the Si Channel Input Buffers. This interrupt can be used to indicate that a polling transfer has completed and new data is captured in the input registers<br>Read:<br>0 = Transfer Complete Interrupt not requested<br>1 = Transfer Complete Interrupt has been requested |
| 27 | RDSTINTMSK | RW | 0x0 | Read Status interrupt Mask: Interrupt masking prevents the interrupt from being sent to the main processor, but does not affect the assertion of SICOMCSR[RDSTINT]<br>0 = Interrupt masked<br>1 = Interrupt enabled |

-continued

SICOMCSR SI Communication Control Status Register
Mnemonic: SICOMCSR
Offset: 0x34
Size 32 bits
SICOMCSR

| Bits | Mnemonic | Type | Reset | Description |
|---|---|---|---|---|
| 26:23 | | R | 0x0 | Reserved |
| 22:16 | OUTLNGTH | RW | 0x0 | Communication Channel Output Length in bytes. Minimum transfer is 1 byte. A value of 0x00 will transfer 128 bytes. These bits should not be modified while SICOM transfer is in progress. |
| 15 | | R | 0x0 | Reserved |
| 14:8 | INLNGTH | RW | 0x0 | Communication Channel Output Length in bytes. Minimum transfer is 1 byte. A value of 0x00 will transfer 128 bytes. These bits should not be modified while SICOM transfer is in progress. |
| 2:1 | CHANNEL | RW | 0x0 | Channel: determines which SI channel will be used the communication interface. 00 = Channel 1 01 = Channel 2 10 = Channel 3 11 = Channel 4 These bits should not be modified while SICOM transfer is in progress. |
| 0 | TSTART | RW | 0x0 | Transfer Start: When a '1' is written to this register, the current communication transfer is executed. The transfer begins immediately after the current transaction on this channel has completed. When read this bit represents the current transfer status. Once a communication transfer has been executed, polling will resume at the next vblank if the channel's SIPOLL[ENn] bit is set. Write: 0 = Do not start command 1 = Start command Read: 0 = Command Complete 1 = Command Pending |

When programming the SICOMCSR after a SICOM transfers has already started (e.g., SICOMCSR[TSTART] is set), the example software reads the current value first, then and/or in the proper data and then write the new data back. The software should not modify any of the transfer parameters (OUTLNGTH, INLNGTH, CHANNEL) until the current transfer is complete. This is done to prevent a SICOM transfer already in progress from being disturbed. When writing the data back, the software should not set the TSTART bit again unless the current transfer is complete and another transfer is required.

SISI SI Status Register
Mnemonic: SISR
Offset: 0x38
Size 32 bits
SISR

| Bits | Mnemonic | Type | Reset | Description |
|---|---|---|---|---|
| 31 | WR | RW | 0x0 | Write SICnOUTBUF Register: This register controls and indicates whether the SICnOUTBUFs have been copied to the double buffered output buffers. This bit is cleared after the buffers have been copied. Write 1 = Copy all buffers 0 = No effect Read 1 = Buffer not copied 0 = Buffer copied |
| 30 | | R | 0x0 | Reserved |
| 29 | RDST0 | R | 0x0 | Read Status SIC0OINBUE Register: This register indicates whether the SIC0INBUFs have been captured new data and whether the data has already been read by the main processor (read indicated by main processor read of SIC0INBUF[ERRSTAT, ERRLATCH, INPUT0, INPUT1)] |

-continued

SISI SI Status Register
Mnemonic: SISR
Offset: 0x38
Size 32 bits
SISR

| Bits | Mnemonic | Type | Reset | Description |
|---|---|---|---|---|
| | | | | 1 = New data available, not read by main processor<br>0 = No new data available, already read by main processor |
| 28 | WRST0 | R | 0x0 | Write Status SIC0OUTBUF Register: This register indicates whether the SIC0OUTBUFs have been copied to the double buffered output buffers. This bit is cleared after the buffers have been copied.<br>1 = Buffer not copied<br>0 = Buffer copied |
| 27 | NOREP0 | RWC | 0x0 | No Response Error Channel 0: This register indicates that a previous transfer resulted in no response from the controller. This can also be used to detect whether a controller is connected. If no controller is connected, this bit will be set. Once set this bit remains set until it is cleared by the main processor. To clear this bit write '1' to this register.<br>Write:<br>0 = No effect<br>1 = Clear No Response Error<br>Read:<br>0 = No Response Error not asserted<br>1 = No Response Error asserted |
| 26 | COLL0 | RWC | 0x0 | Collision Error Channel 0: This register indicates data collision between controller and main unit. Once set this bit remains set until it is cleared by the main processor. To clear this bit write '1' to this register.<br>Write:<br>0 = No effect<br>1 = Clear Collision Error<br>Read:<br>0 = Collision Error not asserted<br>1 = Collision Error asserted |
| 25 | OVRUN0 | RWC | 0x0 | Over Run Error Channel 0: This register indicates that the main unit has received more data than expected. Once set this bit remains set until it is cleared by the main processor. To clear this bit write '1' to this register.<br>Write:<br>0 = No effect<br>1 = Clear Over Run Error<br>Read:<br>0 = Over Run Error not asserted<br>1 = Over Run Error asserted |
| 24 | UNRUN | RWC | 0x0 | Under Run Error Channel 0: This register indicates that the main unit has received less data than expected. Once set this bit remain set until it is cleared by the main processor. To clear this bit write '1' to this register.<br>Write:<br>0 = No effect<br>1 = Clear Under Run Error<br>Read:<br>0 = Under Run not asserted<br>1 = Under Run asserted |
| 23:22 | | R | 0x0 | Reserved |
| 21 | RDST1 | R | 0x0 | Read Status SIC1OINBUF Register: See SISR[RDST0]. |
| 20 | WRST1 | R | 0x0 | Write Status SIC0OUTBUF Register: See SISR[WRST0]. |
| 19 | NOREP1 | RWC | 0x0 | No Response Error Channel 1: See SISR[NOREP0]. |
| 18 | COLL1 | RWC | 0x0 | Collision Error Channel 1: See SISR[COLL0]. |
| 17 | OVRUN1 | RWC | 0x0 | Over Run Error Channel 1: See SISR[OVRUN0]. |
| 16 | UNRUN1 | RWC | 0x0 | Under Run Error Channel 1: See SISR[UNRUN0]. |
| 15:14 | | R | 0x0 | Reserved |
| 13 | RDST2 | R | 0x0 | Read Status SIC1OINBUF Register: See SISR[RDST2]. |
| 12 | WRST2 | R | 0x0 | Write Status SIC0OUTBUF Register: See SISR[WRST2]. |
| 11 | NOREP2 | RWC | 0x0 | No Response Error Channel 2: See SISR[NOREP0]. |
| 10 | COLL2 | RWC | 0x0 | Collision Error Channel 2: See SISR[COLL0]. |
| 9 | OVRUN2 | RWC | 0x0 | Over Run Error Channel 2: See SISR[OVRUN0]. |

-continued

SISI SI Status Register
Mnemonic: SISR
Offset: 0x38
Size 32 bits
SISR

| Bits | Mnemonic | Type | Reset | Description |
|---|---|---|---|---|
| 8 | UNRUN2 | RWC | 0x0 | Under Run Error Channel 2: See SISR[UNRUN0]. |
| 7:6 | | R | 0x0 | Reserved |
| 5 | RDST3 | R | 0x0 | Read Status SIC1OINBUF Register: See SISR[RDST2]. |
| 4 | WRST3 | R | 0x0 | Write Status SIC0OUTBUF Register: See SISR[WRST2]. |
| 3 | NOREP3 | RWC | 0x0 | No Response Error Channel 3: See SISR[NOREP0]. |
| 2 | COLL3 | RWC | 0x0 | Collision Error Channel 3: See SISR[COLL0]. |
| 1 | OVRUN3 | RWC | 0x0 | Over Run Error Channel 3: See SISR[OVRUN0]. |
| 0 | UNRUN3 | RWC | 0x0 | Under Run Error Channel 3: See SISR[UNRUN0]. |

SIEXILK SI EXI Clock Lock
Mnemonic: SIEXILK
Offset: 0x3C
Size 32 bits
SIEXILK

| Bits | Mnemonic | Type | Reset | Description |
|---|---|---|---|---|
| 31 | LOCK | RW | 0x1 | Lock: This bit prevents the main processor from setting the EXI clock frequencies to 32 MHz.<br>0 = EXI Clocks Unlocked, 32 MHz EXICLK setting permitted.<br>1 = EXI Clock Locked, 32 MHz EXICLK setting not permitted. |
| 30:0 | | R | 0x0 | Reserved |

Figure 8D:
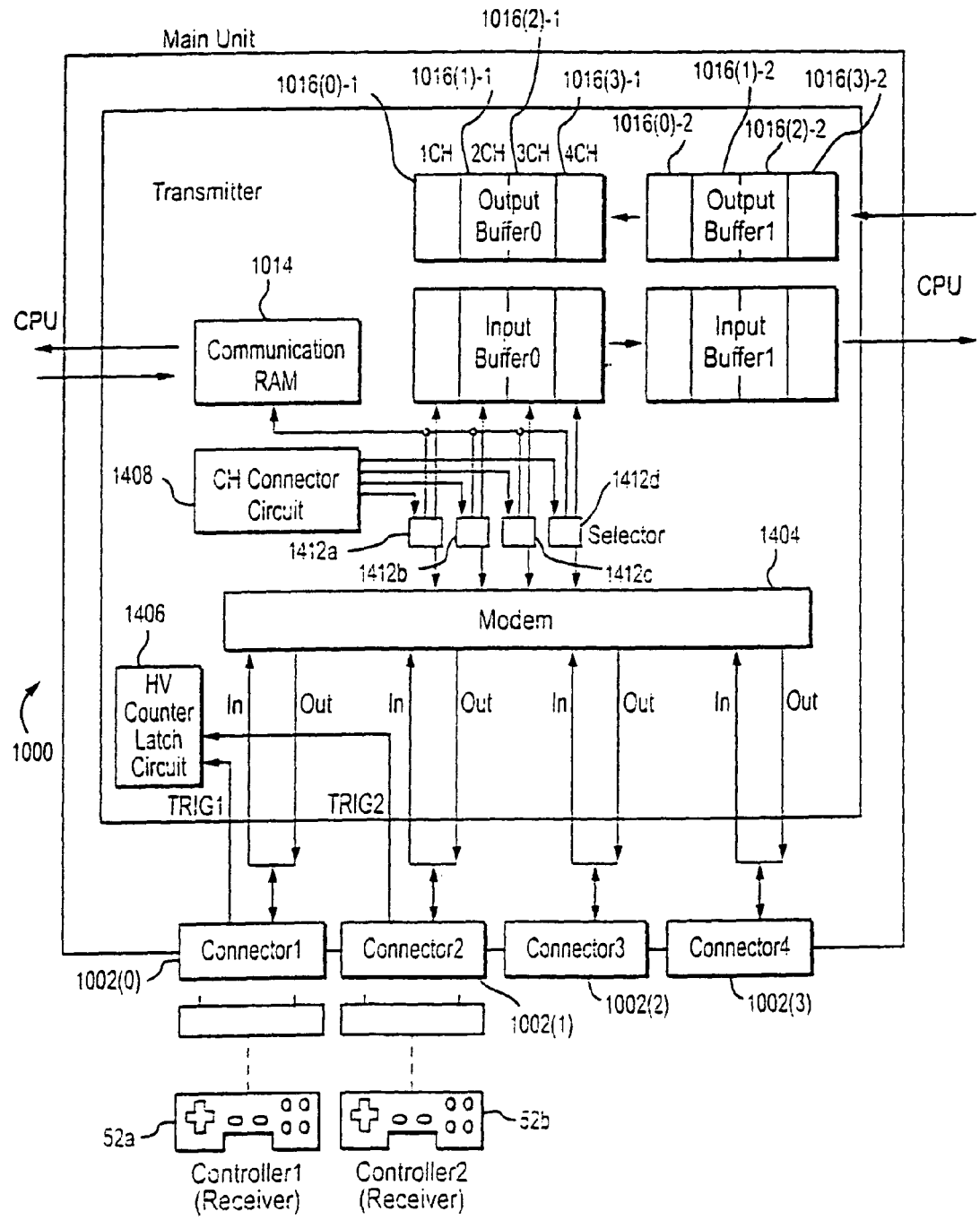
FIG. 8D is an even more detailed overall view of an example serial interface showing the details of serial interface communication circuitry and registers.

FIG. 8D is an even more detailed overall view of serial interface 1000 showing the details of serial interface communication circuitry and registers 1012. Controllers 52a and 52b (and 52c and 52d, if present) are connected to game console 54 via connector ports 1002. Modem 1404 modulates and demodulates data transferred between the controllers and the console. In the example system, communication between the console and the controllers uses duty-cycle (pulse-width) modulation and the data is communicated over one line. The communication is half-duplex. The byte transfer order is "big-endian" in which within a given multi-byte numeric representation, the most significant byte has the lowest address (i.e., the data is transferred "big-end" first). Controller input/output buffer 1016 is used for normal data transfers involving controllers 52a-52d. As shown in FIG. 8D, input/output buffer 1016 is arranged as a double buffer. Communication RAM 1014 is provided for use in variable-size data transfers to and from controllers 52a-52d. In the example system, the maximum data size of these variable-size data transfers is 32 words. Of course, the present invention is not limited in this respect. Channel selector circuit 1408 controls selectors 1412a-1412d to selectively connect modem 1404 to either communication RAM 1014 or input/output buffer 1016. An HV counter latch circuit 1406 latches the screen position of a flash signal when a trigger input is received from a light gun unit. In the example system shown in FIG. 8, triggers inputs to the HV counter latch circuit 1406 are provided for connectors 1 and 2 only. It will be apparent that trigger inputs may be provided for the other connectors if desired. HV counter latch circuit 1406 may also be used with light pens connected to connectors 1 and/or 2.

Additional details of the serial interface may be found in application Ser. No. 09/722,664, filed Nov. 28, 2000 of Shimuzu et al. entitled "Controller Interface for a Graphics System", the contents of which are incorporated herein by reference.

Example External Interfaces

Figure 9A:
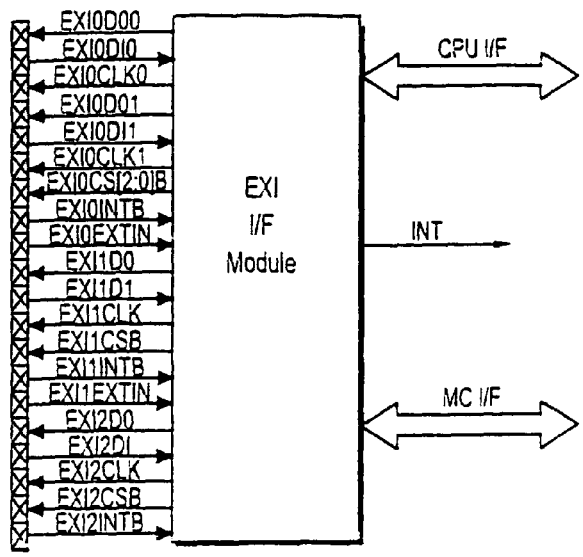
FIGS. 9A-9D show example external interfaces.

FIG. 9A is a block diagram of an example external interface logic 1100. In the example embodiment, external interface block 1100 supports three separate external interface channels 1102. In the example embodiment, external interface channel 1102(0) has a somewhat different configuration than channels 1102(1), 1102(2). This enables external interface channel 1102(0) to support both expansion and on-board devices and peripherals. Each of channels 1102 provides support for 8-bit word EXI operation. In the example embodiment, the entire ROM 134 is memory mapped on the external interface channel 1102(0), and ROM reads are controlled entirely by hardware for boot support.

The external interface 1100 in the example embodiment was chosen based on current support by several manufacturers (e.g., Macronix) for the EXI interface on Macronix's CMOS serial flash EEPROM parts. The implemented EXI protocol is based on and compatible with MXIC's MX25L4004 EXI interface. The preferred embodiment example external interface 1100 includes five separate chip select signals to control five different devices (e.g., ROM/RTC 134, flash memory 140, expansion modem 136, expansion backup memory card 144, etc.). Different implementations could provide different numbers of chip selects. The example embodiment external interface 1100 includes three maskable external interrupts (one for each expansion port/channel 1102) that are used to signal EXI transfer complete for each channel. An additional pair of maskable interrupts provided by channels 1102(0) and 1102(1) is used to provide hot-plug status for peripheral insertion and removal. Each of channels 1102 support general DMA (direct memory access) transfers in the example embodiment.

Figure 9B:
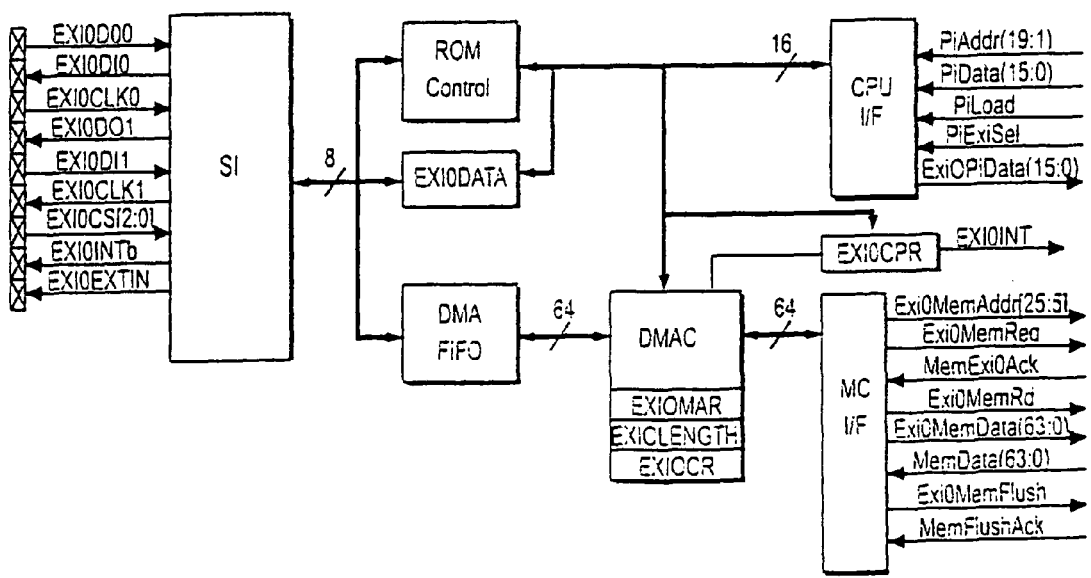

Referring to FIG. 9B, the portion 1100(0) of external interface 1100 supporting external interface channel 1102(0) includes a CPU interface 1104, a memory controller interface 1106, a direct memory access controller 1108 and associated FIFO buffer 1110, a ROM control 1112, an external interface data buffer/register 1114, a bus transceiver 1116, and an interrupt register 1118.

Figure 9C:
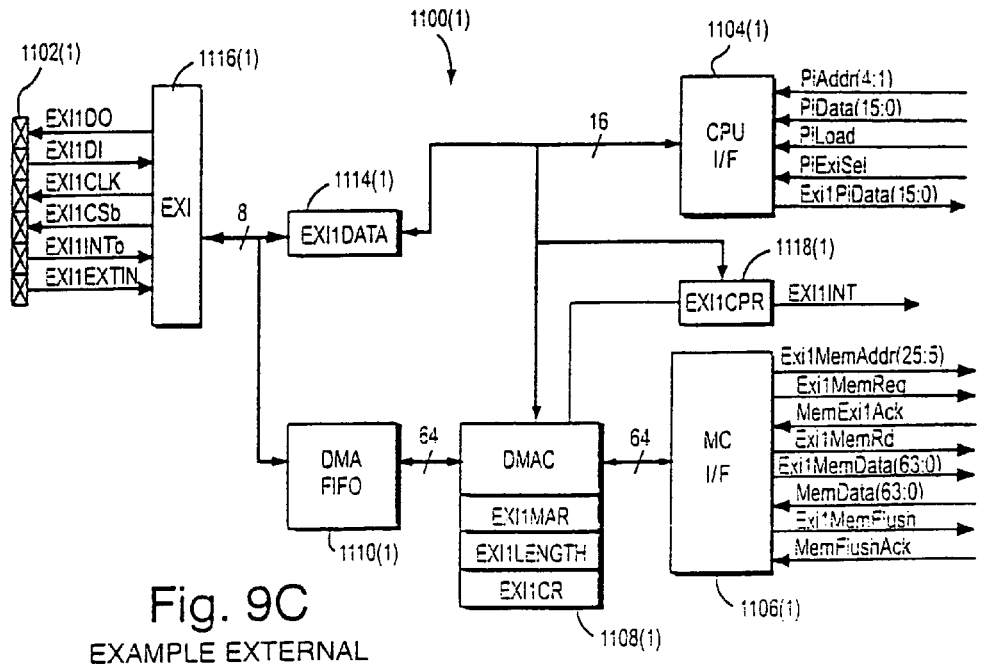
Figure 9D:
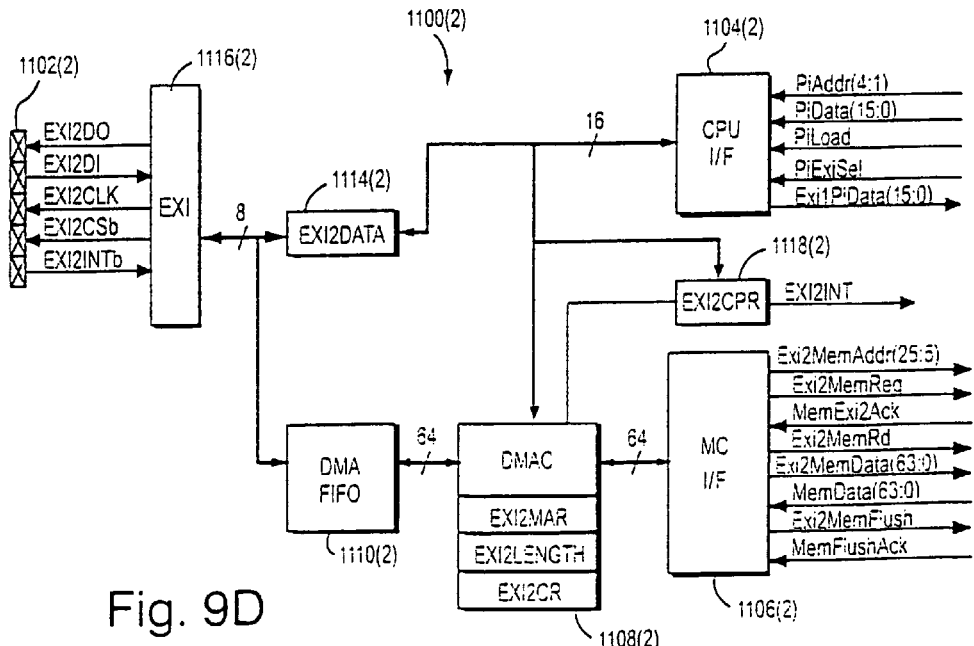

Block diagrams for the example external channel one interface 1100(1) and example external channel two interface 1100(2) are shown in FIGS. 9C and 9D, respectively. As can be appreciated from comparing FIGS. 9B, 9C and 9D, the channel one and channel two structures 1100(1), 1100(2) are quite similar to one another and each differ from the FIG. 9B structure in omitting the ROM control 1112(0).

The following table sets forth the various signal descriptions for the signals provided to/from example external interface ports 1102:

| Name | Dir | Type | Description |
|---|---|---|---|
| EXI0DO0 | O | LVCMOS | EXI Data Out 0 Channel 0: EXI0DO0 is an output signal. EXI0DO0 transmits the serial data out to the slave device, the MSB is sent first. The slave should latch data on the rising edge of the EXI0CLK0. |
| EXI0DI0 | I | LVCMOS | EXI Data In 0 Channel 0: EXI0DI0 is an input signal. EXI0DI0 receives the serial data from the slave device, the MSB is received first. The data is latched on the rising edge of the EXI0CLK0. |
| EXI0CLK0 | O | LVCMOS | EXI Clock 0 Channel 0: EXI0CLK0 is an output signal. EXI0CLK0 synchronizes the transfer of the EXI0DO0 and EXI0DI0 signals. Data is sent on a byte basis and 1 byte can be sent in 8 clock cycles. The clock frequency is s/w programmable, see EXI0CPR[CLK]. |
| EXI0DO1 | O | LVCMOS | EXI Data Out 1 Channel 0: EXI0DO1 is an output signal. EXI0DO1 transmits the serial data out to the slave device, the MSB is sent first. The slave should latch data on the rising edge of the EXI0CLK1. |
| EXI0DI1 | I | LVCMOS | EXI Data In 1 Channel 0: EXI0DI1 is an input signal. EXI0DI1 receives the serial data from the slave device, the MSB is received first. The data is latched on the falling edge of the EXI0CLK1. |
| EXI0CLK1 | I | LVCMOS | EXI Clock 1 Channel 0: EXI0CLK1 is an output signal. EXI0CLK1 synchronizes the transfer of the EXI0DO1 and EXI0DI1 signals. Data is sent on a byte basis and 1 byte can be sent in 8 clock cycles. The clock frequency is s/w programmable, see EXI0CPR[CLK]. |
| EXI0CS[2:0]B | I | LVCMOS | EXI Chip Select Channel 0 [2:0]B: EXI0CS[2:0]B are output signals, active low. The EXI0CS[2:0]B signals determine which EXI device on channel 0 is currently selected. |
| EXI0INTB | I | LVCMOS | EXI Interrupt Channel 1: EXI0INTB is an input signal, active low, edge triggered. When asserted, this signal will generate a main processor interrupt. The interrupt should be cleared by accessing the interrupting device through the EXI interface. |
| EXI0EXTIN | I | LVCMOS | EXI External In Channel 0: EXI0EXTIN is an input signals, when asserted high, it indicates that a device has been plugged into the EXI bus. |
| EXI1DO | O | LVCMOS | EXI Data Out Channel 1: EXI1DO is an output signal. EXI1DO transmits the serial data out to the slave device, the MSB is sent first. The slave should latch data on the rising edge of the EXI1CLK. |
| EXI1DI | I | LVCMOS | EXI Data In Channel 1: EXI1DI is an input signal. EXI1DI receives the serial data from the slave device, the MSB is received first. The data is latched on the falling edge of the EXI1CLK. |
| EXI1CLK | I | LVCMOS | EXI Clock Channel 1: EXI1CLK is an output signal. EXI1CLK synchronizes the transfer of the EXI1DO and EXI1DI signals. Data is sent on a byte basis and 1 byte can be sent in 8 clock cycles. The clock frequency is s/w programmable, see EXI1CPR[CLK]. |
| EXI1CS0B | I | LVCMOS | EXI Chip Select Channel 1 0B: EXI1CS0B is an output signal, active low. The EXI1CS0B signals determine which EXI device on channel 1 is currently selected. |
| EXI1INTB | I | LVCMOS | EXI Interrupt Channel 1: EXI1INTB is an input signal, active low, edge triggered. When asserted, this signal will generate a CPU interrupt. The interrupt should be cleared by accessing the interrupting device through the EXI interface. |
| EXI1EXTIN | I | LVCMOS | EXI External In Channel 1: EXI1EXTIN is an input signals, when asserted high, it indicates that device has been plugged into the EXI bus. |
| EXI2DO | O | LVCMOS | EXI Data Out Channel 2: EXI2DO is an output signal. EXI2DO transmits the serial data out to the slave device, the MSB is sent first. The slave should latch data on the rising edge of the EXI2CLK. |
| EXI2DI | I | LVCMOS | EXI Data In Channel 2: EXI2DO is an input signal. EXI2DI receives the serial data from the salve device, the MSB is received first. The data is latched on the falling edge of the EXI2CLK. |

-continued

| Name | Dir | Type | Description |
|---|---|---|---|
| EXI2CLK | I | LVCMOS | EXI Clock Channel 2: EXI2CLK is an output signal. EXI2CLK synchronizes the transfer of the EXI2DO and EXI2DI signals. Data is sent on a byte basis and 1 byte can be sent in 8 clock cycles. The clock frequency is s/w programmable, see EXI2CPR[CLK]. |
| EXI2INTB | I | LVCMOS | EXI Interrupt Channel 2: EXI2INTB is an input signal, active low, edge triggered. When asserted, this signal will generate a CPU interrupt. The interrupt should be cleared by accessing the interrupting device through the EXI interface. |
| EXI2CS0B | O | LVCMOS | EXI Chip Select Channel 2 0B: EXI2CS0B are output signals, active low. The EXI2CS0B signals determine which EXI device on channel 2 is currently selected. |

Serial Peripheral Interface

In one embodiment, main processor 110 can set the clock rates of these EXI channels to 32 MHz, 16 Mhz, 8 MHz, 4 MHz, 2 MHz and 1 MHz and these clocks rates may be set independently for the different channels. Chip select registers are used to identify the device to which the EXI bus is connected. For the example EXI0, CS0 (Chip Select 0) is set for a connection to an internal real time clock, CS1 is set for a connection to an internal IPL_ROM, and CS2 is set for an external device (modem, voice recognition system and the like). For the example EXI1, CS1 is set for a connection to an internal flash ROM and CS1 is set for an external device (modem, voice recognition system, and the like). Other configurations are possible.

Small size data as command is transferred between CPU registers immediately and large size data is transferred between main memory by direct memory access (DMA).

FIG. 9E shows example external interface registers. In the example embodiment, the base address for these registers is 0x0C006800. The following show example register definitions:

| :EXI Channel Parameter Register for channel 0 |||||
|---|---|---|---|---|
| Mnemonic: EXI0CSR |||||
| Offset: 0x00 |||||
| Size 32 bits |||||
| EXI0CPR |||||
| Bits | Mnemonic | Type | Reset | Description |
| 31:14 | | R | 0x0 | Reserved |
| 13 | ROMDIS | RWO | 0x0 | ROM Disable: This bit disables access to the IPL Mask ROM attached to CS1. Once this bit is enabled, it can only be disabled again by global reset. The ROM descramble logic will become disabled and any reads to the memory mapped ROM area will return all 0xF. When descrambler is enabled all EXI0 data will be descrambled, so only the IPL_ROM may be accessed through EXI0 until ROMDIS is set to '1'. Write: 0 = No effect 1 = Disable ROM access Read: 0 = ROM access enabled 1 = ROM access disabled |
| 12 | EXT | R | 0x0 | External Insertion Status: 0 = EXI0 External EXI device not present 1 = EXI0 External EXI device present |
| 11 | EXTINT | RWC | 0x1 | External Insertion Interrupt Status and clear. On read this bit indicates the current status of the external insertion interrupt. When a '1' is written to this register, the interrupt is cleared. This interrupt indicates than an external EXI device has been removed from channel 1. To check whether the device has been inserted or removed, check the EXI0CPR[EXT] bit. When this bit is set, the channel's expansion EXI interface outputs go to high-z. Write: 0 = No effect 1 = Clear External Insertion Interrupt Read: 0 = External Insertion Interrupt has not been requested 1 = External Insertion Interrupt has been requested |

-continued

:EXI Channel Parameter Register for channel 0
Mnemonic: EXI0CSR
Offset: 0x00
Size 32 bits
EXI0CPR

| Bits | Mnemonic | Type | Reset | Description |
|---|---|---|---|---|
| 10 | EXTINTMSK | RW | 0x0 | External Insertion Interrupt Mask: Interrupt masking prevents the interrupt from being sent to the main processor, but does not affect the assertion of EXI0CPR[EXTINT]<br>0 = Interrupt masked<br>1 = Interrupt enabled |
| 9 | CS2B | RW | 0x0 | Chip Select 2: This bit controls the EXI0CS2b line, which is active low. To assert access to the device connected to CS2, write '1' to this bit, which will assert EXI0Cs2b by driving it low. For channel 0. The CPU should assert only one of the CS[2:0]B chip selects at any one time. The EXI0 controller h/w will only allow one CS to be asserted. Only one EXI0 device may be accessed at a time. The CPU should not deassert one CS and assert another CS in the same write. Normally used for an external network device (modem, etc.)<br>0 = Chip select deasserted<br>1 = Chip select asserted |
| 8 | CS1B | RW | 0x0 | Chip Select 1: see description for EXI0CPR[CS2B], for channel 0. Normally used for the boot ROM/RTC. |
| 7 | CS0B | RW | 0x0 | Chip Select 0: see description for EXI0CPR[CS2B], for channel 0. Normally used for an external EXI device (flash card, etc.) |
| 6:4 | CLK | RW | 0x0 | Clock Frequency: These bits control the clock frequency of the EXI channel. These bits should only be changed before an EXI transfer has started. Changing the bits during an EXI transfer will have undefined results.<br>000 = 1 MHz<br>001 = 2 MHz<br>010 = 4 MHz<br>011 = 8 MHz<br>100 = 16 MHz<br>101 = 32 MHz<br>110 = Reserved<br>111 = Reserved |
| 3 | TCINT | RWC | 0x0 | Transfer Complete Interrupt Status and clear. On read this bit indicates the current status of the transfer complete interrupt. When a '1' is written to this register, the interrupt is cleared.<br>Write:<br>0 = No effect<br>1 = Clear Transfer Complete Interrupt<br>Read:<br>0 = Transfer Complete Interrupt has not been requested<br>1 = Transfer Complete Interrupt has been requested |
| 2 | TCINTMSK | RW | 0x0 | Transfer Complete Interrupt Mask: Interrupt masking prevents the interrupt from being sent to the main processor, but does not affect the assertion of EXI0CPR[TCINT]<br>0 = Interrupt masked<br>1 = Interrupt enabled |
| 1 | EXIINT | RWC | 0x0 | EXI0 Interrupt Status: This bit indicates the current status of the EXI0 interrupt. The interrupt is cleared by accessing the expansion device and clearing the interrupt on the device itself and cleared locally when a '1' is written to this register. This interrupt input is edge triggered.<br>Write:<br>0 = No effect<br>1 = Clear EXI0 Interrupt<br>Read:<br>0 = EXI0 Interrupt has not been requested<br>1 = EXI0 Interrupt has been requested |

-continued

: EXI Channel Parameter Register for channel 0
Mnemonic: EXI0CSR
Offset: 0x00
Size 32 bits
EXI0CPR

| Bits | Mnemonic | Type | Reset | Description |
|---|---|---|---|---|
| 0 | EXIINTMSK | RW | 0x0 | EXI0 Interrupt Mask: Interrupt masking prevents the interrupt from being sent to the main processor, but does not affect the assertion of EXI0CPR[EXIINT] <br> 0 = Interrupt masked <br> 1 = Interrupt enabled |

EXI0MAR: EXI0 DMA Memory Address Register
Mnemonic: EXI0MAR
Offset: 0x04
Size 32 bits
EXI0MAR

| Bits | Mnemonic | Type | Reset | Description |
|---|---|---|---|---|
| 31:26 |  | R | 0x0 | Reserved |
| 25:5 | EXIMAR | RW | 0x0 | EXI DMA Memory Address Register: This register indicates the starting main memory address used for the current DMA command. The memory address is the destination address when EXI0CR[RW] is set to 'read' and is the source address when set to 'write'. |
| 4:0 |  | R | 0x0 | These low address bits read back zero since all DMA transfers are 32 B aligned. Always write '0x0'. |

EXI0LENGTH: EXI0 DMA Transfer Length Register
Mnemonic: EXI0LENGTH
Offset: 0x08
Size 32 bits
EXI0LENGTH

| Bits | Mnemonic | Type | Reset | Description |
|---|---|---|---|---|
| 31:26 |  | R | 0x0 | Reserved |
| 25:5 | EXILENGTH | RW | 0x0 | EXI0 DMA Length Register: This register indicates the length of the data transfer in bytes for the current DMA command. |
| 4:0 |  | R | 0x0 | These low length bits read back zero since all DMA transfers are multiples of 32 B long. Always write '0x0'. |

EXI0CR: EXI Control Register for channel 0
Mnemonic: EXI0CR
Offset: 0x0C
Size 32 bits
EXI0CR

| Bits | Mnemonic | Type | Reset | Description |
|---|---|---|---|---|
| 31:6 |  | R | 0x0 | Reserved |
| 5:4 | TLEN | RW | 0x0 | Transfer Length: These bits control the amount of data transferred when an immediate mode transfer (either EXI read or write) is executed. <br> 00 = 1 Byte <br> 01 = 2 Bytes <br> 10 = 3 Bytes <br> 11 = 4 Bytes |
| 3:2 | RW | RW | 0x0 | Read/Write: Controls the direction of the EXI transfer. <br> 00 = EXI Read (Transfer from EXI device to main processor) <br> 01 = EXI Write (Transfer from main processor to EXI device) <br> 10 = EXI Read/Write (Transfer both to/from main processor —Invalid for DMA |
| 1 | DMA | RW | 0x0 | Transfer DMA Mode: controls whether the EXI data is transferred by using DMA mode to/from main memory or if EXI data is transferred directly to/from the EXI Data Register (EXI0DR). When in immediate mode, the EXIMAR and EXILENGTH registers are ignored and EXI0CR[TLEN] indicates the number of bytes to transfer. <br> 0 = Immediate Mode <br> 1 = DMA Mode |
| 0 | TSTART | RW | 0x0 | Transfer Start: When a '1' is written to this register, the current transfer is executed (e.g., DMA transfer or immediate transfer). When read this bit represents the current transfer status. This bit can be polled by s/w to check for transfer complete. |

-continued

EXI0CR: EXI Control Register for channel 0
Mnemonic: EXI0CR
Offset: 0x0C
Size 32 bits
EXI0CR

| Bits | Mnemonic | Type | Reset | Description |
|---|---|---|---|---|
| | | | | Write:<br>0 = No Effect<br>1 = Start EXI0 Transfer<br>Read:<br>0 = EXI0 Transfer Complete<br>1 = EXI0 Transfer Pending |

EXI0DATA: EXI Data Register for channel 0
Mnemonic: EXI0DATA
Offset: 0x10
Size 32 bits
EXI0DATA

| Bits | Mnemonic | Type | Reset | Description |
|---|---|---|---|---|
| 31:24 | DATA0 | RW | 0x0 | Data 0: This 8-bit register is used to read and write byte packers directly to and from the EXI bus for channel 0. The EXI0CPR must be configured to assert one of the devices CS, before the read or write operation can be performed. The actual read/write operation is triggered by the EXI0CR[TSTART] register and EXI0CR[DMA] set to '0'. During an EXI write operation, this is the first byte written by the EXI interface. The MSB of the byte [31] is received first. |
| 23:16 | DATA1 | RW | 0x0 | Data 1: See description for EXI0DATA[DATA0]. When multiple bytes are transferred this is the second byte transferred. |
| 15:8 | DATA2 | RW | 0x0 | Data 2: See description for EXI0DATA[DATA0]. When multiple bytes are transferred this is the third byte transferred. |
| 7:0 | DATA3 | RW | 0x0 | Data 3: See description for EXI0DATA[DATA0]. When multiple bytes are transferred this is the fourth byte transferred. |

EXI1CPR: EXI Channel Parameter Register for channel 1
Mnemonic: EXI1CPR
Offset: 0x14
Size 32 bits
EXI1CPR

| Bits | Mnemonic | Type | Reset | Description |
|---|---|---|---|---|
| 31:12 | | R | 0x0 | Reserved |
| 12 | EXT | R | 0x0 | External Insertion Status: See description for EXI0CPR[EXT]. |
| 11 | EXTINT | RWC | 0x1 | External Insertion Interrupt Status and clear: See description for EXI0CPR[EXTINT]. |
| 10 | EXTINTMSK | RW | 0x0 | External insertion Interrupt Mask: See description for EXI0CPR[EXTINTMSK]. |
| 9:8 | | R | 0x0 | Reserved |
| 7 | CS0B | RW | 0x1 | Chip Select 0: See description for EXI0CPR[CS2B], for channel 0 |
| 6:4 | CLK | RW | 0x0 | Clock Frequency: See description for EXI0CPR[CLK] |
| 3 | TCINT | RWC | 0x0 | Transfer Complete Interrupt: See description for EXI0CPR[TCINT]. |
| 2 | TCINTMSK | RW | 0x0 | Transfer Complete Interrupt Mask: See description for EXI0CPR[TCINTMSK]. |
| 1 | EXIINT | RWC | 0x0 | EXI1 interrupt Status: See description for EXI0CPR[EXIINT]. |
| 0 | EXIINTMSK | RW | 0x0 | EXI1 Interrupt Mask: See description for EXI0CPR[EXIINTMSK]. |

EXI1MAR: EXI1 DMA Memory Address Register
Mnemonic: EXI1MAR
Offset: 0x18
Size 32 bits
EXI1MAR

| Bits | Mnemonic | Type | Reset | Description |
|---|---|---|---|---|
| 31:26 | | R | 0x0 | Reserved |
| 25:5 | EXIMAR | RW | 0x0 | EXI1 DMA Memory Address Register: See description for EXI0MAR[EXIMAR], for channel 1 |
| 4:0 | | R | 0x0 | These low address bits read back zero since all DMA transfer are 32 B aligned. Always write '0x0'. |

EXI1LENGTH: EXI1 DMA Transfer Length Register
Mnemonic: EXI1LENGTH
Offset: 0x1C
Size 32 bits
EXI1LENGTH

| Bits | Mnemonic | Type | Reset | Description |
|---|---|---|---|---|
| 31:26 | | R | 0x0 | Reserved |
| 25:5 | EXILENGTH | RW | 0x0 | EXI1 DMA Length Register: See description for EXI0LENGTH[EXILENGTH], for channel 1 |
| 4:0 | | R | 0x0 | These low length bits read back zero since all DMA transfers are multiples of 32 B long. Always write '0x0'. |

EXI1CR: EXI Control Register for channel 1
Mnemonic: EXI1CR
Offset: 0x20
Size 32 bits
EXI1CR

| Bits | Mnemonic | Type | Reset | Description |
|---|---|---|---|---|
| 31:6 | | R | 0x0 | Reserved |
| 5:4 | TLEN | RW | 0x0 | Transfer Length: See description for EXI0CR[TLEN]. |
| 3:2 | RW | RW | 0x0 | Read/Write: See description for EXI0CR[RW]. |
| 1 | DMA | RW | 0x0 | Transfer DMA Mode: See description for EXI0CR[DMA]. |
| 0 | TSTART | RW | 0x0 | Transfer Start: See description for EXI0CR[TSTART]. |

EXI1DATA: EXI Data Register for channel 1
Mnemonic: EXI1DATA
Offset: 0x24
Size 32 bits
EXI1DATA

| Bits | Mnemonic | Type | Reset | Description |
|---|---|---|---|---|
| 31:24 | DATA0 | RW | 0x0 | Data 0: See description for EXI0DATA[DATA0]. This is the first byte transferred. |

-continued

EXI1DATA: EXI Data Register for channel 1
Mnemonic: EXI1DATA
Offset: 0x24
Size 32 bits
EXI1DATA

| Bits | Mnemonic | Type | Reset | Description |
|---|---|---|---|---|
| 23:16 | DATA1 | RW | 0x0 | Data 1: See description for EXI0DATA[DATA0]. When multiple bytes are transferred this is the second byte transferred. |
| 15:8 | DATA2 | RW | 0x0 | Data 2: See description for EXI0DATA[DATA0]. When multiple bytes are transferred this is the third byte transferred. |
| 7:0 | DATA3 | RW | 0x0 | Data 3: See description for EXI0DATA[DATA0]. When multiple bytes are transferred this is the fourth byte transferred. |

EXI2CPR: EXI Channel Parameter Register for channel 2
Mnemonic: EXI2CPR
Offset: 0x28
Size 32 bits
EXI2CPR

| Bits | Mnemonic | Type | Reset | Description |
|---|---|---|---|---|
| 31:18 | | R | 0x0 | Reserved |
| 7 | CS0B | RW | 0x0 | Chip Select 0: See description for EXI0CPR[CS2B], for channel 0 |
| 6:4 | CLK | RW | 0x0 | Clock Frequency: See description for EXI0CPR[CLK] |
| 3 | TCINT | RWC | 0x0 | Transfer Complete Interrupt: See description for EXI0CPR[TCINT]. |
| 2 | TCINTMSK | RW | 0x0 | Transfer Complete Interrupt Mask: See description for EXI0CPR[TCINTMSK]. |
| 1 | EXIINT | RWC | 0x0 | EXI2 Interrupt Status: See description for EXI0CPR[EXIINT]. |
| 0 | EXIINTMSK | RW | 0x0 | EXI2 Interrupt Mask: See description for EXI0CPR[EXIINTMSK]. |

EXI2MAR: EXI2 DMA Memory Address Register
Mnemonic: EXI2MAR
Offset: 0x2C
Size 32 bits
EXI2MAR

| Bits | Mnemonic | Type | Reset | Description |
|---|---|---|---|---|
| 31:26 | | R | 0x0 | Reserved |
| 25:5 | EXIMAR | RW | 0x0 | EXI2 DMA Memory Address Register: See description for EXI0MAR[EXIMAR], for channel 2 |
| 4:0 | | 4 | 0x0 | These low address bits read back zero since all DMA transfers are 32 B aligned. Always write '0x0'. |

EXI2LENGTH: EXI2 DMA Transfer Length Register
Mnemonic: EXI2LENGTH
Offset: 0x30
Size 32 bits
EXI2LENGTH

| Bits | Mnemonic | Type | Reset | Description |
|---|---|---|---|---|
| 31:26 | | R | 0x0 | Reserved |
| 25:5 | EXILENGTH | RW | 0x0 | EXI2 DMA Length Register: See description for EXI0LENGTH[EXILENGTH], for channel 2 |
| 4:0 | | 4 | 0x0 | These low length bits read back zero since all DMA transfers are multiples of 32 B long. Always write '0x0. |

EXI2CR: EXI Control Register for channel 2
Mnemonic: EXI2CR
Offset: 0x34
Size 32 bits
EXI2CR

| Bits | Mnemonic | Type | Reset | Description |
|---|---|---|---|---|
| 31:6 | | R | 0x0 | Reserved |
| 5:4 | TLEN | RW | 0x0 | Transfer Length: See description for EXI0CR[TLEN]. |
| 3:2 | RW | RW | 0x0 | Read/Write: See description for EXI0CR[RW]. |
| 1 | DMA | RW | 0x0 | Transfer DMA Mode: See description for EXI0CR[DMA]. |
| 0 | TSTART | RW | 0x0 | Transfer Start: See description for EXI0CR[TSTART]. |

EXI2DATA: EXT Data Register for channel 2
Mnemonic: EXI2DATA
Offset: 0x38
Size 32 bits
EXI2DATA

| Bits | Mnemonic | Type | Reset | Description |
|---|---|---|---|---|
| 31:24 | DATA0 | RW | 0x0 | Data 0: See description for EXI0DATA[DATA0]. This is the first byte transferred. |
| 23:16 | DATA1 | RW | 0x0 | Data 1: See description for EXI0DATA[DATA0]. When multiple bytes are transferred this is the |
| 15:8 | DATA2 | RW | 0x0 | Data 2: See description for EXI0DATA[DATA0]. When multiple bytes are transferred this is the third byte transferred. |
| 7:0 | DATA3 | RW | 0x0 | Data 3: See description for EXI0DATA[DATA0]. When multiple bytes are transferred this is the fourth byte transferred. |

Example Audio Interfaces

Figure 10A:
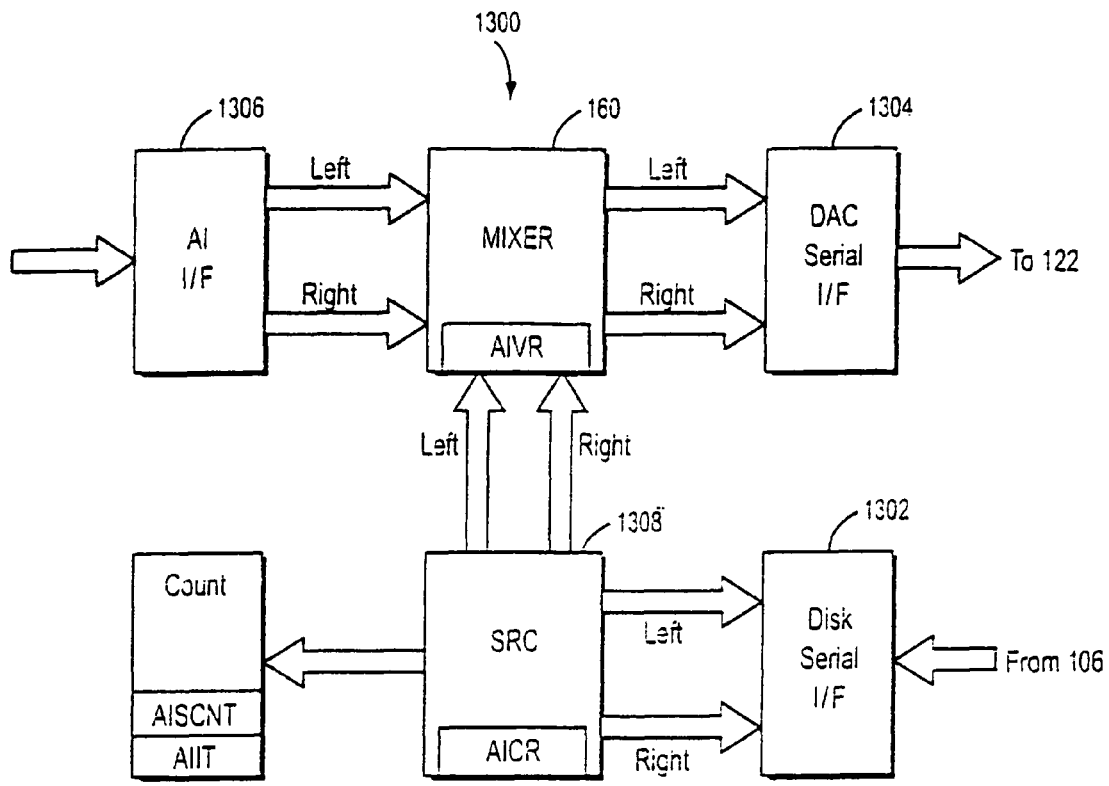
FIGS. 10A and 10B show example audio interfaces.

FIG. 10A shows an example collection of audio interfaces for system 50. In the example embodiment, audio interfaces 1300 include a disk serial interface 1302, a digital-to-analog converter interface 1304, and an audio interface 1306. Digital-to-analog converter (DAC) serial interface 1304 receives an output from mixer 160 and converts that output to a form suitable for processing by audio codec 122 for reproduction on speakers 61. The disk serial interface 1302 receives the streaming audio input from mass storage access device 106 and provides it to a source block 1308. The audio interface 1306 is capable of reading digital audio from buffers stored in main memory and providing left and right digital audio streams to mixer 160.

The example embodiment audio interfaces 1300 provide support for external 16-bit stereo digital-to-analog converter interfaces running at a fixed 48 kHz sampling rate. The disk serial interface 1302 provides an optical disk streaming audio input interface providing 16-bit serial interface running at 32 kHz or 48 kHz sampling rate. This allows audio mixer 160 to mix the streaming audio input at programmable audio volume control. Disk serial interface 1302 provides sample rate conversion "on the fly" to, for example, change from a 32 kHz sampling rate provided by the mass storage access device 106 to a 48 kHz sampling rate.

Figure 10B:
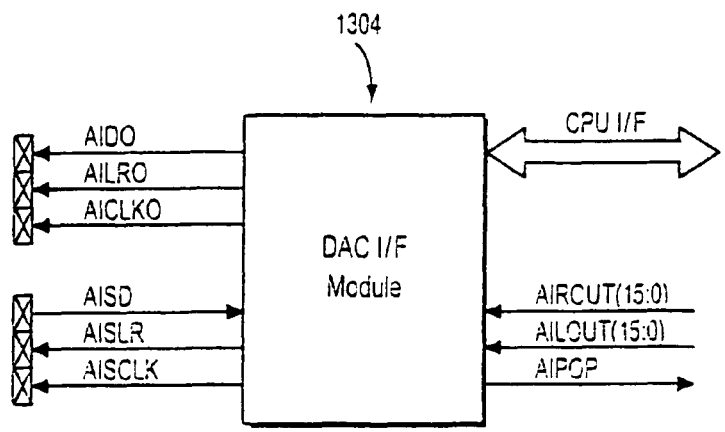

FIG. 10B shows the external interface of the digital-to-analog converter serial interface 1304. This interface streams the audio output data from an audio input buffer to the final audio mixer 160 in DAC interface. The interface treats the AI buffer as a simple FIFO and expects that buffer to always have the next sample ready. Data is requested at the DAC sample rate (e.g., 48 kHz).

The following are example signal definitions for the various signals shown in FIG. 10B:

| Name | Dir | Type | Description |
|---|---|---|---|
| AID | O | LVCMOS | Audio Interface Data Out: AIDO is an output signal. AIDO drives the serial bit stream of the Left/Right Audio data driven out to the stereo audio DAC, synchronized by the rising edge of the bit clock AICLKO and AILRO signal which determines if the current word is a left sample or a right sample. |
| AILR | O | LVCMOS | Audio Interface Left Right Out: AILRO is an output signal. AILRO is a frame signal for the serial bit stream and determines the left/right channel of the current word. An edge of AILRO also acts as a sample conversion signal to the DAC. ATLRO toggles at the sample rate frequency (48 kHz). |
| AICLK | O | LVCMOS | Audio Interface Clock Out: AICLKO is an output signal. AICLKO is the bit clock for the AIDO serial bit stream. |
| AISD | I | LVCMOS | Audio Interface Streaming Data: AISD is an input signal AISD is the serial bit stream of the Left Right audio data driven in from the Disk drive, synchronized by the rising edge of the bit clock. |
| AISLR | O | LVCMOS | Audio Interface Streaming Left Right: AISLR is an output signal. AISLR is a frame signal for the serial bit stream and determines the left/right channel of the current word. AISLR toggles at the sample rate frequency (32 kHz/ 48 kHz). This signal also controls the flow of the audio data. After this current stereo sample is received, if AISLR does not toggle, the Disk assumes that the stream is stopped/paused and sends 0' as data. The Disk does not begin sending data until it has received a high-low-high sequence. |
| AISCLK | O | LCMOS | Audio Interface Streaming Clock: AISCLK is an output signal. AISCLK is the bit clock for the AISD serial bit stream. The AISCLK is a free running clock. |

FIG. 10C shows example audio interface registers having a base address of 0x0C006C00. The following show example register descriptions:

AICR: Audio Interface Control Register
Mnemonic: AICR
Offset: 0x00
Size 32 bits
AICR

| Bits | Mnemonic | Type | Reset | Description |
|---|---|---|---|---|
| 31:6 | | R | 0x0 | Reserved |
| 5 | SCRESET | RW | 0x0 | Sample Counter Reset: When a '1' is written to this bit the AISLRCNT register is rest to 0x00.<br>Read:<br>always 0<br>Write:<br>0 = No effect<br>1 = Reset AISLRCNT register |
| 4 | AIINTVLD | RW | 0x0 | Audio Interface Interrupt Valid. This bit controls whether AIINT is affected by the AIIT register matching AISLRCNT. Once set, AIINT will hold its last value.<br>0 = March affects AIINT.<br>1 = AIINT hold last value. |
| 3 | AIINT | RW | 0x0 | Audio Interface Interrupt Status and clear. On read this bit indicates the current status of the audio interface interrupt. When a '1' is written to this register, the interrupt is cleared. This interrupt indicates that the AIIT register matches the AISLRCNT. This bit asserts regardless of the setting of AICR[AIMSK]. |

-continued

AICR: Audio Interface Control Register
Mnemonic: AICR
Offset: 0x00
Size 32 bits
AICR

| Bits | Mnemonic | Type | Reset | Description |
|---|---|---|---|---|
| | | | | Write:<br>0 = No effect<br>1 = Clear Audio Interface Interrupt<br>Read:<br>0 = Audio Interface Interrupt has not been requested<br>1 = Audio Interface Interrupt has been requested. |
| 2 | AIINTMSK | RW | 0x0 | Audio Interface Interrupt Mask:<br>0 = Interrupt masked<br>1 = Interrupt enabled |
| 1 | AFR | RW | 0x0 | Auxiliary Frequency Register: Controls the sample rate of the streaming audio data. When set to 32 kHz sample rate, the SRC will convert the streaming audio data to 48 kHz. This bit should only be changed when Streaming Audio is stopped (AICR[PSTAT] set to 0).<br>0 = 32 kHz sample rate<br>1 = 48 kHz sample rate |
| 0 | PSTAT | RW | 0x0 | Playing Status: This bit enables the AISLR clock which controls the playing/stopping of audio streaming. When this bit is AISLRCNT register will increment for every stereo pair of samples output.<br>0 = Stop or Pause streaming audio (AISLR clock disabled)<br>1 = Play streaming audio (AISLR clock enabled) |

AIVR: Audio Interface Volume Register
Mnemonic: AIVR
Offset: 0x04
Size 32 bits
AIVR

| Bits | Mnemonic | Type | Reset | Description |
|---|---|---|---|---|
| 31:16 | | R | 0x0 | Reserved |
| 15:8 | AVRR | RW | 0x0 | Auxiliary Volume Register: Controls the volume of the auxiliary sound (right channel) 0xFF is maximum volume, 0x00 is muted. |
| 7:0 | AVRL | RW | 0x0 | Auxiliary Volume Register: Controls the volume of the auxiliary sound (left channel) 0xFF is maximum volume, 0x00 is muted. |

AISCNT: Audio Interface Sample Counter
Mnemonic: AISCNT
Offset: 0x08
Size 32 bits
AISCNT

| Bits | Mnemonic | Type | Reset | Description |
|---|---|---|---|---|
| 31:0 | AISCNT | R | 0x0 | Audio Interface Sample Counter: This register counts the number of AIS stereo samples that have been output. It is enabled by AICR[PSTAT]. It can be cleared by the AICR[SCRESET] register. |

AIIT: Audio Interface Interrupt Timing
Mnemonic: AIIT
Offset: 0x0C
Size 32 bits
AIIT

| Bits | Mnemonic | Type | Reset | Description |
|---|---|---|---|---|
| 31:0 | AIIT | R | 0x0 | Audio Interface Interrupt Timing: This register indicates the stereo sample count to issue an audio interface interrupt to the main processor. The interrupt is issued when the value of the AISLRCNT register matches the content of this register. |

Example Video Interface

Video interface 164 in the example embodiment reads color information stored in main memory 112 and sends it to display 56. In more detail, the example video interface 164 has the following functions:

interfaces with an external video encoder (e.g., using a 10-pin—eight data pins plus one clock plus one phase—interface at 27 MHz,
generates NTSC, PAL or M-PAL timing,
requests pixels from the external frame buffer for display,
allows panning and windowing of a display region,
provides a video interrupt counter (resettable on field or frame basis),
interrupts the main processor 110 using four programmable timing registers,
captures raster position using a pair of light gun latches,
performs 4:4:4 RGB to 4:2:2 YCrCb conversion,
applies gamma correction to the RGB signal, and
interfaces to a 3D Liquid Crystal Display device.

Main processor 110 can write instructions to video interface 164 via a register interface. Video interface 164 can access main memory external frame buffer 113 via the graphics memory request arbitration 130. Additionally, video interface 164 provides an output to an external video encoder comprising three sets of signals:
- video clock,
- video clock phase, and
- video data.

Figure 11A:
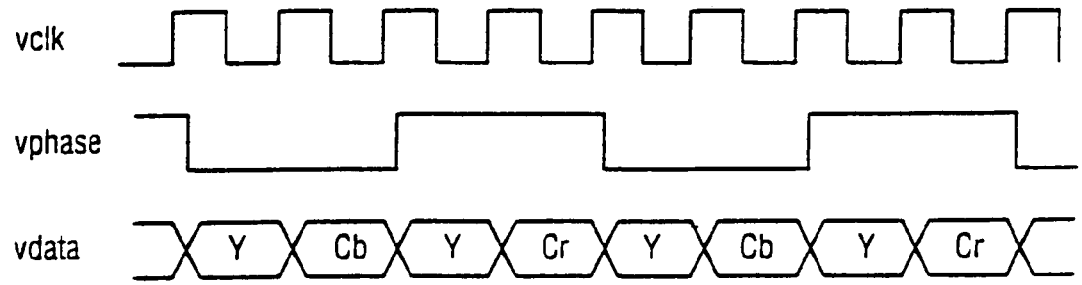
FIG. 11A-11H show various timing diagrams and elements of an example video controller.

In the example embodiment, the video clock may be a single line having a 27 MHz rate. The video phase may provide a signal indicating YCb (low) or YCr (high) set on a single line. The video data bus may be eight bits wide, and contain YcrCb data during active display and video timing signals during blanking. An example timing diagram for this bus is shown in FIG. 11A.

Because the example embodiment clamps Y to 0x10 during active display, Y is set to 0x00 during the vertical blanking interval. During that time, CbCr are used for outputting video timing signals that may be encoded as follows:

| U/V Data | Flag | Description |
| --- | --- | --- |
| Bit 7 | C | Composite Sync Flag (active low). Refer to the timing diagrams. |
| Bit 6 | F | Field Flag. F = "0" for odd-number fields (Fields 1, 3, . . . ), F = "1" for even-number fields (Fields 2, 4, . . . ). |
| Bit 5 | V | Vertical Sync Flag (active low). Refer to timing diagrams. |
| Bit 4 | H | Horizontal Sync Flag (active low). Refer to timing diagrams. |
| Bit 3 | B | Burst Flag (active low). This signal indicates the location of the color burst. It is active once every line. |
| Bit 2 | K | Burst Blank Flag (active low). When active, color burst of a line should be blanked out. |
| Bit 1 | N | NTSC/PAL and M-PAL Mode Flag. N = "0" for NTSC mode, N = "1" for PAL or M-PAL mode. |
| Bit 0 | I | Interlace/Non-Interface Mode Flag. I = "0" for interlace mode, I = "1" for non-interlace mode. |

Figure 11B:
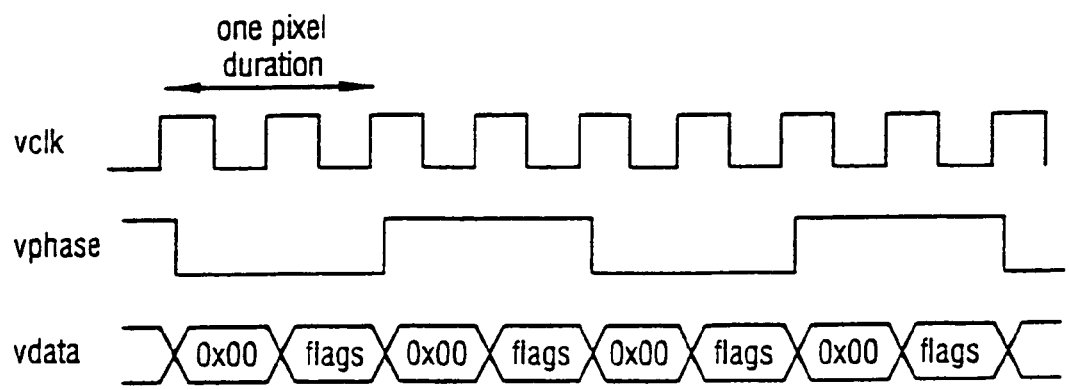

Because the timing signals are output in the Cb and Cr data only in the example embodiment, they should be expanded back to 13.5 MHz inside of the video encoder. As a result, horizontal sync and burst may be shifted by one pixel. An example timing diagram is shown in FIG. 11B.

Figure 11C:
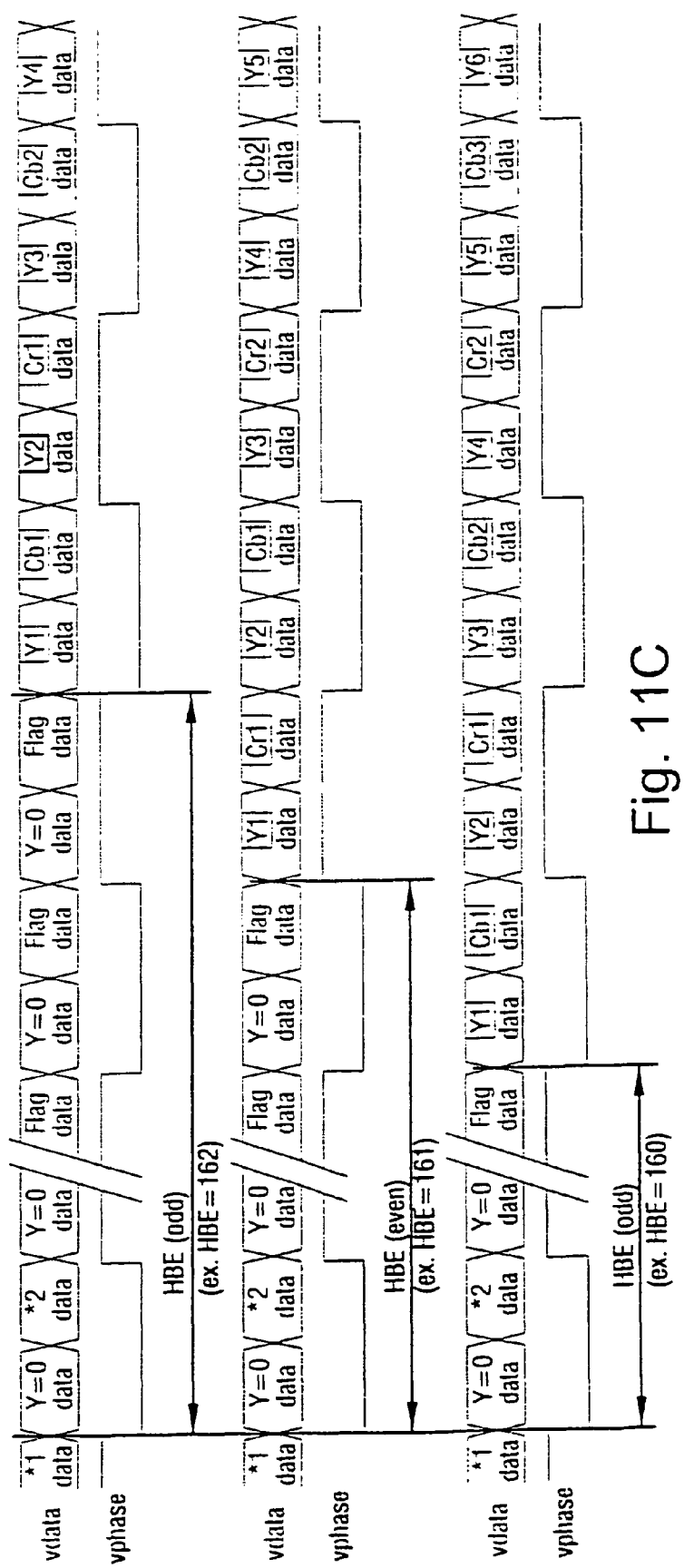

In the example embodiment, vertical blanking can end on an even pixel (HBE is even), or it can end on an odd pixel (HBE is odd). In cases where HBE is even, the first chroma sample will be Cb followed by Cr, etc. In cases where HBE is odd, the first chroma sample will be Cr followed by Cb, etc. The diagram of FIG. 11C illustrates this.

The video interface 164 also includes a gun trigger interface consisting of two pins. Each pin detects the instance of a screen flash when a light gun trigger is pulled. Latch circuitry is used to mark the value of a screen timer when a screen flash is registered.

In the example embodiment, in order to simplify the external video encoder, the video interface 164 generates most of the video timing required by the encoder. Video interface 164 supports the timing of NTSC, PAL and M-PAL. In the example embodiment, video interface 164 displays the top field only in a non-interlace mode. Video interface 164 includes a timing generator responsible for generating video timing, control signals and interrupts. Basically this timing generator consists of two counters: a vertical line counter and a horizontal pixel counter. Once enabled, these counters run continuously at a pixel clock rate of, e.g., 27 MHz. A programmable decoder decodes the outputs of these counters. The decoder operates in four modes: NTSC, PAL, M-PAL, and debug mode. The debug mode is used for testing and simulation.

Video interface 164 generates addresses required to access pixel data from external frame buffer 113. It supports various addressing features including programmable picture size, windowing and pixel resolution pan and scan.

Figure 11D:
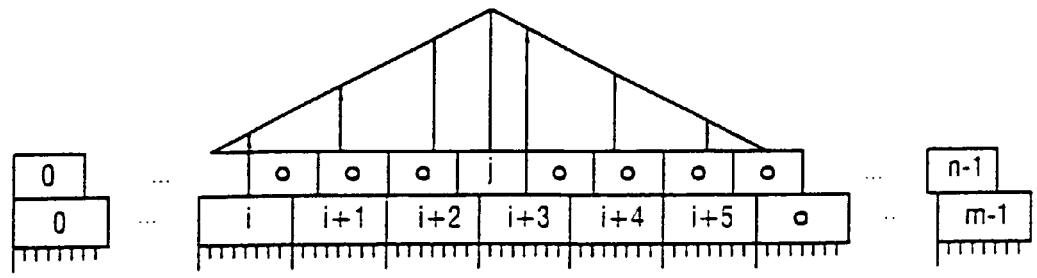

Video interface 164 also supports horizontal scaling such that a smaller frame buffer can be stretched horizontally to the desired display size. This is achieved by using a 6-tap sampling filter. Each filter tap has eight phases and a zero tap is added to have a total of forty-nine taps in the example embodiment. An output pixel is sampled to a 1/256 sub-pixel grid and is rounded to the nearest 1/8 sub-pixel in the example embodiment. This results in scan line being sampled up to eight times before it is down sampled to a target frequency. See example FIG. 11D.

The Y, Cr and Cb components are buffered in three separate shift registers in the example embodiment. Each register is responsible for replicating the first and last pixels for filtering at the boundaries. To ease implementation, Cb and Cr pixels are averaged to 4:4:4 before filtering. This prevents chroma words from reading ahead of luma words. It also allows luma and chroma to share the same control logic.

An internal stepper controls new sample position. The stepper is incremented by a step size every output pixel. The lowest eight bits of the stepper in the example embodiment are rounded to three bits for determining the phase of the filter. Only one bit to the left of the binary pointer is kept. If that bit is toggled, a new pixel is shifted into the pixel registers. The step size in the example embodiment for the stepper is determined by:

$$\text{step size} = \text{floor}(256 \times \text{destination size}/\text{source size})/256.$$

Figure 11E:
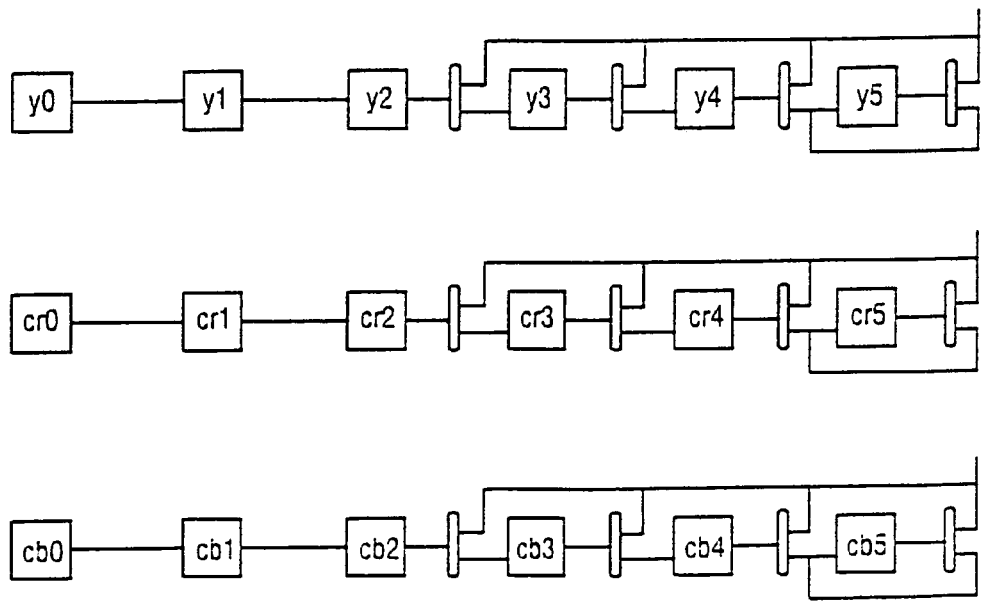
Figure 11F:
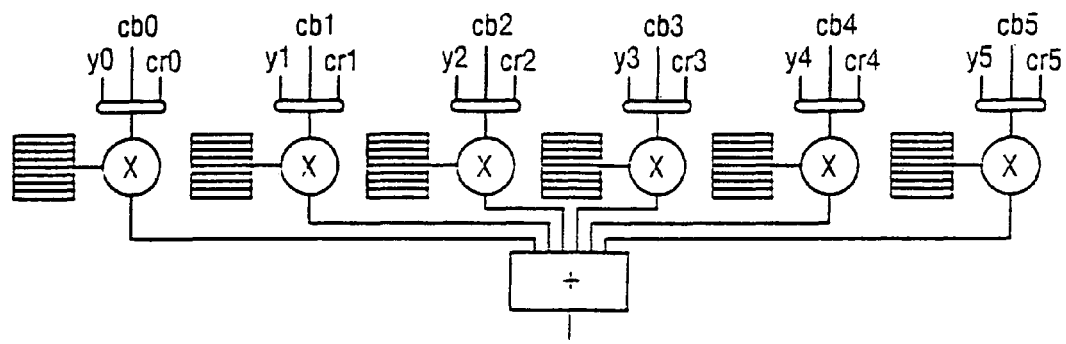

FIG. 11E shows example shifters, and FIG. 11F shows an example filter data path. In the example embodiment, the video clock rate is twice the pixel rate (27 vs. 13.5), so the data path is time shared between the three components. The example data path shown in FIG. 11F consists of six multipliers, an adder and a set of lookup tables.

The step size and the filter coefficients are set up through the video interface 164 register interface in the example embodiment. The filter can be programmed to have different cut off frequencies, passband ripple and stopband attenuation. As the filter is symmetrical, only half of it is programmed. To conserve hardware in the filter, the filter coefficients are enveloped so that the center sixteen coefficients are in the range [0,2.0]. The outer 32 coefficients are in the range [−0.125, 0.125]. Eight times up-sampling is equivalent to a 0.5 Hz lowpass filter at an 8 Hz sampling rate. A conventional SINC filtering function can be used for windowing in the example embodiment.

Figure 11G:
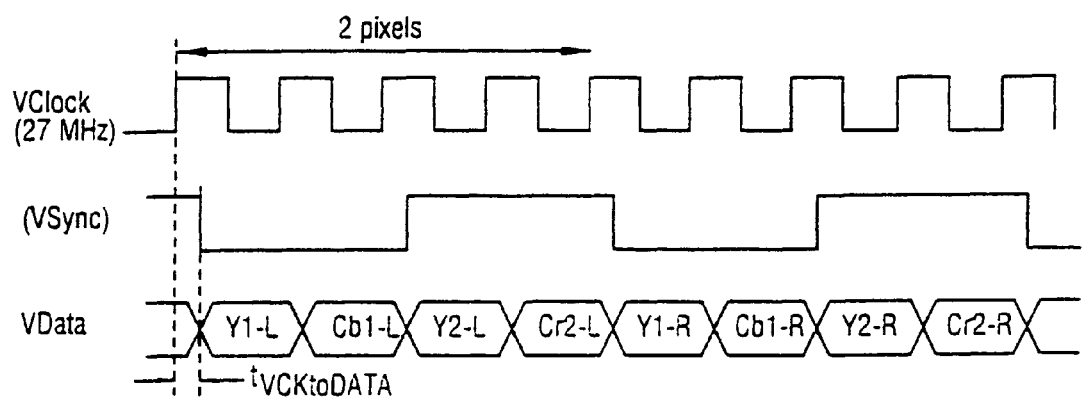

Video interface 164 can support a 3D liquid crystal display by merging two frame buffer images (left and right) into a single stream of video. The output interleaves between the left and right pictures every two pixels. FIG. 11G shows an example timing diagram.

Figure 11H:
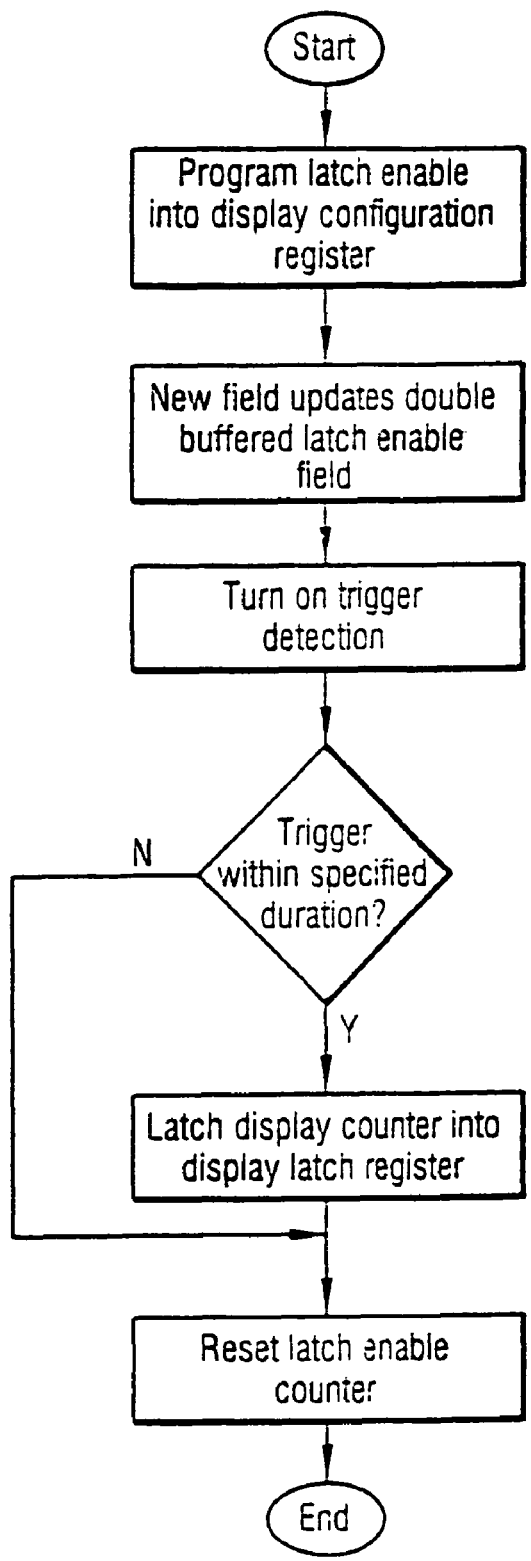

The example embodiment video interface 164 provides a gun trigger control supporting three sampling modes: 1-field (gun trigger is sampled for one field), 2-field (gun trigger is sampled for two fields), and continuous. In the 1/2-field mode, the detection mechanism includes the event sequence shown in FIG. 11H. In continuous mode, the trigger is sampled continuously until it is disabled.

In the example embodiment, the first gun trigger in a field latches the value of the display counters and gun triggers occurring in the remainder of the field are ignored.

The following tables describe various control registers within example video interface 164. The fourth column in each table shows the power-up reset values.

Display Configuration Register (R/W)

This register set ups and enables VI. Generally, VI should be reset before enabling it. This resets the states into some known values.

| | | | |
|---|---|---|---|
| ENB | 0 | This bit enables the video timing generation and data request. | 0 |
| RST | 1 | This bit clears all data request and puts VI into its idle state. | 0 |
| NIN | 2 | To select interlace or non-interlace mode. NIN = 0: interlace, NIN = 1: non-interlace. In non-interlace mode, the top field is drawn at field rate while the bottom field is not displayed. | 0 |
| DLR | 3 | This bit selects the 3D display mode. | 0 |
| LE0 | 5:4 | Gun trigger mode. It enables the Display Latch Register 0. When the mode is 1 or 2, it will clear itself (off) automatically when a gun trigger is detected or at time out. This field is double buffered.<br>0 off<br>1 on for 1 field<br>2 on for 2 fields<br>3 always on | 0 |
| LE1 | 7:6 | To enable Display Latch Register 1. See the description of LE0. | 0 |
| FMT | 9:8 | Indicates current video format:<br>0 NTSC<br>1 PAL<br>2 MPAL<br>3 Debug (CCIR656) | 0 |

Horizontal Timing 0 Register (R/W)

This register setups the horizontal timing.

| | | | |
|---|---|---|---|
| HLW | 9:0 | Half line width. | — |
| HCE | 22:16 | Horizontal sync start to color burst end. | — |
| HCS | 30:24 | Horizontal sync start to color burst start. | — |

Horizontal Timing 1 Register (R/W)

This register setups the horizontal timing.

| | | | |
|---|---|---|---|
| HSY | 6:0 | Horizontal sync width. | — |
| HBE | 16:7 | Horizontal sync start to horizontal blanking end. | — |
| HBS | 26:17 | Half line to horizontal blanking start. | — |

Vertical Timing Register (R/W)

This register setups the vertical timing. The value ACV is double buffered

| | | | |
|---|---|---|---|
| EQU | 3:0 | Equalization pulse in half lines. | — |
| ACV | 13:4 | Active video in full lines. | — |

Odd Field Vertical Timing Register (R/W)

This register sets up the pre-blanking and post-blanking intervals of odd fields. The values PRB and PSB are double buffered.

| | | | |
|---|---|---|---|
| PRB | 9:0 | Pre-blanking in half lines. | — |
| PSB | 25:16 | Post-blanking in half lines. | — |

Even Field Vertical Timing Register (R/W)

This register sets up the pre-blanking and post-blanking intervals of even fields. The values PRB and PSB are double buffered.

| | | | |
|---|---|---|---|
| PRB | 9:0 | Pre-blanking in half lines. | — |
| PSB | 25:16 | Post-blanking in half lines. | — |

Odd Field Burst Blanking Interval Register (R/W)

This register sets up burst blanking interval of odd fields.

| | | | |
|---|---|---|---|
| BS1 | 4:0 | Field 1 start to burst blanking start in half lines. | — |
| BE1 | 15:5 | Field 1 start to burst blanking end in half lines. | — |
| BS3 | 20:16 | Field 3 start to burst blanking start in half lines. | — |
| BE3 | 31:21 | Field 3 start to burst blanking end in half lines. | — |

Even Field Burst Blanking Interval Register (R/W)

This register sets up the burst-blanking interval of even fields.

| | | | |
|---|---|---|---|
| BS2 | 4:0 | Field 2 start to burst blanking start in half lines. | — |
| BE2 | 15:5 | Field 2 start to burst blanking end in half lines. | — |
| BS4 | 20:16 | Field 4 start to burst blanking start in half lines. | — |
| BE4 | 31:21 | Field 4 start to burst blanking end in half lines. | — |

Top Field Base Register L (R/W)

This register specifies the display origin of the top field of a picture in 2D display mode or for the left picture in 3D display mode.

| | | | |
|---|---|---|---|
| FBB | 23:0 | External memory address of the frame buffer image. | — |
| XOF | 27:24 | Horizontal offset, in pixels, of the left-most pixel within the first word of the fetched picture. | — |

Top Field Base Register R (R/W)

This register specifies the base address of the top field for the right picture in the 3D display mode. It is not used in 2D display mode.

| | | | |
|---|---|---|---|
| FBB | 23:0 | External memory address of the frame buffer image. | — |

Bottom Field Base Register L (R/W)

This register specifies the display origin of the bottom field of a picture in 2D display mode or for the left picture in 3D display mode.

| | | | |
|---|---|---|---|
| FBB | 23:0 | External memory address of the frame buffer image. | — |

Bottom Field Base Register R (R/W)

This register specifies the base address of the bottom field for the right picture in the 3D display mode. It is not used in 2D display mode.

| | | | |
|---|---|---|---|
| FBB | 23:0 | External memory address of the frame buffer image. | — |

Picture Configuration Register (R/W)

This register specifies the picture configuration.

| | | | |
|---|---|---|---|
| STD | 7:0 | Stride per line in words. | — |
| WPL | 14:8 | Number of reads per line in words. | — |

Display Position Register (R)

This register contains the current raster position.

The Horizontal Count is in pixels and runs from 1 to # pixels per line. It is reset to 1 at the beginning of every line.

The Vertical Count is in lines (on a frame basis) and runs from 1 to # lines per frame. It is 1 at the beginning of pre-equalization. This is a frame line count. So for example: for NTSC vcount=264 is the first (full) line in the second field and vcount=525 is the last line in the frame (fields being numbered 1-4). For non-interlaced modes vcount is on a field-by-field basis (for NTSC vcount ranges from 1-263).

This counting scheme applies the Display Postion, Display Interrupt, and Display Latch registers.

| | | | |
|---|---|---|---|
| HCT | 10:0 | Horizontal count. | — |
| VCT | 26:16 | Vertical count. | — |

Display Interrupt Register 0 (R/W)

There are a total of four display interrupt registers (0-3). They are used to generate interrupts to the main processor at different positions within a field. Each register has a separate enable bit. The interrupt is cleared by writing a zero to the status flag (INT).

| | | | |
|---|---|---|---|
| HCT | 10:0 | Horizontal count to generate interrupt. | — |
| VCT | 26:16 | Vertical count to generate interrupt. | — |
| ENB | 28 | Interrupt is enabled if this bit is set. | 0 |
| INT | 31 | Interrupt status. A "1" indicates that an interrupt is active. | 0 |

Display Interrupt Register 1 (R/W)
See the description of Display Interrupt Register 0.
Display Interrupt Register 2 (R/W)
See the description of Display Interrupt Register 0.
Display Interrupt Register 3 (R/W)
See the description of Display Interrupt Register 0.
Display Latch Register 0 (R/W)

The Display Latch Register 0 latches the value of the Display Position Register at the rising edge of the gt0 signal. The trigger flag is set if a gun trigger is detected. Writing a zero to the register clear the trigger flag.

| | | | |
|---|---|---|---|
| HCT | 10:0 | Horizontal count. | 0 |
| VCT | 26:16 | Vertical count. | 0 |
| TRG | 31 | Trigger flag. | 0 |

Display Latch Register 1 (R/W)

See the description of Display Latch Register 0. This register is latched on the rising edge of the gt1 signal.

Output Polarity Register (R/W)

This register sets up the polarity of the out going control signals

| | | | |
|---|---|---|---|
| I_POL | 0 | Inverts Interlace Flag | 0 |
| N_POL | 1 | Inverts NTSC Flag | 0 |
| K_POL | 2 | Inverts Burst Blank Flag | 0 |
| B_POL | 3 | Inverts Burst Flag | 0 |
| H_POL | 4 | Inverts HSyncb Flag | 0 |
| V_POL | 5 | Inverts VSyncb Flag | 0 |
| F_POL | 6 | Inverts Field Flag | 0 |
| C_POL | 7 | Inverts CSyncb Flag | 0 |

Horizontal Scale Register (R/W)

This register sets up the step size of the horizontal stepper.

| | | | |
|---|---|---|---|
| STP | 8:0 | Horizontal stepping size (U1.8). | 256 |
| HS_EN | 12 | Horizontal Sealer Enable | 0 |

Scaling Width Register (R/W)

This register is the number of source pixels to be scaled. This is only used when the Horizontal Scaler is enabled. For example, if the image is to be scaled from 320×240 to 640×240, 320 would be written into this register.

| | | | |
|---|---|---|---|
| SRCWIDTH | 9:0 | Horizontal stepping size | 0 |

This register (in conjunction with the border HBS) sets up a black border around the actual active pixels in debug mode. This was done in order to accommodate certain encoders that only support 720 active pixels. The border HBE and HBS can be programmed for 720 active pixels while the regular HBE and HBS can be programmed to the actual active width. This allows the frame buffer to be of any width without having to manually set up a border in memory. These registers will only take effect if enabled and in debug mode.

| | | | |
|---|---|---|---|
| HBE656 | 9:0 | Border Horizontal Blank End | 0 |
| BRDR_EN | 15 | Border Enable | 0 |

Border HBS (R/W)

| | | | |
|---|---|---|---|
| HBS656 | 9:0 | Border Horizontal Blank End | 0 |

| FILTER COEFFICIENT TABLE 0 (R/W) This register sets up part of the low pass filter. Taps 0 to 9 are in the range [0.0, 2.0). | | | |
|---|---|---|---|
| T0 | 9:0 | Tap 0 (U1.9). | — |
| T1 | 19:10 | Tap 1. | — |
| T2 | 29:20 | Tap 2. | — |

| FILTER COEFFICIENT TABLE 1 (R/W) This register sets up part of the low pass filter. | | | |
|---|---|---|---|
| T3 | 9:0 | Tap 3. | — |
| T4 | 19:10 | Tap 4. | — |
| T5 | 29:20 | Tap 5. | — |

| FILTER COEFFICIENT TABLE 2 (R/W) This register sets up part of the low pass filter. | | | |
|---|---|---|---|
| T6 | 9:0 | Tap 6. | — |
| T7 | 19:10 | Tap 7. | — |
| T8 | 29:20 | Tap 8. | — |

| FILTER COEFFICIENT TABLE 3 (R/W) This register sets up part of the low pass filter. Taps 9 to tap 24 are in the range [−0.125, 0.125). | | | |
|---|---|---|---|
| T9 | 7:0 | Tap 9 (S-2.9). | — |
| T10 | 15:8 | Tap 10. | — |
| T11 | 23:16 | Tap 11. | — |
| T12 | 31:24 | Tap 12. | — |

| FILTER COEFFICIENT TABLE 4 (R/W) This register sets up part of the low pass filter. | | | |
|---|---|---|---|
| T13 | 7:0 | Tap 13. | — |
| T14 | 15:8 | Tap 14. | — |
| T15 | 23:16 | Tap 15. | — |
| T16 | 31:24 | Tap 16. | — |

| Filter Coefficient Table 5 (R/W) This register sets up part of the low pass filter. | | | |
|---|---|---|---|
| T17 | 7:0 | Tap 17. | — |
| T18 | 15:8 | Tap 18. | — |
| T19 | 23:16 | Tap 19. | — |
| T20 | 31:24 | Tap 20. | — |

| Filter Coefficient Table 6 (R/W) This register sets up part of the low pass filter. | | | |
|---|---|---|---|
| T21 | 7:0 | Tap 21. | — |
| T22 | 15:8 | Tap 22. | — |
| T23 | 23:16 | Tap 23. | — |
| T24 | 31:24 | Hardwired to zero. | — |

VI Clock Select Register (R/W)

This register selects whether the VI will receive a 27 Mhz or a 54 Mhz clock. The 54 Mhz clock is used only with the progressive display modes.

| VICLKSEL | 1 | 0-27 Mhz video clk 1-54 Mhz video clk | 0 |
|---|---|---|---|

VI DTV Status Register(R)

| VISEL | 2 | Don't care | — |
|---|---|---|---|

Example Detailed Overall System
Embodiment/Implementation

Figure 12:
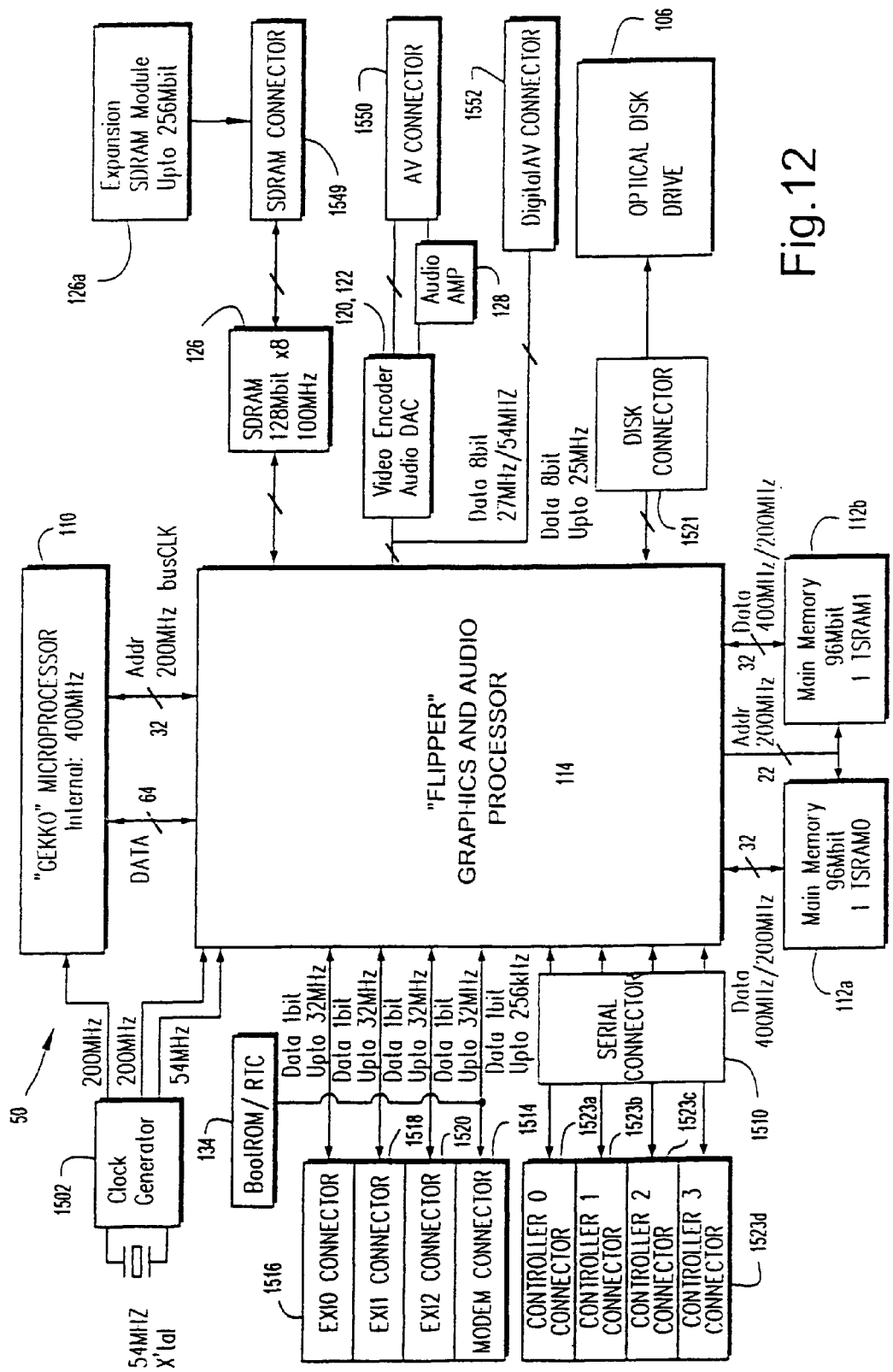
FIG. 12 is a block diagram of an example overall more detailed embodiment of an example video game system.
Figure 12A:
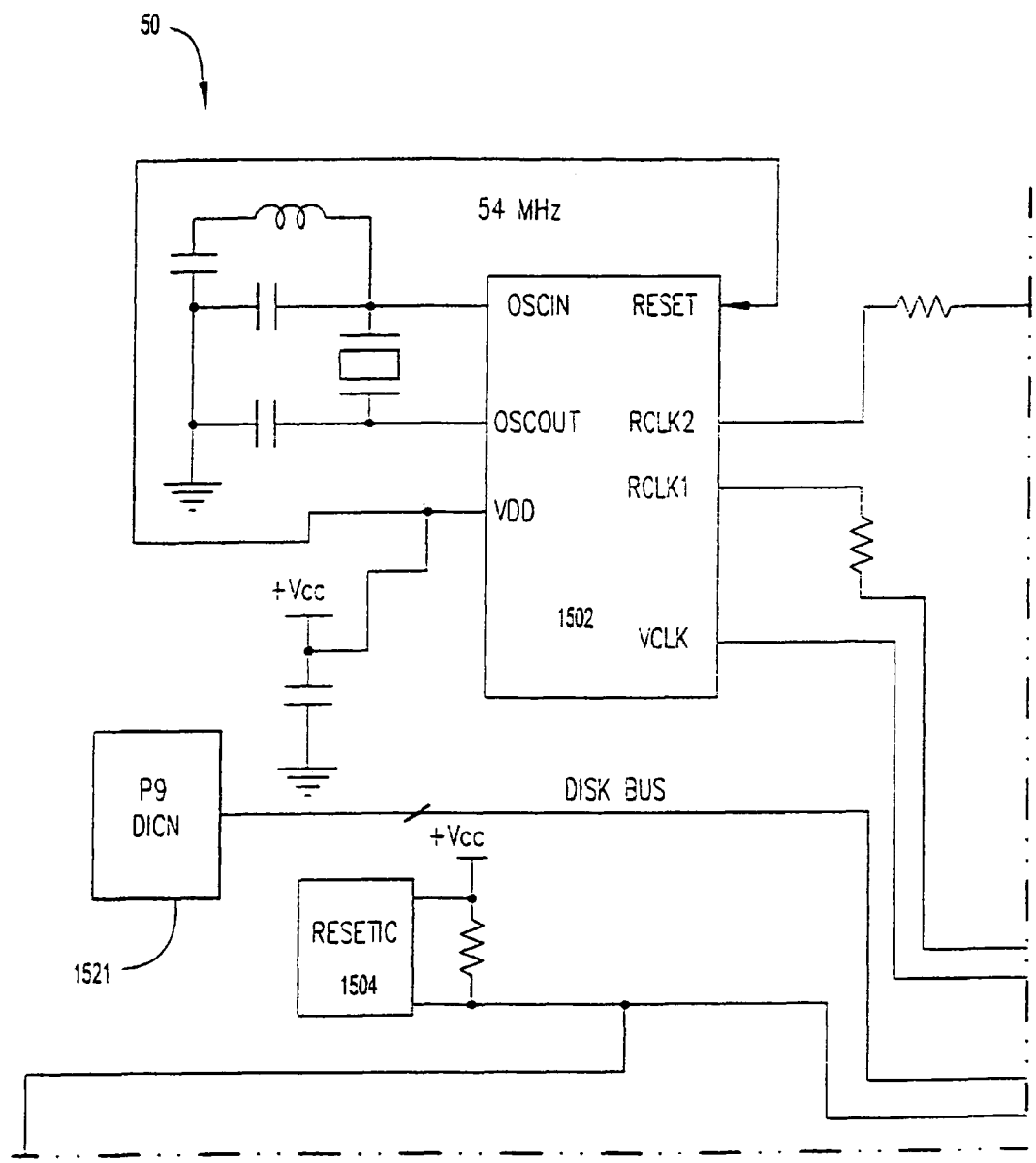

FIG. 12 shows an example, detailed embodiment/implementation of system 50 shown in FIG. 2. In this example implementation:

A clock generator 1502 provides clocking signals to both main microprocessor 110 and to graphics and audio processor 114.

A 32-bit address bus and a 64-bit data bus connect the graphics and audio processor 114 with the main microprocessor 110.

Main memory 112 is implemented as a pair of 96-megabit, 1TSRAM chips manufactured by MOSYS, Inc.

A multi-pin modem connector 1514 is used to connect the graphics and audio processor 114 to an external or internal modem.

The boot ROM/real time clock 134 is coupled to the modem connector 1514 and shares its bus for communication with the graphics and audio processor 114.

Three multi-pin EXI connectors 1516, 1518, 1520 are used to connect the graphics and audio processor 114 to various internal and/or external peripheral or other devices.

A multi-pin serial connector 1510 is used to couple the graphics and audio processor 114 to four controller connectors 1523a, 1523b, 1523c, 1523d each of which is connected to a different hand controller 52 or other external input/output device.

A multi-pin disk interface connector 1521 is used to couple the graphics and audio processor 114 to the optical disk drive 106.

The SDRAM 126 may be provided with a multi-pin expansion connector 1549 that can be used to expand the 128 MB capacity of SDRAM 126 with an additional SDRAM expansion module 126a.

An analog audio/video connector 1550 having multiple pins communicates analog audio and video information between the graphics and audio processor 114 and external devices such as, for example, television sets, external display monitors, external loudspeakers or other input/output devices.

A digital audio/video connector 1552 having multiple pins makes the digital and audio interface provided by graphics and audio processor 114 available to the outside world for connection to any of a variety of different digital video and/or audio devices.

In the example shown, each of connectors 1510, 1514, 1516, 1518, 1520, 1523a-1523d, 1549, 1550, 1552, 1521 comprises a mating male and female multi-pin connector that allows connections to be made, broken and remade without destructive or permanent processes such as soldering or permanent (non-deformable) crimping. Use of such connectors allows simple and easy connection and disconnection between different modular portions of system 50 to provide an east-to-manufacture system that can also be expanded, extended and reconfigured in the field without special equipment and involved processes.

Figure 23:
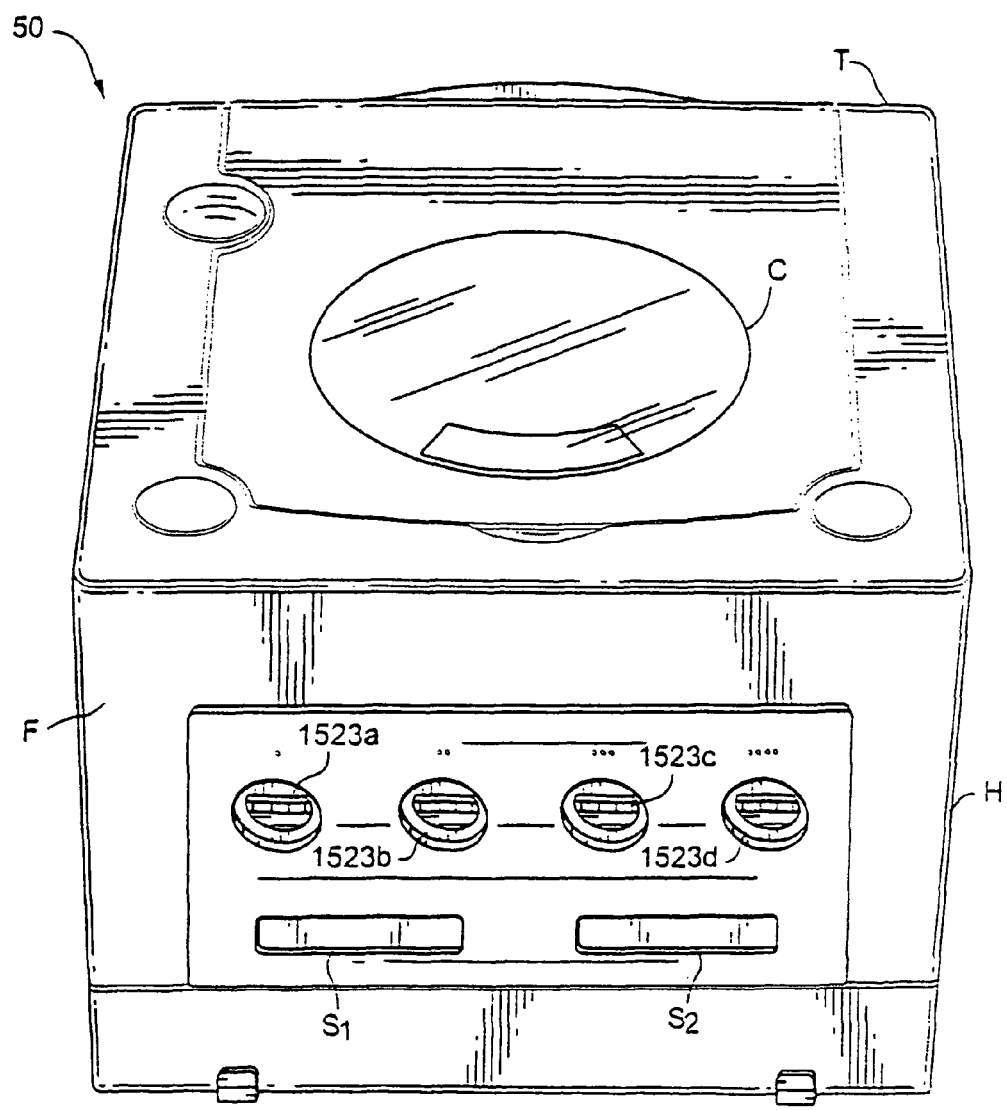
Figure 24:
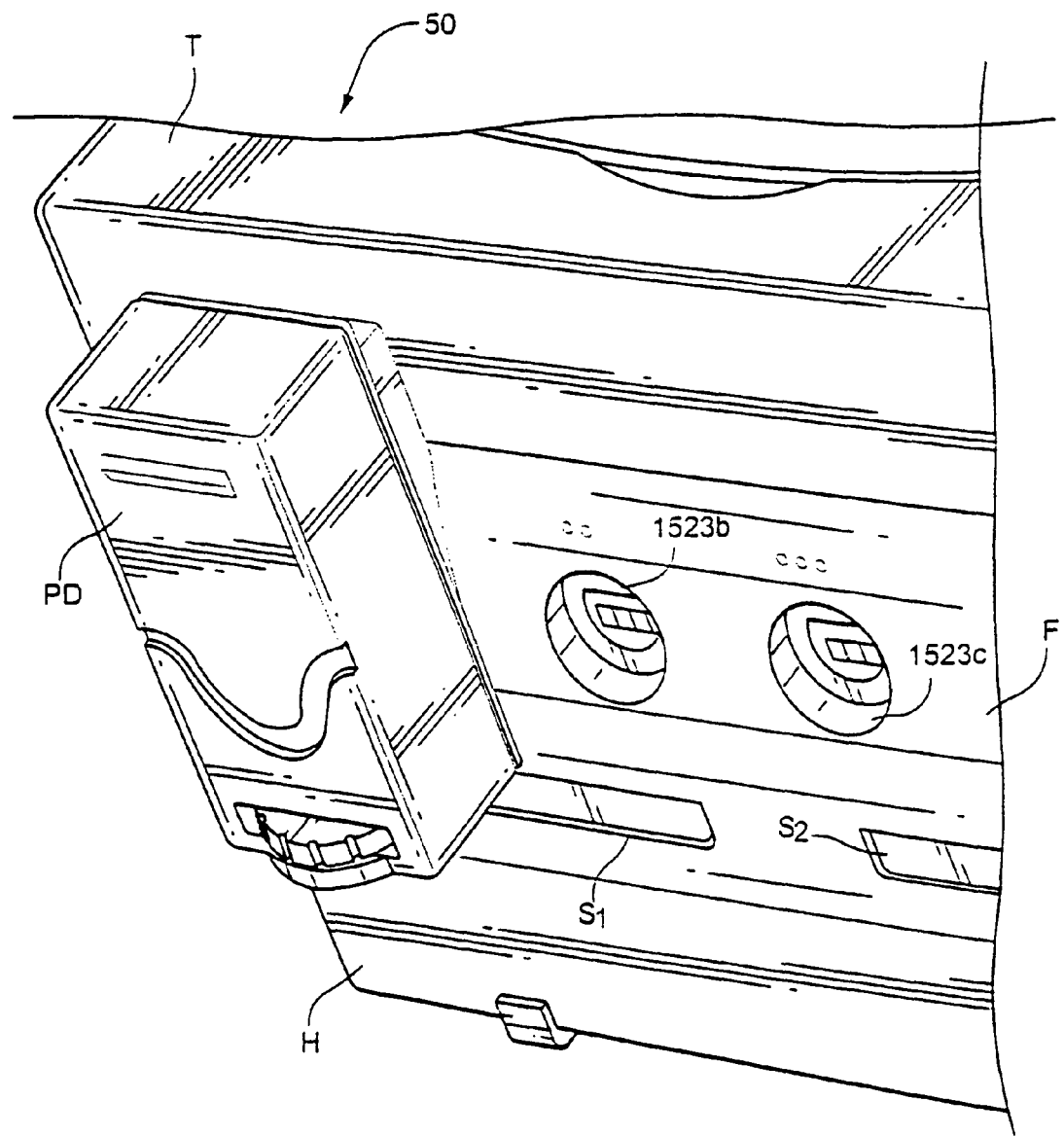

Skipping ahead to FIGS. 22-27, those diagrams show an example external view of system 50 within a housing H. Referring specifically to FIG. 22, housing H includes a front side F, a back side B, a top surface T and a bottom surface Q. Disk drive 106 may be housed beneath a hinged, openable access cover C that allows the user to insert optical disks 62 into a housing H. Controller connectors 1523a, 1523b, 1523c, 1523c may be disposed on front surface F (as best shown in FIG. 23). Example connectors 1523 may each comprise a 10-10 female connector configured to accept a mating 10-10 male connector of appropriate configuration. Such a connector may, for example, couple system 50 to a wire-connected handheld controller 52, a light gun, or any other peripheral device. FIG. 24 shows an example peripheral device PD (in this case a receiver for a wireless handheld controller 52—but it could be any sort of device) connected to connector 1523a and being supported by the connector configuration.

Figure 25:
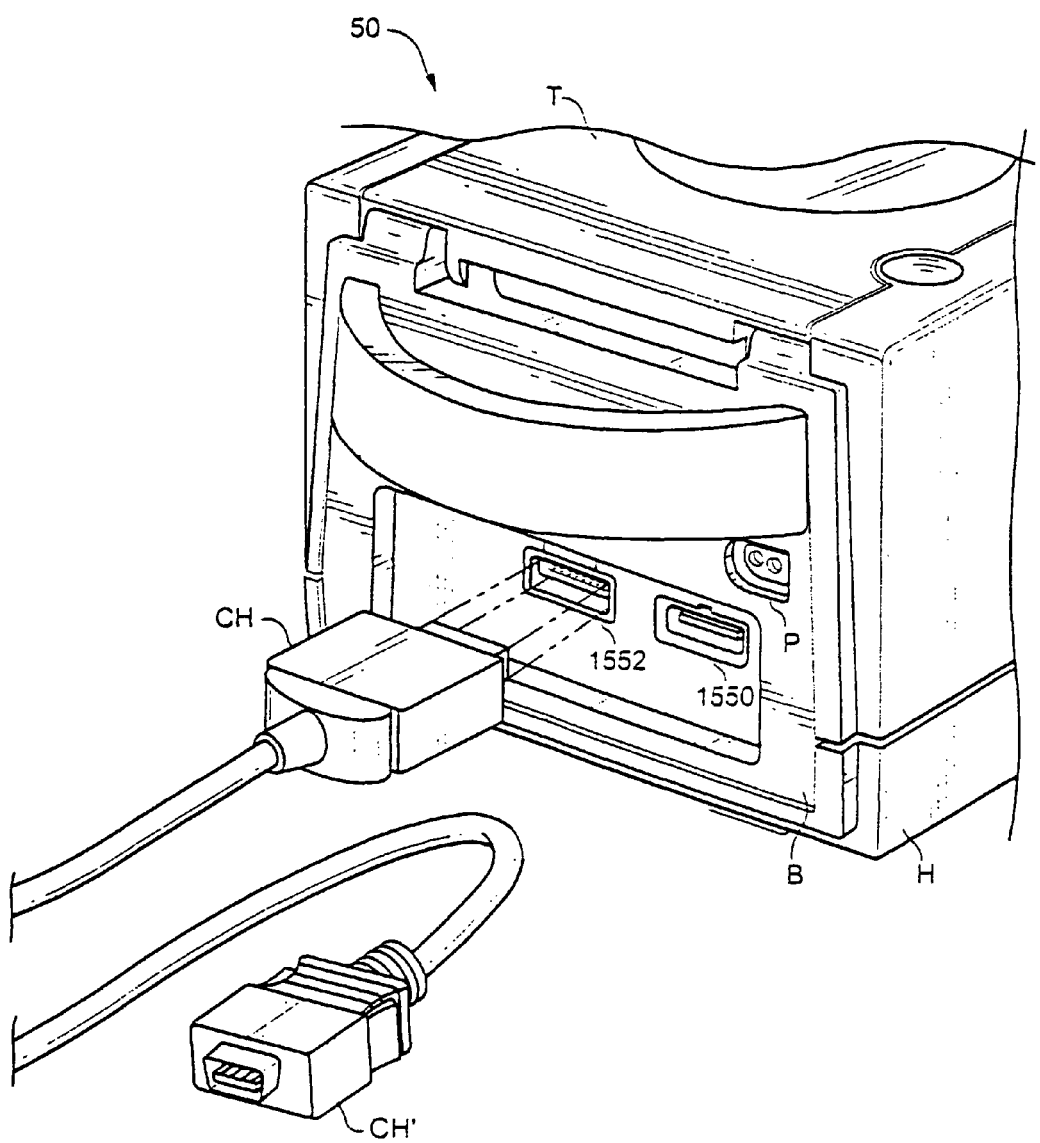

Referring now more particularly to FIG. 25, a digital audio/video connector 1552 and an analog audio/video connector 1550 may be disposed on rear surface B of housing H. Each of these connectors 1550, 1552 can output sound and picture signals. However, the digital connector 1552 provides access to the internal video and audio buses described above—thereby providing additional flexibility in terms of interfacing system 50 with sophisticated digital audio and/or video equipment. A connector CH of an appropriate configuration can be connected to the digital connector 1552, and the other end of such a connector/cable CH' can be connected to any sort of compatible external equipment. Similarly, a connector (not shown) can be coupled to the analog audio/video connector 1550 to provide analog audio and video information to a home television set, display monitor or other such equipment. A two-pin power supply connector P may also be provided on rear panel B for inputting DC power to system 50. For example, an external 12 volt DC power supply can provide 12 volts DC to connector P, and internal voltage regulation circuitry can regulate this 12 volt DC power supply level down to appropriate lower intermediate voltage levels.

Figure 26:
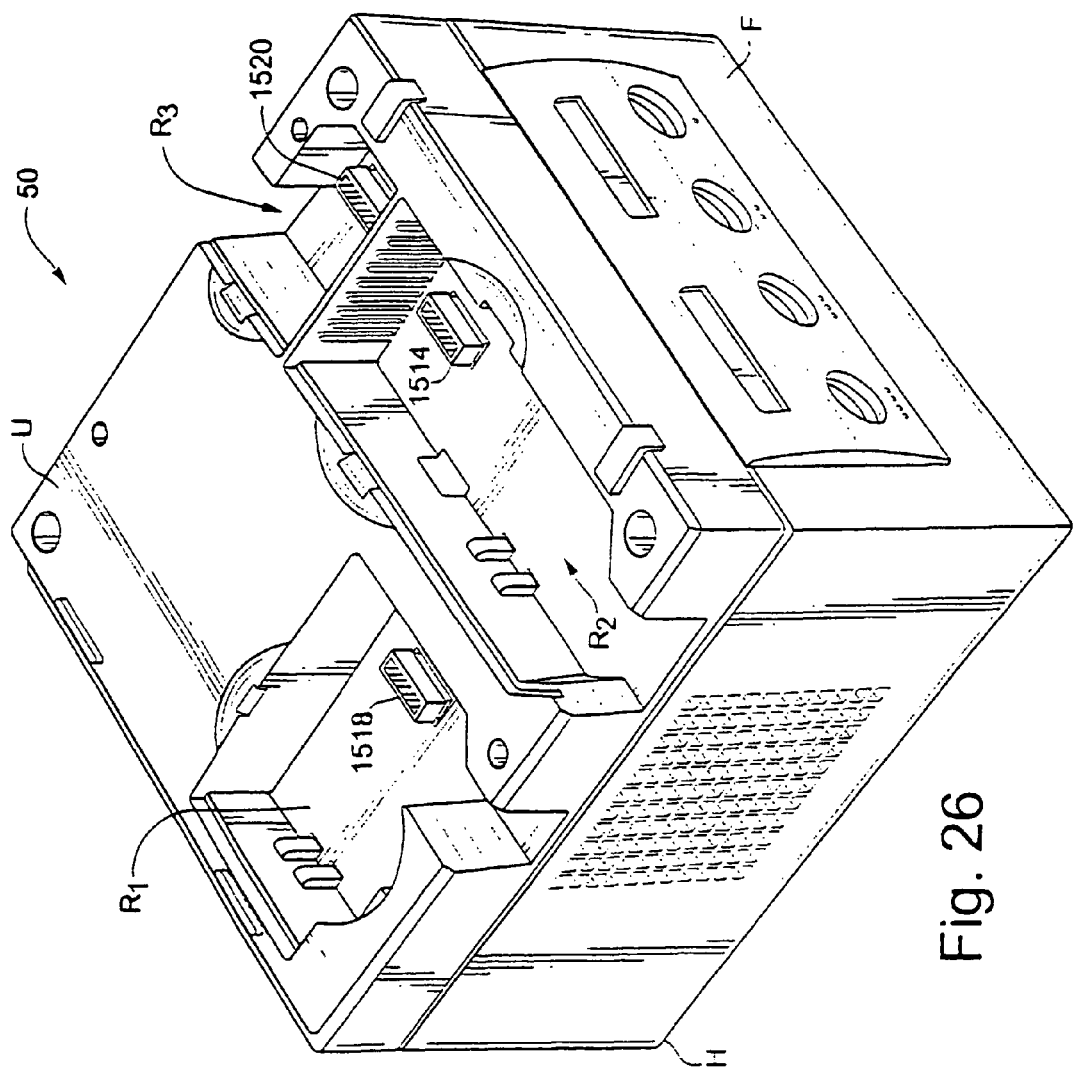
Figure 27:
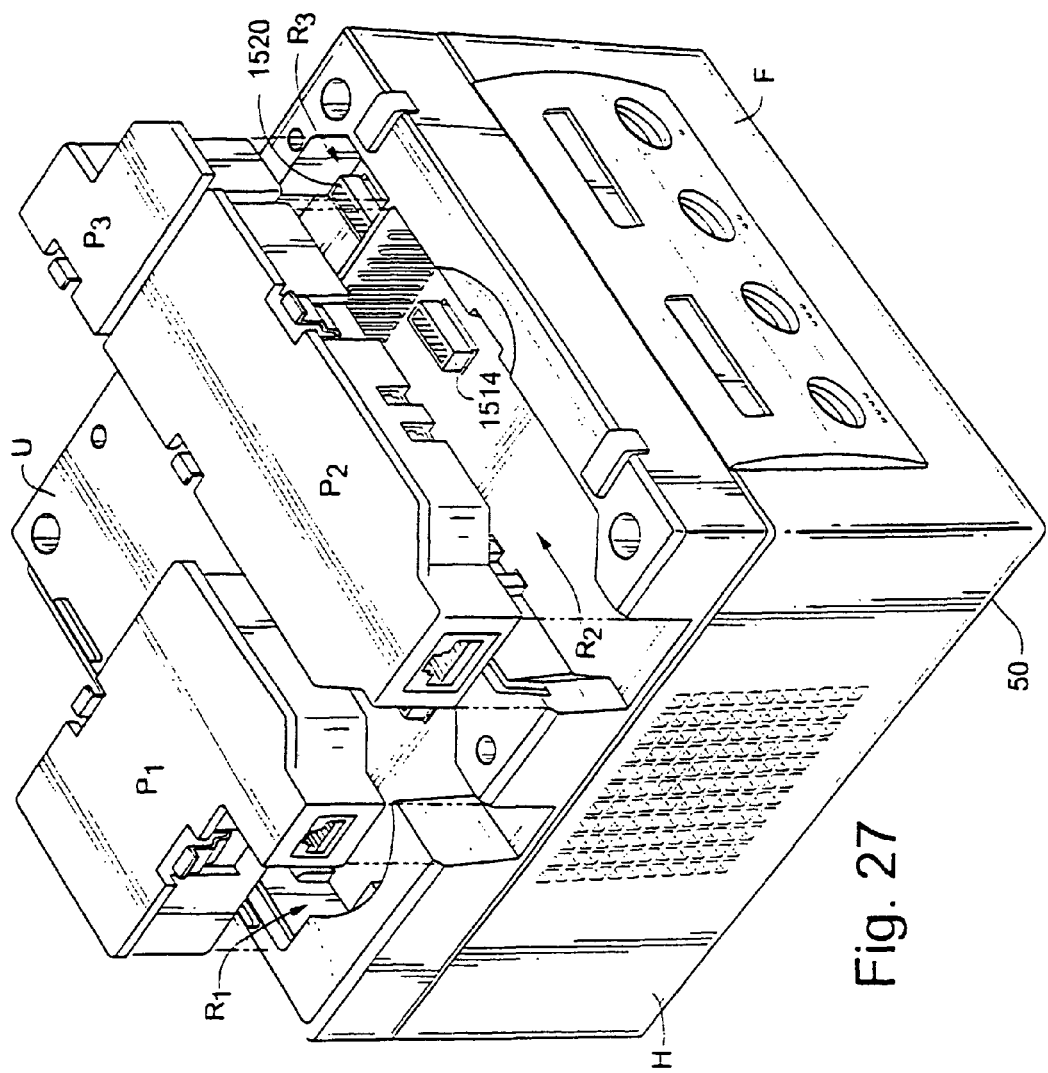

Referring to FIG. 26, the bottom surface U of housing H may include a number of recesses normally covered by covers (not shown). Removal of such covers exposes recesses and associated connectors. For example, a recess $R_1$ may include a "high speed port" connector such as the EXI1 connector 1518, a recess $R_2$ may expose and provide connection to a modem connector 1514. Further recess $R_3$ may expose and provide connection to an additional serial port such as the EXI2 connector 1520 as best seen in FIG. 27, peripheral devices $P_1$, $P_2$, $P_3$ can be mechanically configured to fit dimensionally within corresponding recess $R_1$, $R_2$, $R_3$ so that such peripheral devices can be mounted flush within the generally cubic configuration of housing H. Such peripheral devices $P_1$, $P_2$, $P_3$ may include a broadband adapter, a modem, or any other sort of electronic or electrical device providing data inputs and/or outputs over a serial port. Each of the example preferred embodiment connectors provides power so that devices $P_1$, $P_2$, $P_3$ need not provide their own power sources. Devices $P_1$, $P_2$, $P_3$ can be modular and inserted or removed into corresponding recess R at will to provide different expansion and flush or other functionality for system 50. Of course, a connecting cable or wireless communications device could be coupled to any of the serial port connectors 1514, 1518, 1520 to allow system 50 to be interconnected with a free-standing external system or device.

Figure 28B:
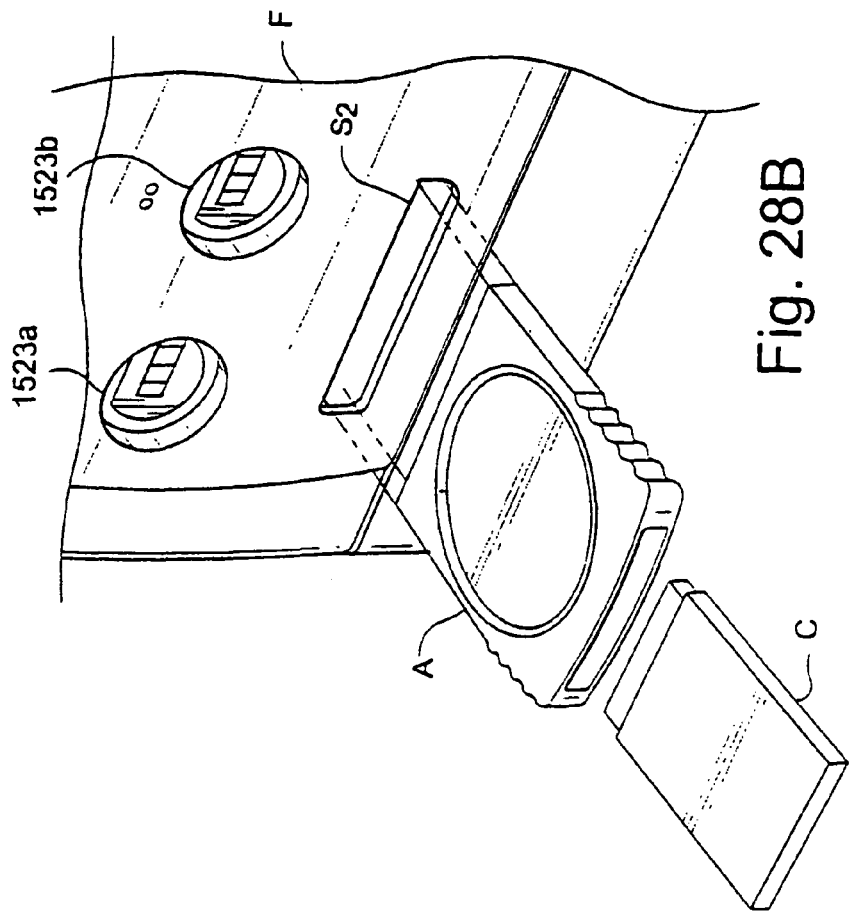
Figure 28A:
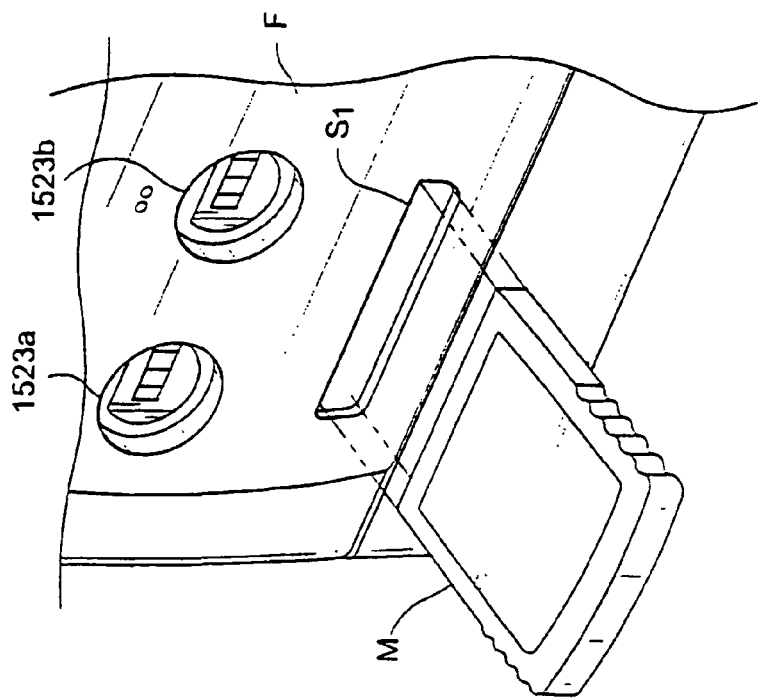

Referring to FIGS. 23, 24 and 28B-28B, additional slots S on front panel F provide access to an additional internal serial bus (e.g., the EXI0 connector 1516, not shown). Slots S may be used to insert portable memory devices such as flash memory for example. A "digicard" memory device M shown in FIG. 28A may include 4 megabits (or 1 half megabit) of flash memory and fits snugly into slot $S_1$ underneath the controller port holes 1523a, 1523b mounted on front panel F. System 52 also supports SD-digicard adapter A shown in FIG. 28B that is compatible stamped-sized, large capacity recording media, SD-memory cards C made by Matsushita. Such SD cards C may offer 64 megabits or more of non-volatile storage. Other cartridge-based memory cards or other devices may also be received by slots $S_1$, $S_2$ to interconnect system 50 with other types of internal or external peripheral or other devices.

Any of the various connectors described herein can be located in the various connector positions shown in FIGS. 22-28B as desired.

Example Detailed Connection Diagram

Figure 12B:
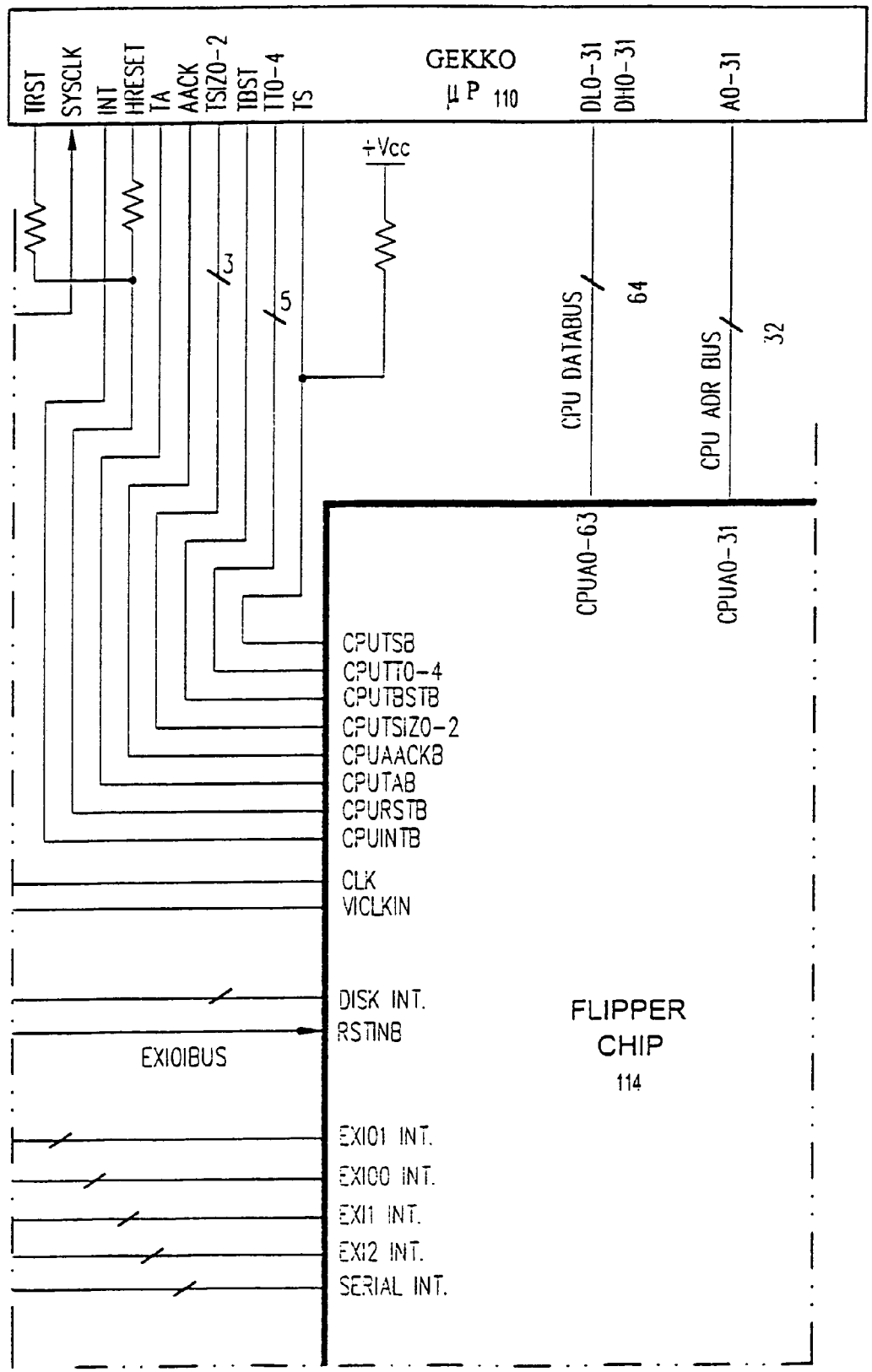

FIGS. 12A-12G show an example overall detailed connection diagram of system 50 shown in FIG. 2. FIG. 12G shows how FIGS. 12A-12F can be laid out together to provide an overall system 50 connection diagram. In this particular, non-limiting detailed implementation, the graphics and audio processor 114 is implemented on a single chip named "Flipper" that connects to a main processor 110 named "Gekko" via a 32-bit address bus and a 64-bit data bus. Various other connections as shown in FIG. 12B are used to maintain coordination between main processor 110 and the graphics and audio processor 114. A crystal-controlled 54 Mhz clock generator 1502 provides various clocking signals to the main microprocessor 110 and the graphics and audio processor 114 (see FIG. 12A). A reset circuit 1504 provides a reset signal in response to power on that is applied to the graphics and audio processor 114. The graphics and audio processor 114 supplies reset signals to the main microprocessor 110 (and other system components). The reset signal provided by reset circuit 1504 is also applied to a special initial program load (IPL) chip 1506 that includes an internal boot ROM and a real time clock. In the example embodiment shown, this IPL chip 1506 includes its own clock generator circuit, and is supplied with a battery signal VCC3 (through an RC time constant circuit 1508 coupled to a serial bus connector 1508). Serial bus connector 1508 is also coupled to the graphics and audio processor 114 serial interface 1000 discussed above. The IPL chip 1506 upon power-on reset, serially provides boot program instructions to main processor 110 via graphics and audio processor 114 upon certain power-on conditions being fulfilled. In the example embodiment, this information is provided via a modem bus 1512 that is also coupled to a modem connector 1514. After power-on reset has completed and the initial program load process is done, the boot ROM portion of chip 1506 becomes transparent and is no longer accessible by the graphics and audio processor 114 and/or the main microprocessor 110 but the real time clock function of chip 1506 (which battery B1 of FIG. 14 and the clock generator coupled to chip 1506 maintains even during system 50 power off) allows continual real time tracking of current time and date.

Figure 12D:
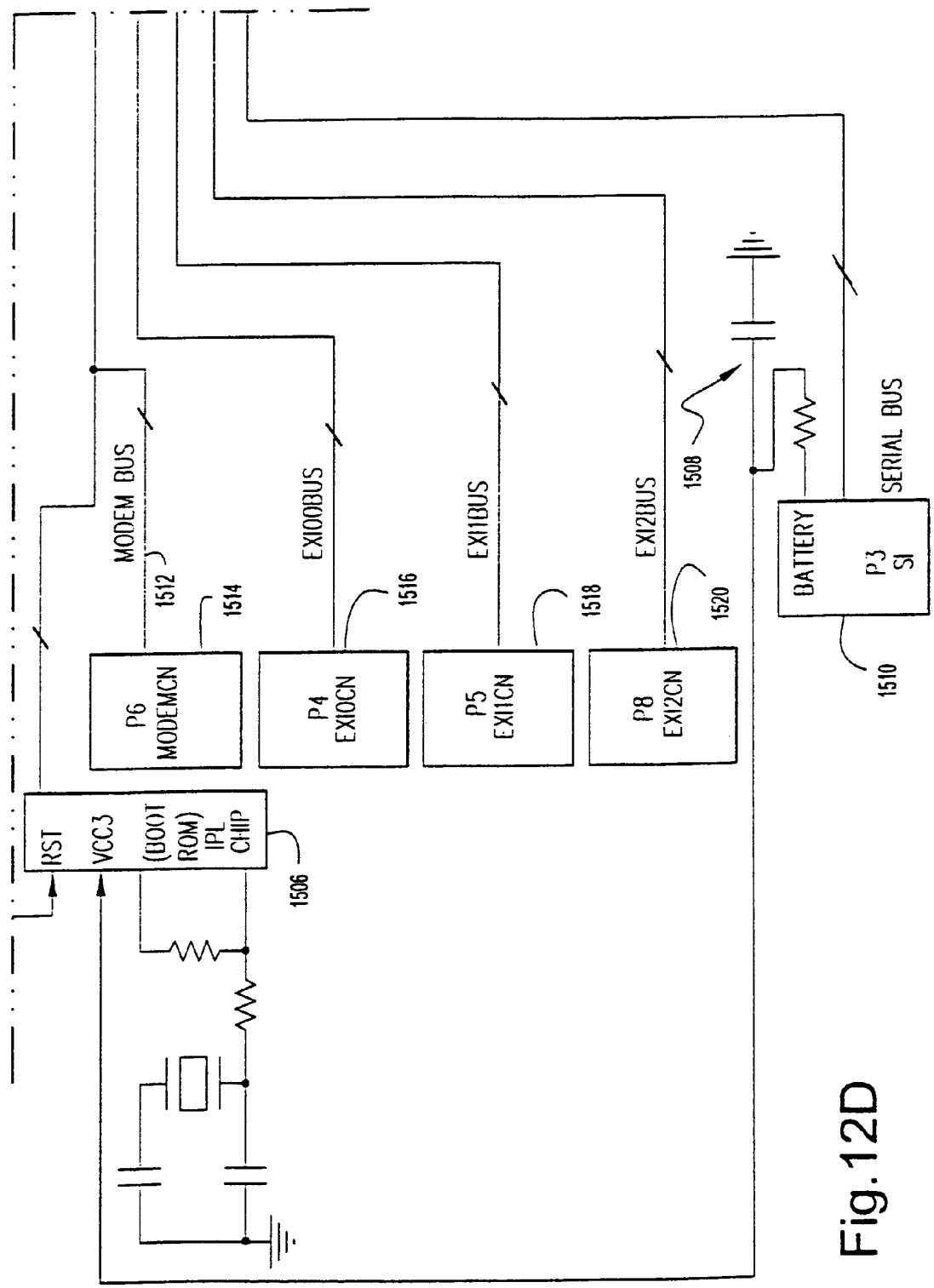

As also shown in FIG. 12D, various external interface connectors 1516, 1518, 1520 are coupled to the graphics and audio processor 114 EXI interfaces 132, 142 discussed above. Connectors 1514, 1516, 1518, 1520 allow graphics and audio processor 114 and/or main microprocessor 110 to access external peripheral or other devices such as modems, broadband adapters, printers, or virtually any other sort of peripheral or other device.

Figure 12E:
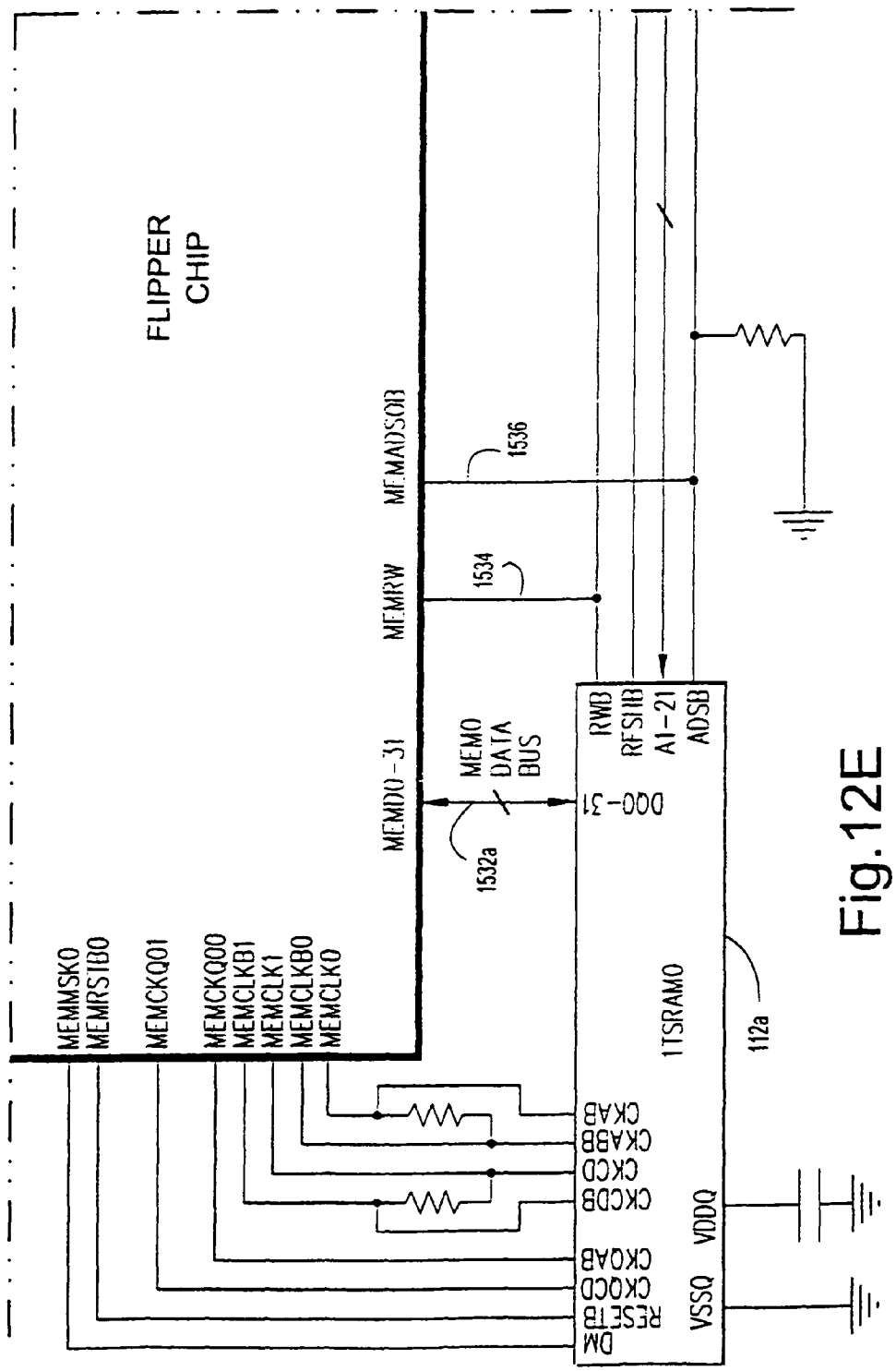
Figure 12F:
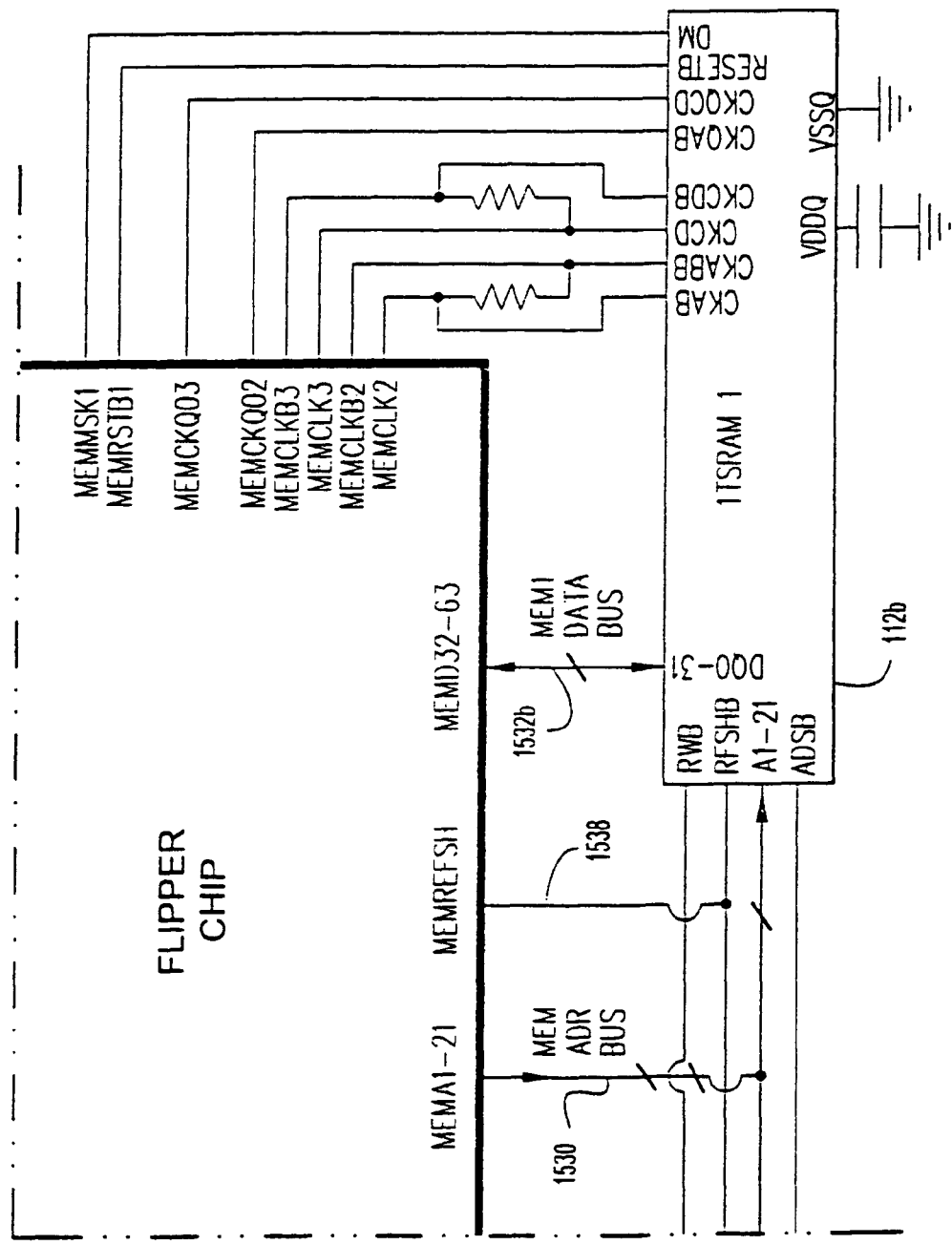

As shown in FIGS. 12E and 12F, main memory 112 in this particular implementation is implemented as a pair of 1TSRAM chips 112a, 112b manufactured by MOSYS, Inc. of Santa Clara, Calif. These high-speed memory chips 112a, 112b share a common 21-bit address bus 1530 in the example embodiment. Each memory chip 112a, 112b has its own dedicated 32-bit data bus 1532 and dedicated clocking and other signals as shown. The memory read/write line 1534, the MEMADSOB, line 1536, and the MEMREFSH line 1538 are also shared between these two chips 112a, 112b in this example embodiment. Additional expansion could be provided in another implementation if desired.

FIG. 12C shows example connections with SDRAM 126 including a 13-bit address bus and an 8-bit data bus along with various read, write, clocking and other control signals. In the example embodiment, an expansion connection is provided to allow expansion of the SDRAM 126 to provide additional memory capacity. FIG. 12C also shows example connections between the graphics and audio processor 114 and example analog audio/video connector 1550 and example digital video/audio connector 1552. In the example embodiment, the video encoder and audio codec 120, 122 are implemented in a common single chip package 1554. An audio amplifier 128 amplifies the stereo left and right audio outputs for application to the analog audio/video connector 1550.

Example Detailed Serial (Joybus) Hand Controller Connections

Figure 13A:
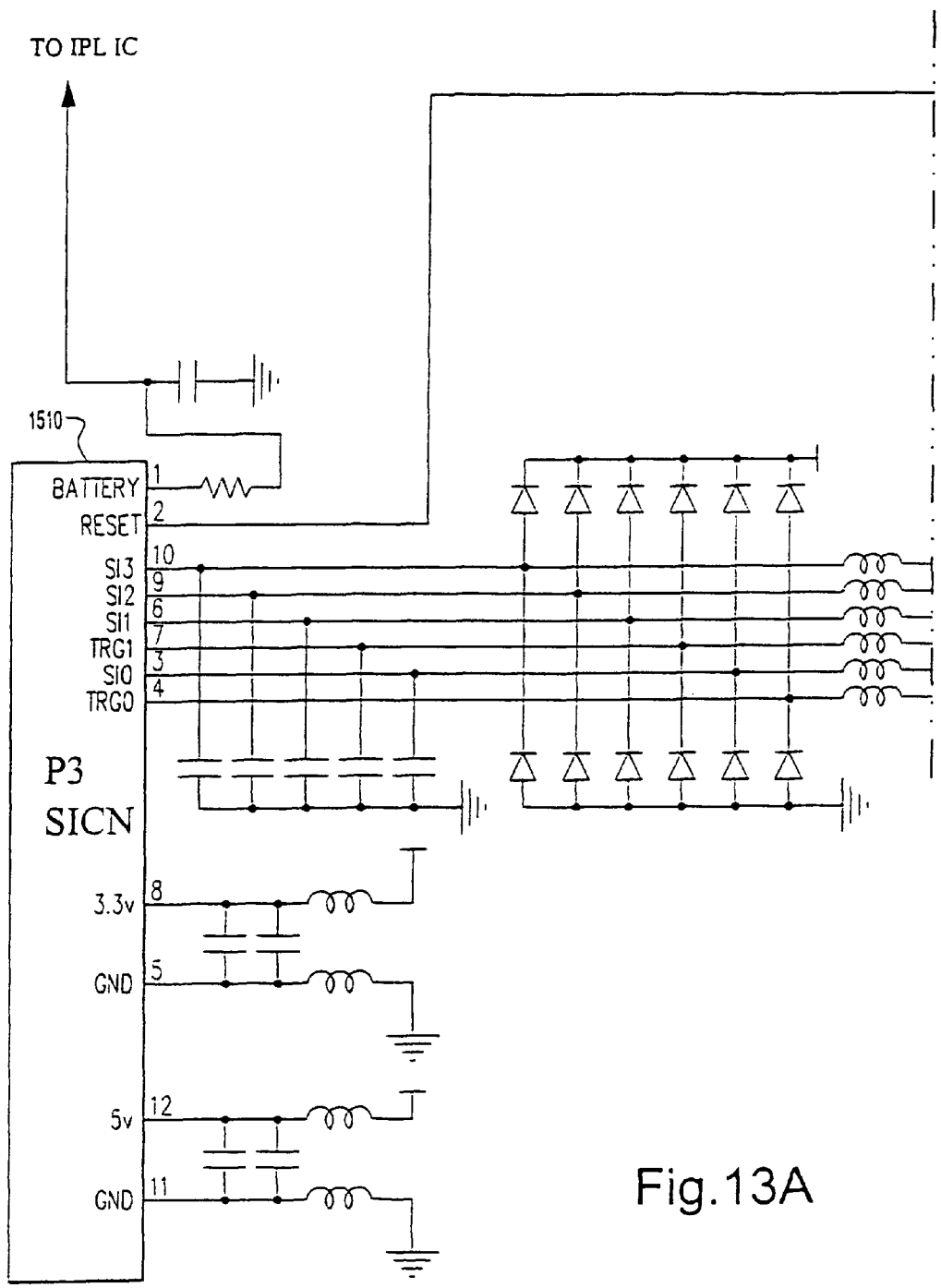
Figure 14:
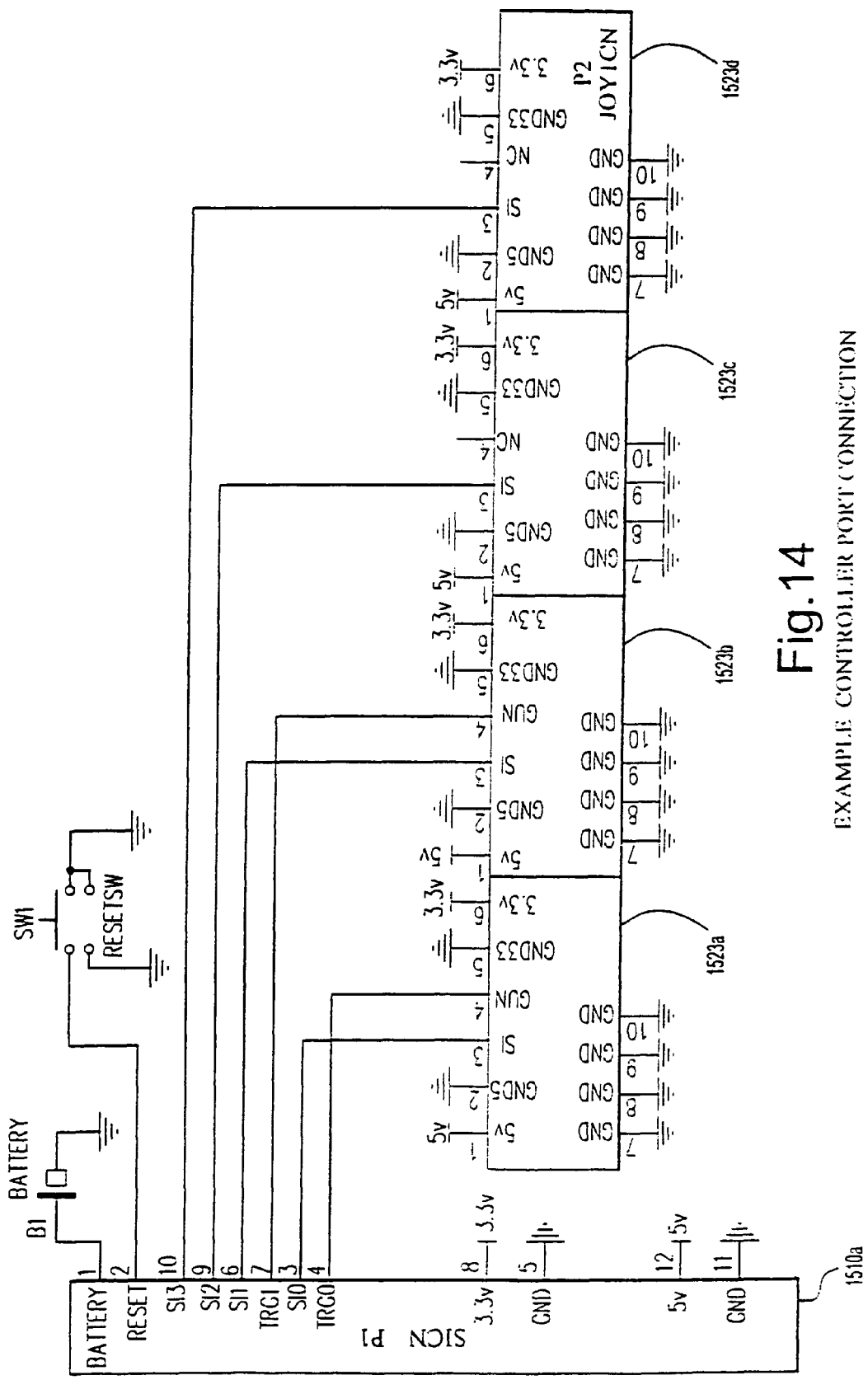
FIG. 14 shows example controller port connections.

FIGS. 13A-13b show an example detailed implementation of a connection between an example serial connector 1510 and the graphics and audio processor 114, and FIG. 14 shows an example detailed connection between the serial connector 1510 and controller connectors 1523 for hand controllers 52 or other devices. Referring to FIG. 13B, the example serial interface described above in connection with FIGS. 8A-8D (including the various serial data buses SIDO0-SIDO3, SIDI0-SIDI3, and the two gun trigger signals GUNTRG0, GUNTRG1) are coupled via transistor-based isolation buffers 1602a-1602d to pins 3, 4, 6, 7, 9 and 10 of a multi-pin serial interface connector 1510. A reset signal received by graphics and audio processor 114 is also coupled to this same serial interface connector 1510 at pin 2 in the example embodiment. In addition, connector 1510 includes a battery input at pin 1 that is applied to the boot ROM/RTC arrangement 134 discussed above. Example connector 1510 also makes available various supply voltages (e.g., 3.3 volts at pin 8 and 5 volts at pine 12) as well as ground potential (e.g., at pins 5 and 11). Referring to FIG. 12, a mating multi-pin connector 1510a is used to connect connector 1510 to the various controller input port connectors 1523a, 1523b, 1523c, 1523d. A battery B1 may be supplied for connection to pin 1, and a reset switch SW1 may be connected to pin 2. The various controller connectors 1523 may be wired similarly with pin 3 carrying bi-directional serial data, pin 4 (if applicable—only two connectors 1523a, 1523b, provide this capability in the example embodiment) carrying the gun trigger signals, and with power supply and ground voltages being made available as shown.

Example External Interface Connections

Figure 15A:
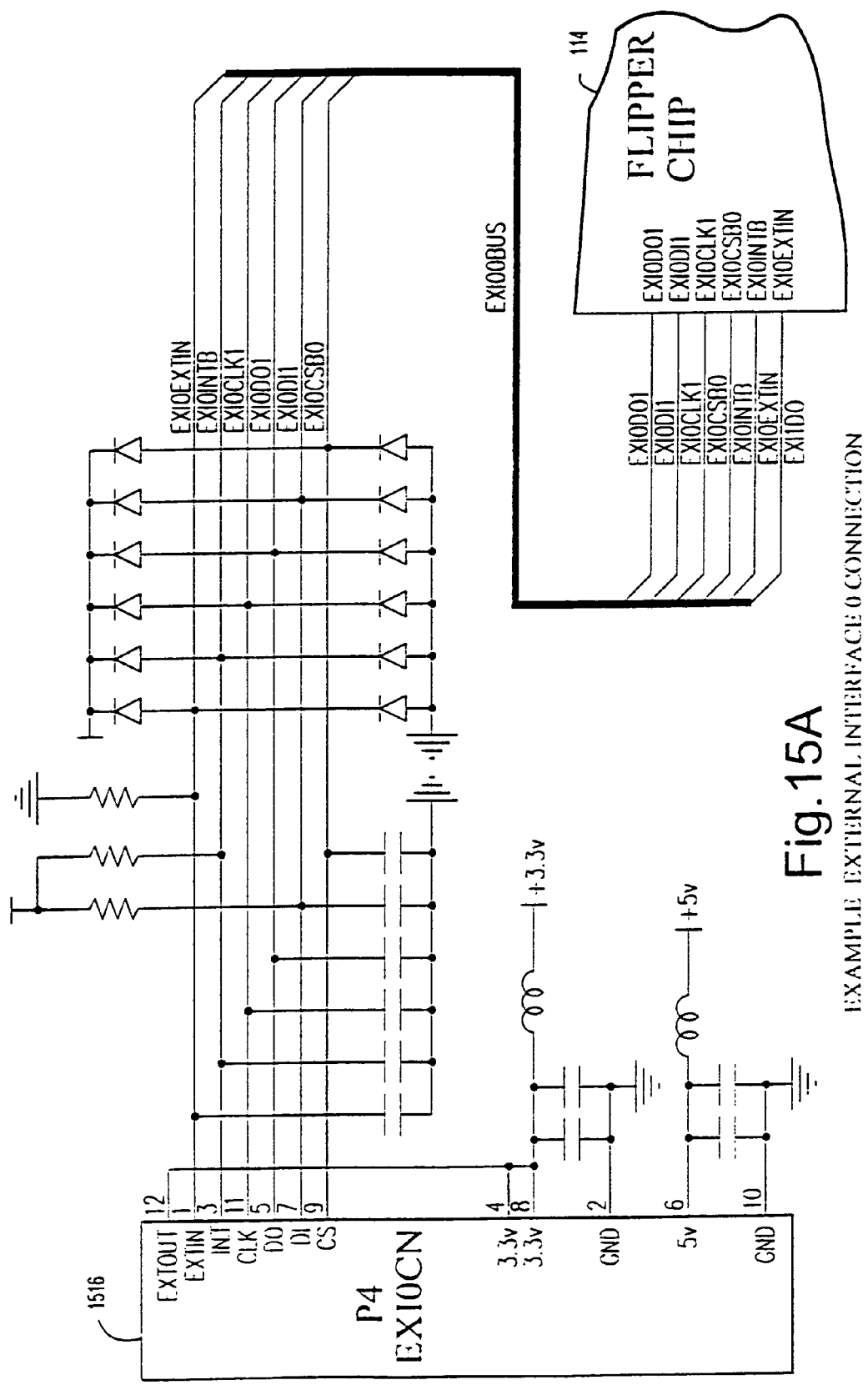

FIGS. 15A-15C show example external interface connections for use in coupling the example external interfaces described above in connection with FIGS. 9A-9E to external interface connectors 1516, 1518, 1520, respectively. In the example embodiment, the external interface connections for EXI0 and EXI1 are virtually identical. As shown in FIGS. 15A and 15B, the external interface buses described above in connection with FIGS. 9A, 9B and 9C are isolated with various isolation circuitry and coupled to respective pins of a multi-pin connector (1516 for the EXI0 bus, 1518 for the EXI1 bus) with pin assignments as follows:

| Pin Number | Signal Identification |
|---|---|
| 1 | EXTIN |
| 2 | GND |
| 3 | INT |
| 4 | 3.3 volts |
| 5 | DO |
| 6 | 5 volts |
| 7 | DI |
| 8 | 3.3 volts |
| 9 | CS |
| 10 | Ground |
| 11 | CLK |
| 12 | EXTOUT |

FIG. 15C shows an example connection between the external interface channel 2 shown in FIG. 9D and an example 8-pin connector 1520 having the following pin assignments.

| Pin Number | Signal Identification |
|---|---|
| 1 | 3.3 volts |
| 2 | GND |
| 3 | INT |
| 4 | CLK |
| 5 | DO |
| 6 | DI |
| 7 | CS |
| 8 | Ground |

The connector arrangements shown in FIGS. 15A-15C allow the graphics and audio processor 114 to communicate with three different peripheral or other devices simultaneously over separate external interface buses. Such external devices can receive data from the graphics and audio processor 114, provide data to the graphics and audio processor, or both. The main microprocessor 110 can access these devices via the graphics and audio processor 114. Any sort of device may be coupled to system 50 via these connectors 15126, 1518 and/or 1520.

Example Modem Connection

In the example embodiment, system 50 further includes a modem connector 1514 intended to be coupled directly to an internal and/or external modem of conventional design. In the example embodiment, an additional (fourth) external interface bus and associated external interface is provided by graphics and audio processor 114 for communicating with a modem via connector 1514. Devices other than a modem may also be coupled to the modem connector 1514. In the example embodiment, this modem bus is bi-directional with three lines (EXID00, EXI0CLK0 and EXICBS2) being uni-directionally buffered as outputs to the modem connector 1514 and a further line EXI0D10 being uni-directionally buffered as an input to the graphics and audio processor 114. In the example embodiment, the uni-directional buffer provided on the EXID10 line is controlled by the graphics and audio processor 114 via the EXI0CSB2 line (the latter line of which is also passed on as a signal to connector 1514). The other buffers in the example embodiment are controlled by an EXTIN signal asserted by a device coupled to the modem connector 1514. Modem connector 1514 may provide the following example pin assignments for a 12-pin connector:

| Pin Number | Signal Identification |
| --- | --- |
| 1 | EXTIN |
| 2 | Ground |
| 3 | INT |
| 4 | CLK |
| 5 | 12 volts |
| 6 | DO |
| 7 | 3.3 volts |
| 8 | 3.3 volts |
| 9 | DI |
| 10 | CS |
| 11 | Ground |
| 12 | Ground |

As shown in FIG. 12, the modem bus and associated interface is shared with the initial program load/boot ROM/real time clock chip 134. This sharing is not a problem since system 50 will generally not be trying to use a modem at the same time that it is booting up.

Example External Digital Video/Audio Connections

Figure 17B:
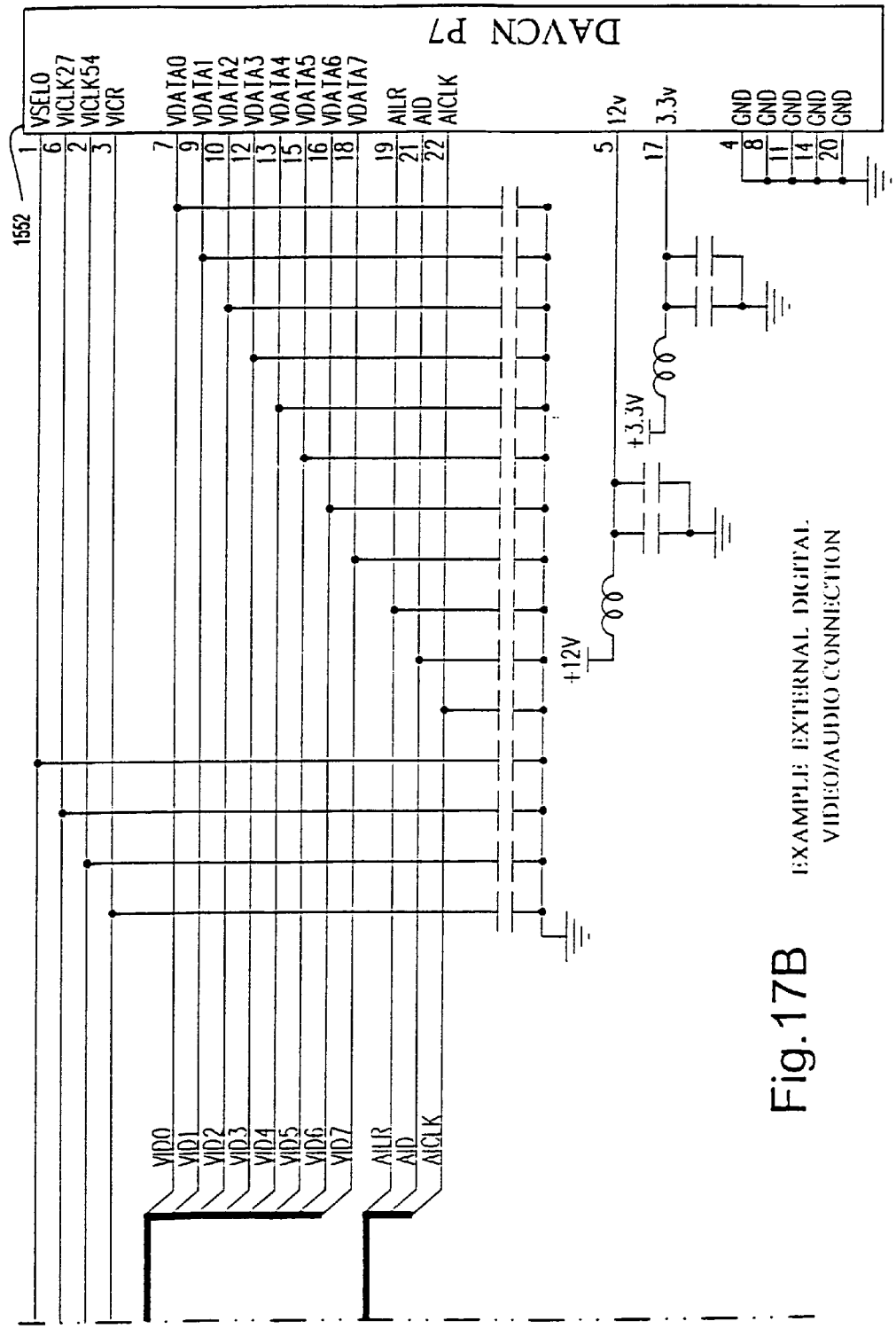
Figure 19A:
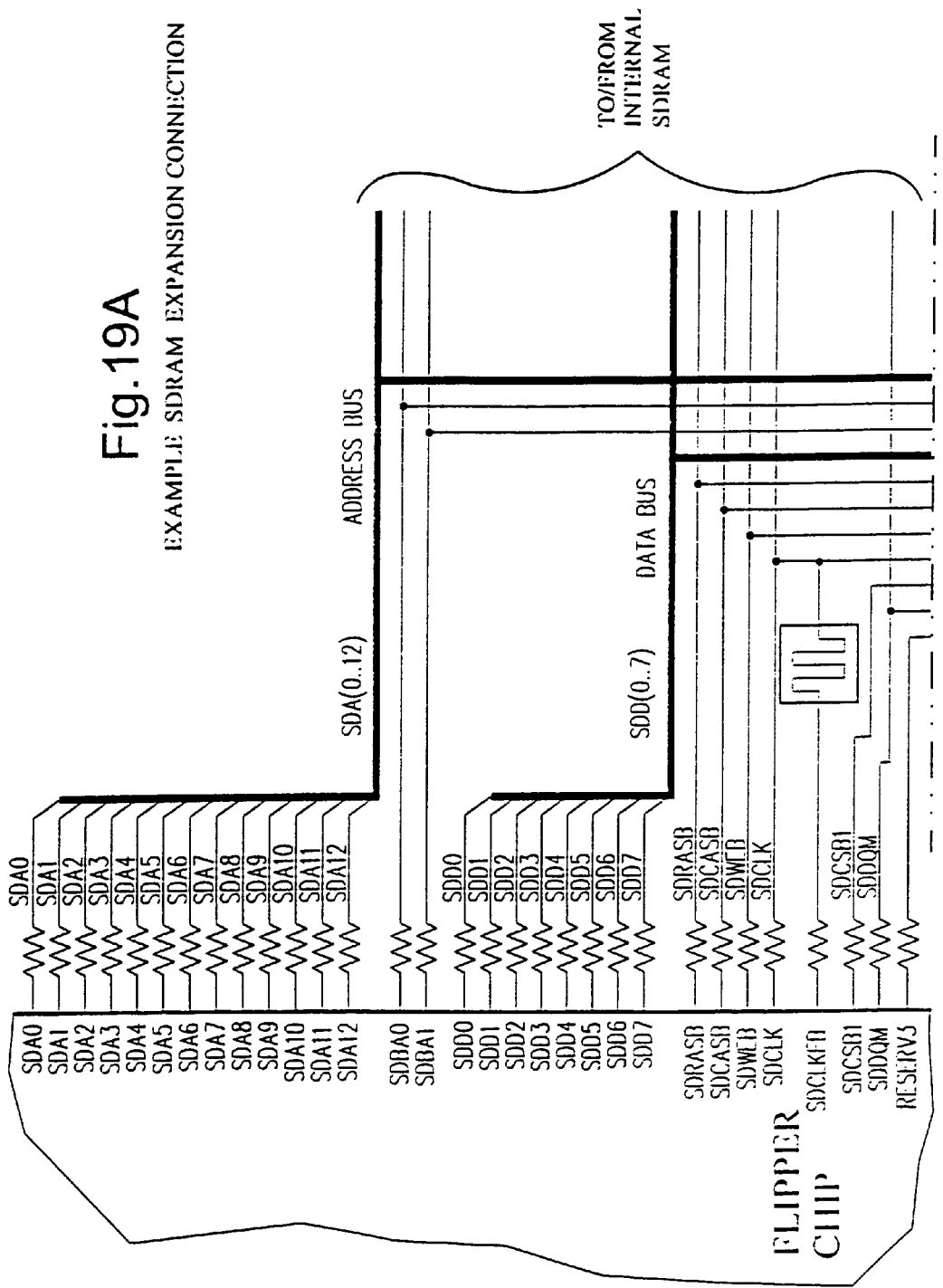
FIGS. 19A and 19B show an example SDRAM expansion connection.
Figure 19B:
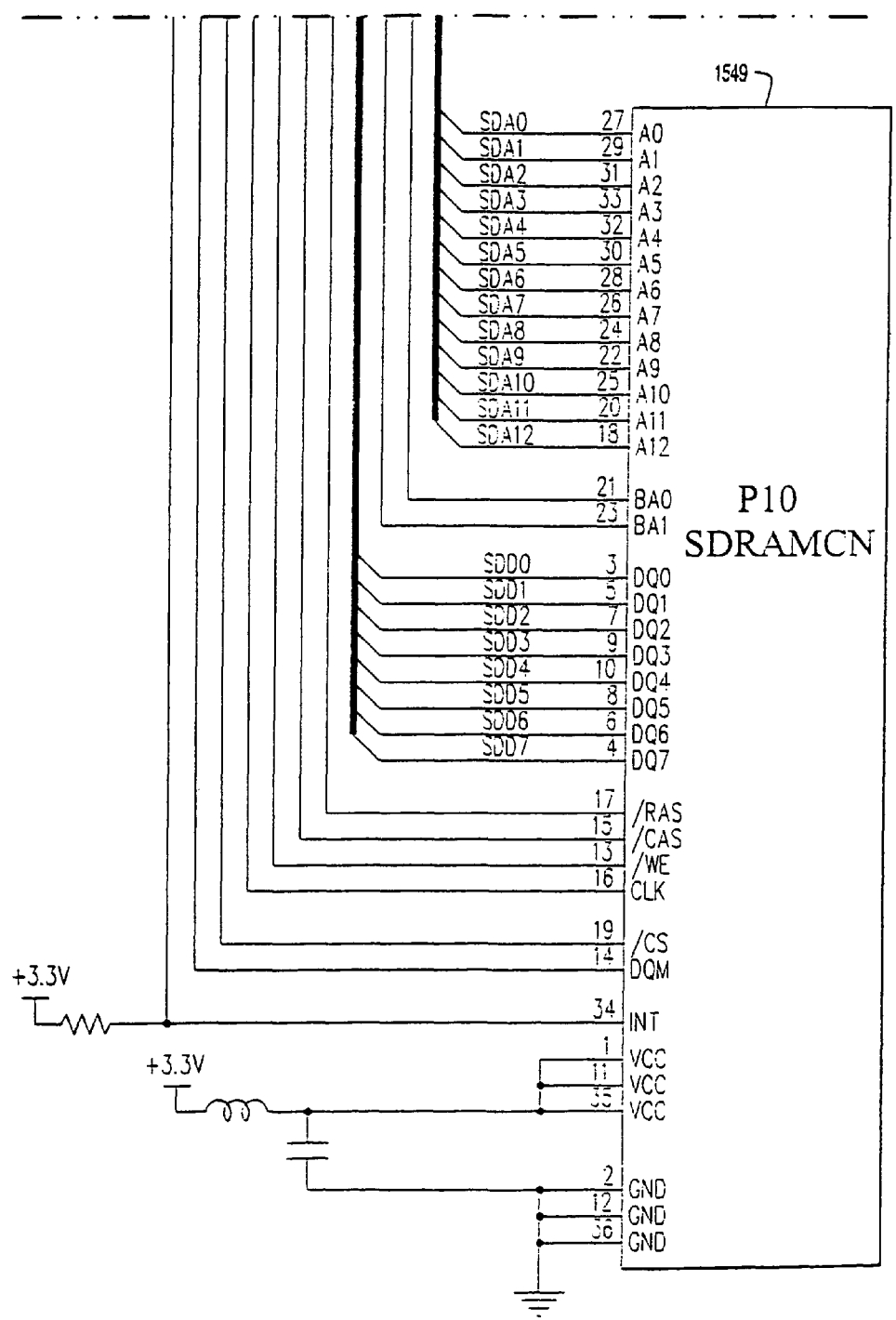

FIGS. 17A and 17B show example connections which connect the graphics and audio processor 114 digital audio and video interface (see FIGS. 10A-11H) to a digital audio/video connector 1552 (FIGS. 17A, 17B) and/or to an analog audio/video connector 1550 (see FIG. 18). As shown in FIGS. 17A and 17B, in the example embodiment, system 50 provides external access to the digital video and audio bus via a digital video and audio connector 1552. In the example embodiment, connector 1552 receives the 8-bit video bus (e.g., at pins 7, 9, 10, 12, 13, 15, 16 and 18) and receives the digital audio serial bus (e.g., at pines 19, 21, 22). In addition, connector 1552 may receive a video selection signal FSEL0 (at pin 1), video clocking signals (e.g., a 27 Mhz signal at pin 6 and a 54 Mhz signal at pin 2) and an additional VICR signal (e.g., at pine 3). Connector 1552 may also make available two different power supply voltages (e.g., a 12 volt power supply voltage at pin 5 and a 3.3 volt power supply voltage at pin 17) in addition to various ground potential connections (e.g., at pins 4, 8, 11, 14, and 20).

The digital video/audio connector 1552 shown in FIGS. 17A and 17B allows any sort of digital or digitized video and/or audio signal consumer and/or producer to be connected directly to the graphics and audio processor 114 digital video and/or audio buses. For simpler devices such as home television sets and other displays and/or audio output devices, it may be preferable just to connect isolated analog video and audio outputs to such external devices via the analog audio/video connector 1550. In the example embodiment, this analog connector 1550 makes amplified, isolated left and right audio outputs available (e.g., at pins 11 and 12) as well as composite and luminance/chrominance video signals in analog form available (e.g., at pines 7, 8 and 9).

Example SDRAM Expansion

FIGS. 19A-19D show an example connector 1549 that may be Used to expand the capacity of SDRAM memory chip 126 by connecting one or more additional memory chips. In the example embodiment, connector 1549 may comprise a 36-pin connector having the following example pin out configuration:

| Pin Number | Signal Identification |
| --- | --- |
| 1 | VCC |
| 2 | Ground |
| 3 | DQ0 |
| 4 | DQ7 |
| 5 | DQ1 |
| 6 | DQ6 |
| 7 | DQ2 |
| 8 | DQ5 |
| 9 | DQ3 |
| 10 | DQ4 |
| 11 | VCC |
| 12 | Ground |
| 13 | Write enable |
| 14 | DQM |
| 15 | CAS |
| 16 | Clock |
| 17 | RAS |
| 18 | A12 |
| 19 | CS (chip select) |
| 20 | A11 |
| 21 | BA0 |
| 22 | A9 |
| 23 | BA1 |
| 24 | A8 |
| 25 | A10 |
| 26 | A7 |
| 27 | A0 |
| 28 | A6 |
| 29 | A1 |
| 30 | A5 |
| 31 | A2 |
| 32 | A4 |
| 33 | A3 |
| 34 | INT |
| 35 | VCC |
| 36 | Ground |

Example Disk Interface Connector

Figure 20B:
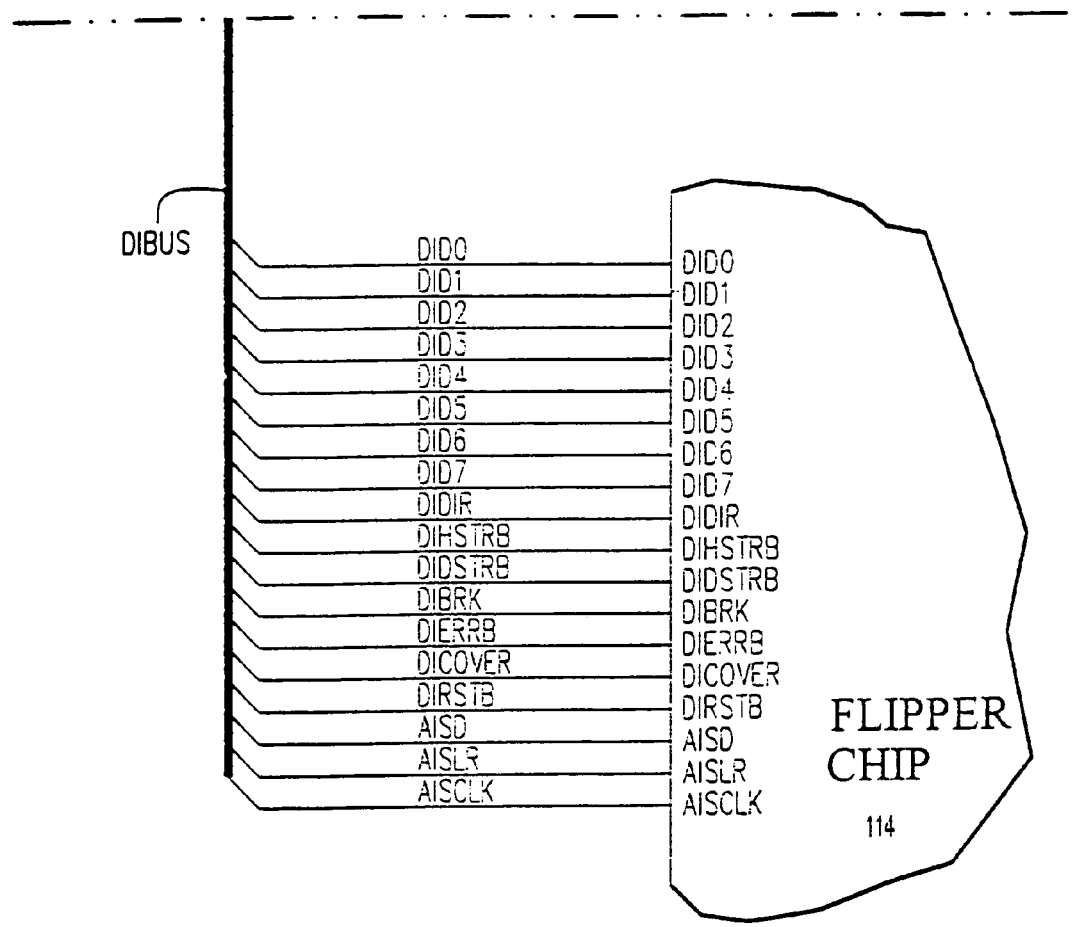

FIGS. 20A-20B show an example disk connector 1521 used to connect the graphics and audio processor 114 to a optical disk drive 106. The following pin outs may be used:

| Pin Number | Signal Identification |
| --- | --- |
| 1 | AISLR (audio bus) |
| 2 | 5 volts |
| 3 | AISD (audio bus) |
| 4 | 5 volts |
| 5 | AISCLK (audio bus) |
| 6 | 5 volts |
| 7 | DIHSTRB |
| 8 | 5 volts |
| 9 | DIERRB |
| 10 | Ground |
| 11 | DIBRK |
| 12 | DICOVER |
| 13 | DIDSTRB |
| 14 | DIRSTB |
| 15 | DIDIR |
| 16 | Ground |
| 17 | DID7 |
| 18 | Ground |
| 19 | DID6 |
| 20 | Ground |

| Pin Number | Signal Identification |
|---|---|
| 21 | DID5 |
| 22 | Ground |
| 23 | DID4 |
| 24 | Ground |
| 25 | DID3 |
| 26 | Ground |
| 27 | DID2 |
| 28 | MONI |
| 29 | DID1 |
| 30 | MONOUT |
| 31 | DID0 |
| 32 | Ground |

Example Power Supply Connector

In the example embodiment, system 50 may also include a power supply connector 1700 used to connect power to power all of the components within the system. An example power supply connector is shown in FIG. 4 including the following example pin outs:

| Pin Number | Signal Identification |
|---|---|
| 1 | Ground |
| 2 | Ground |
| 3 | 3.3 volts DC |
| 4 | 3.3 volts DC |
| 5 | Ground |
| 6 | Ground |
| 7 | Ground |
| 8 | Ground |
| 9 | 1.8 volts DC |
| 10 | 1.8 volts DC |
| 11 | 1.8 volts DC |
| 12 | 1.8 volts DC |
| 13 | 1.55 volts DC |
| 14 | 1.55 volts DC |
| 15 | 1.55 volts DC |
| 16 | Ground |
| 17 | Ground |
| 18 | Ground |
| 19 | Thermo detect |
| 20 | 12 volts DC |
| 21 | 5 volts DC |
| 22 | 5 volts DC |

In the example embodiment, a temperature compensation chip 1702 is connected to connector 17 pin 19.

Other Example Compatible Implementations

Certain of the above-described system components 50 could be implemented as other than the home video game console configuration described above. For example, one could run graphics application or other software written for system 50 on a platform with a different configuration that emulates system 50 or is otherwise compatible with it. If the other platform can successfully emulate, simulate and/or provide some or all of the hardware and software resources of system 50, then the other platform will be able to successfully execute the software.

As one example, an emulator may provide a hardware and/or software configuration (platform) that is different from the hardware and/or software configuration (platform) of system 50. The emulator system might include software and/or hardware components that emulate or simulate some or all of hardware and/or software components of the system for which the application software was written. For example, the emulator system could comprise a general purpose digital computer such as a personal computer, which executes a software emulator program that simulates the hardware and/or firmware of system 50.

Some general purpose digital computers (e.g., IBM or MacIntosh personal computers and compatibles) are now equipped with 3D graphics cards that provide 3D graphics pipelines compliant with DirectX or other standard 3D graphics command APIs. They may also be equipped with stereophonic sound cards that provide high quality stereophonic sound based on a standard set of sound commands. Such multimedia-hardware-equipped personal computers running emulator software may have sufficient performance to approximate the graphics and sound performance of system 50. Emulator software controls the hardware resources on the personal computer platform to simulate the processing, 3D graphics, sound, peripheral and other capabilities of the home video game console platform for which the game programmer wrote the game software.

Figure 29A:
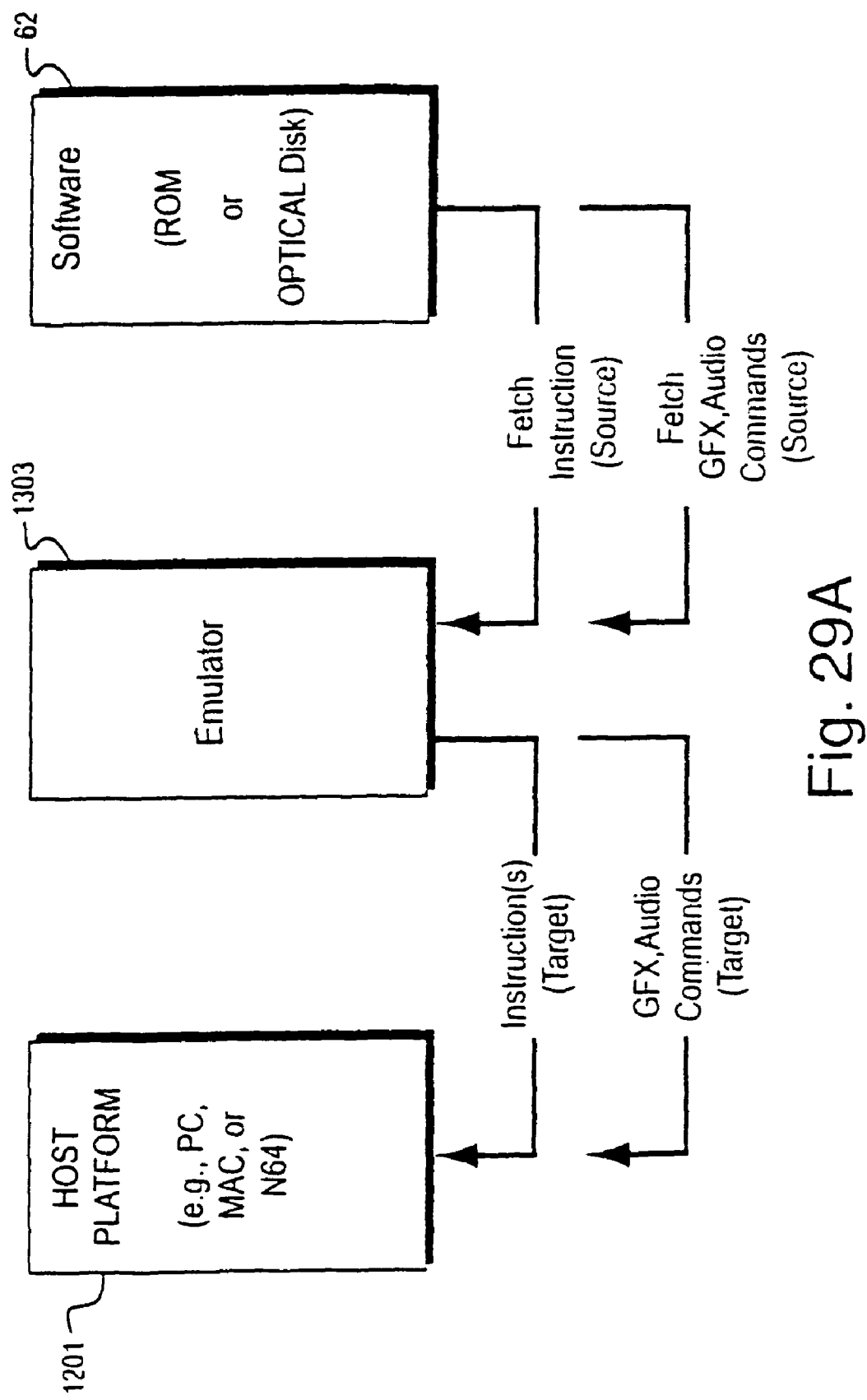
FIGS. 29A and 29B show example alternative compatible implementations.

FIG. 29A illustrates an example overall emulation process using a host platform 1201, an emulator component 1303, and a game software executable binary image provided on a storage medium 62. Host 1201 may be a general or special purpose digital computing device such as, for example, a personal computer, a video game console, or any other platform with sufficient computing power. Emulator 1303 may be software and/or hardware that runs on host platform 1201, and provides a real-time conversion of commands, data and other information from storage medium 62 into a form that can be processed by host 1201. For example, emulator 1303 fetches "source" binary-image program instructions intended for execution by system 50 from storage medium 62 and converts these program instructions to a target format that can be executed or otherwise processed by host 1201.

As one example, in the case where the software is written for execution on a platform using an IBM PowerPC or other specific processor and the host 1201 is a personal computer using a different (e.g., Intel) processor, emulator 1203 fetches one or a sequence of binary-image program instructions from storage medium 1305 and converts these program instructions to one or more equivalent Intel binary-image program instructions. The emulator 1203 also fetches and/or generates graphics commands and audio commands intended for processing by the graphics and audio processor 114, and converts these commands into a format or formats that can be processed by hardware and/or software graphics and audio processing resources available on host 1201. As one example, emulator 1303 may convert these commands into commands that can be processed by specific graphics and/or or sound hardware of the host 1201 (e.g., using standard DirectX, OpenGL and/or sound APIs).

An emulator 1303 used to provide some or all of the features of the video game system described above may also be provided with a graphic user interface (GUI) that simplifies or automates the selection of various options and screen modes for games run using the emulator. In one example, such an emulator 1303 may further include enhanced functionality as compared with the host platform for which the software was originally intended.

Figure 29B:
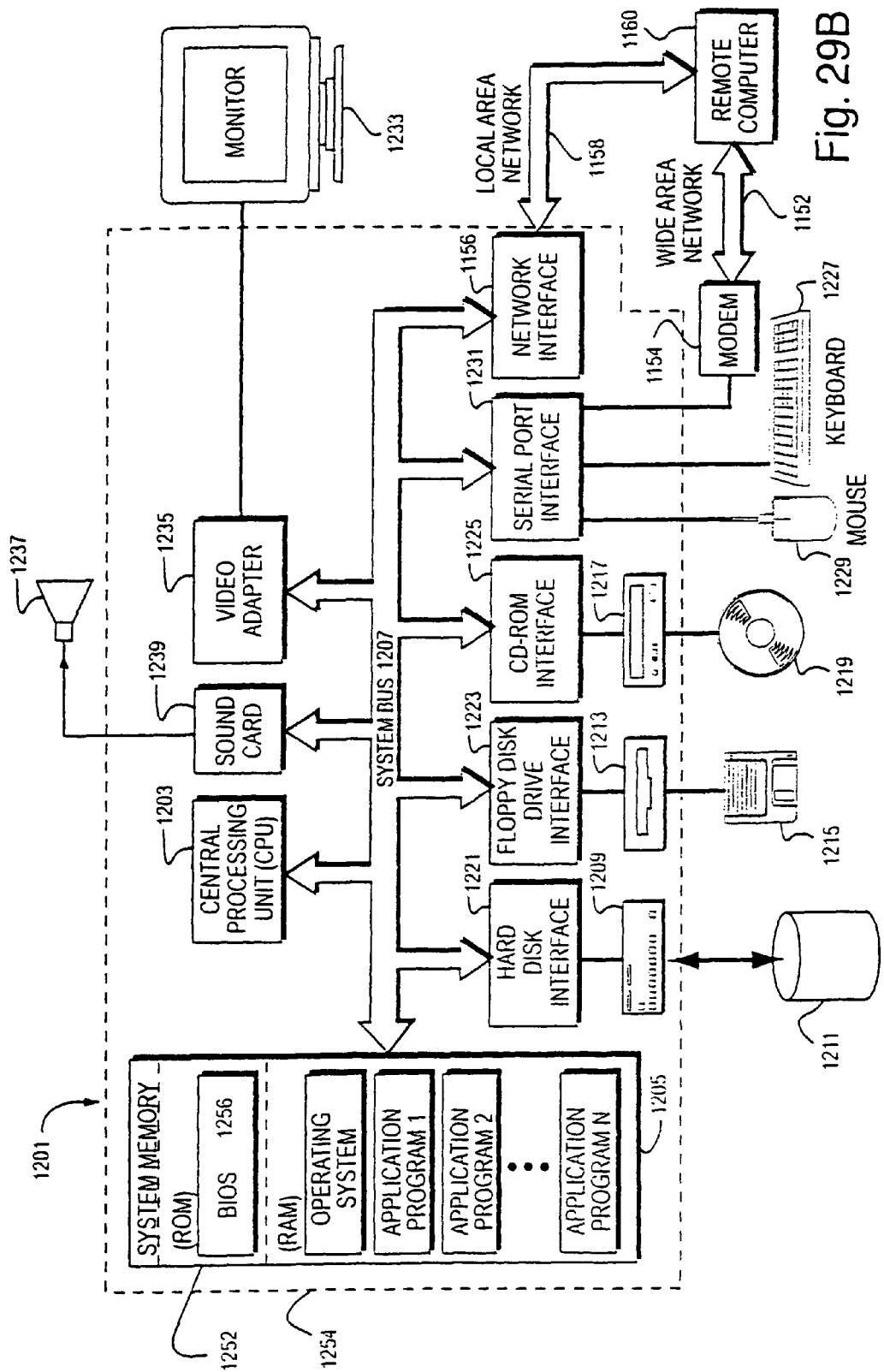

FIG. 29B illustrates an emulation host system 1201 suitable for use with emulator 1303. System 1201 includes a processing unit 1203 and a system memory 1205. A system bus 1207 couples various system components including system memory 1205 to processing unit 1203. System bus 1207 may be any of several types of bus structures including a memory bus or memory controller, a peripheral bus, and a local bus using any of a variety of bus architectures. System memory 1207 includes read only memory (ROM) 1252 and random access memory (RAM) 1254. A basic input/output system (BIOS) 1256, containing the basic routines that help to transfer information between elements within personal computer system 1201, such as during start-up, is stored in the ROM 1252. System 1201 further includes various drives and associated computer-readable media. A hard disk drive 1209 reads from and writes to a (typically fixed) magnetic hard disk 1211. An additional (possible optional) magnetic disk drive 1213 reads from and writes to a removable "floppy" or other magnetic disk 1215. An optical disk drive 1217 reads from and, in some configurations, writes to a removable optical disk 1219 such as a CD ROM or other optical media. Hard disk drive 1209 and optical disk drive 1217 are connected to system bus 1207 by a hard disk drive interface 1221 and an optical drive interface 1225, respectively. The drives and their associated computer-readable media provide nonvolatile storage of computer-readable instructions, data structures, program modules, game programs and other data for personal computer system 1201. In other configurations, other types of computer-readable media that can store data that is accessible by a computer (e.g., magnetic cassettes, flash memory cards, digital video disks, Bernoulli cartridges, random access memories (RAMs), read only memories (ROMs) and the like) may also be used.

A number of program modules including emulator 1303 may be stored on the hard disk 1211, removable magnetic disk 1215, optical disk 1219 and/or the ROM 1252 and/or the RAM 1254 of system memory 1205. Such program modules may include an operating system providing graphics and sound APIs, one or more application programs, other program modules, program data and game data. A user may enter commands and information into personal computer system 1201 through input devices such as a keyboard 1227, pointing device 1229, microphones, joysticks, game controllers, satellite dishes, scanners, or the like. These and other input devices can be connected to processing unit 1203 through a serial port interface 1231 that is coupled to system bus 1207, but may be connected by other interfaces, such as a parallel port, game port Fire wire bus or a universal serial bus (USB). A monitor 1233 or other type of display device is also connected to system bus 1207 via an interface, such as a video adapter 1235.

System 1201 may also include a modem 1154 or other network interface means for establishing communications over a network 1152 such as the Internet. Modem 1154, which may be internal or external, is connected to system bus 123 via serial port interface 1231. A network interface 1156 may also be provided for allowing system 1201 to communicate with a remote computing device 1150 (e.g., another system 1201) via a local area network 1158 (or such communication may be via wide area network 1152 or other communications path such as dial-up or other communications means). System 1201 will typically include other peripheral output devices, such as printers and other standard peripheral devices.

In one example, video adapter 1235 may include a 3D graphics pipeline chip set providing fast 3D graphics rendering in response to 3D graphics commands issued based on a standard 3D graphics application programmer interface such as Microsoft's DirectX 7.0 or other version. A set of stereo loudspeakers 1237 is also connected to system bus 1207 via a sound generating interface such as a conventional "sound card" providing hardware and embedded software support for generating high quality stereophonic sound based on sound commands provided by bus 1207. These hardware capabilities allow system 1201 to provide sufficient graphics and sound speed performance to play software stored in storage medium 1305.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A gaming peripheral device configured to connect to an interface of a home video game system, wherein the interface provides access to a processing system of the home video game system and comprises first and second power supply lines having different voltages, first and second ground lines, an input signal line normally at a first level, a serial data out line, a serial data in line, a select signal line, a clocking signal line, and an interrupt signal line, and wherein the home video game system detects that the gaming peripheral device is connected to the interface when the input signal line is at a second level different than the first level, the gaming peripheral device comprising:
   a memory card including a memory and configured for insertion into a port provided in a housing of the home video game system; and
   a connector coupled to the memory, wherein the connector comprises:
      a first connecting element that connects to the serial data out line;
      a second connecting element that connects to the serial data in line;
      a third connecting element that connects to the select signal line;
      a fourth connecting element that connects to the clocking signal line;
      a fifth connecting element that connects to the interrupt signal line;
      a sixth connecting element that connects to the input signal line;
      seventh, eighth and ninth connecting elements that each connects to the first power supply line;
      a tenth connecting element that connects to the first ground line;
      an eleventh connecting element that connects to the second ground line; and
      a twelfth connecting element that connects to the second power supply line,
   wherein the input signal line is supplied with a signal from the sixth connecting element of the connector which causes the input signal line to be at the second level when the gaming peripheral device is connected to the interface of the home video game system.

* * * * *